United States Patent [19]

Nei

[11] Patent Number: 5,479,617
[45] Date of Patent: Dec. 26, 1995

[54] SYSTEM FOR COMBINING AND ENCODING FIRST PLURALITY OF VIDEO SIGNALS TO PRODUCE SECOND PLURALITY OF SIGNALS AND TRANSMITTING THE SIGNALS VIA UNSHIELDED TELEPHONE CABLE TO REMOTE WORKSTATION

[75] Inventor: Chu Nei, Los Altos, Calif.

[73] Assignee: Maxpeed Corporation, Foster City, Calif.

[21] Appl. No.: 894,418

[22] Filed: Jun. 5, 1992

[51] Int. Cl.[6] ............................ G06F 13/00; G06F 13/14; G06F 7/00; G06F 7/14
[52] U.S. Cl. ................ 395/200.2; 395/500; 395/200.01; 364/242.33; 364/935.44; 364/935.46; 364/931.41; 364/944.5; 341/143
[58] Field of Search ..................................... 395/200, 275, 395/100, 114, 162, 163, 500; 345/22; 379/100, 93; 348/17, 6; 382/56

[56] References Cited

U.S. PATENT DOCUMENTS

| | | | |
|---|---|---|---|
| 3,832,483 | 8/1974 | Jirka | 178/5.4 CD |
| 3,967,074 | 6/1976 | Schillo | 179/18 |
| 4,797,750 | 1/1989 | Karweit | 358/335 |
| 4,901,342 | 2/1990 | Jones | 379/93 |
| 4,980,897 | 12/1990 | Decker et al. | 375/38 |
| 5,235,680 | 8/1993 | Bijnagte | 395/161 |

OTHER PUBLICATIONS

"Combined Correlatively Encoded/Multi-h CPFSK Signalling", Fonseka et al., IEEE, 1991, pp. 797-801.

Primary Examiner—Thomas C. Lee
Assistant Examiner—Rehana Krick
Attorney, Agent, or Firm—Townsend and Townsend and Crew; Larry Mendenhall

[57] ABSTRACT

A type 286, 386, or 486 Personal Computer having a host controller comprising a standard VGA controller, a microprocessor, a receive and transmit unit, and an encoder is coupled via a ten line telephone cable to a remote VGA color display workstation having a base unit comprising a decoder, a RAMDAC, and microprocessor, and a receive and transmit unit. The encoder intelligently combines ten video signals (a pixel clock, six pixel signals, a video blanking interval (VBI) signal, and vertical and horizontal sync signals) and an I/O data transmit signal into four signals which are transmitted in a balanced fashion (requiring eight lines) to minimize signal noise so that shielding is unnecessary. An additional line is used to provide a ground reference to the remote workstation, and another line is used to provide an I/O data receive signal to the host controller microprocessor. The base unit decoder decodes the balanced signals to provide the I/O transmit signal to the base unit microprocessor, the vertical and horizontal sync signals to the remote workstation VGA monitor, and the VBI and pixel signals to the base unit RAMDAC. Remaining signals required by the base unit RAMDAC are provided by the base unit microprocessor.

7 Claims, 8 Drawing Sheets

SYSTEM FOR COMBINING AND ENCODING FIRST PLURALITY OF VIDEO SIGNALS TO PRODUCE SECOND PLURALITY OF SIGNALS AND TRANSMITTING THE SIGNALS VIA UNSHIELDED TELEPHONE CABLE TO REMOTE WORKSTATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

SOURCE CODE APPENDICES

Two appendices A and B of assembly language source code for a preferred embodiment are filed herewith. Appendix C provides source code samples for interacting with a controller together with interface specifications.

BACKGROUND OF THE INVENTION

This invention relates generally to computer displays, more specifically to displays for remote computer stations, and most specifically to VGA color displays for remote computer stations.

As microcomputers have become more powerful over the past years, they have moved from being used only as single-user standalone systems to being used also as multi-user engines to run an entire work group or small business. In such a multi-user system, a single type 286, 386, or 486 Personal Computer would serve a plurality of remote workstations each comprising a monitor, keyboard, and possibly a mouse, printer, modem, etc., and controlled by a remote workstation base unit. To improve performance "intelligent" I/O controllers, which have their own microprocessors, are often employed in both the host controller and in the workstation base unit to minimize CPU I/O overhead on the host computer.

As more application programs are being designed with color monitor capabilities in mind, an increased demand for color capability for remote stations of multi-user systems has followed. Providing standard VGA graphics capabilities for remote workstations has proven difficult, however. Such systems have in the past required specialized cables, substantially increasing both the cost of the cabling for a multi-user system and the complexity of installing and maintaining the cable system.

SUMMARY OF THE INVENTION

The present invention provides a method and apparatus for interfacing a host computer to remote workstations with VGA color monitors via inexpensive and easily installed standard RJ-45 (ten-line) telephone cables. According to the invention, a host controller comprises a standard VGA controller, a microprocessor, a receive and transmit unit, and an encoder. A corresponding remote workstation base unit comprises a decoder, a RAMDAC, and microprocessor, and a receive and transmit unit. The encoder intelligently combines ten video signals (a pixel clock, six pixel signals, a video blanking interval (VBI) signal, and vertical and horizontal sync signals) and a data transmit signal into four signals. These four encoded signals are transmitted in balanced pair fashion (requiring eight lines) to minimize signal noise so that shielding is unnecessary. An additional line is used to provide a ground reference to the remote workstation, and another line is used to provide a data receive signal to the host controller microprocessor.

The base unit decoder, in turn, decodes the balanced signals to provide the data transmit signal to the base unit microprocessor, the vertical and horizontal sync signals to the remote workstation VGA monitor, and the VBI and pixel signals to the base unit RAMDAC. Remaining signals required by the base unit RAMDAC are provided periodically by the base unit microprocessor as accumulated through the transmit data signal from the host controller microprocessor. The receive and transmit data signals also provide all keyboard input, printer data, and other communications between the host and remote station. Thus, only ten lines are required to couple the host controller to the remote station base unit.

A further understanding of the nature and advantages of the invention may be realized by reference to the remaining portions of the specification and the drawings.

DETAILED DESCRIPTION OF THE INVENTION

Figure 1:
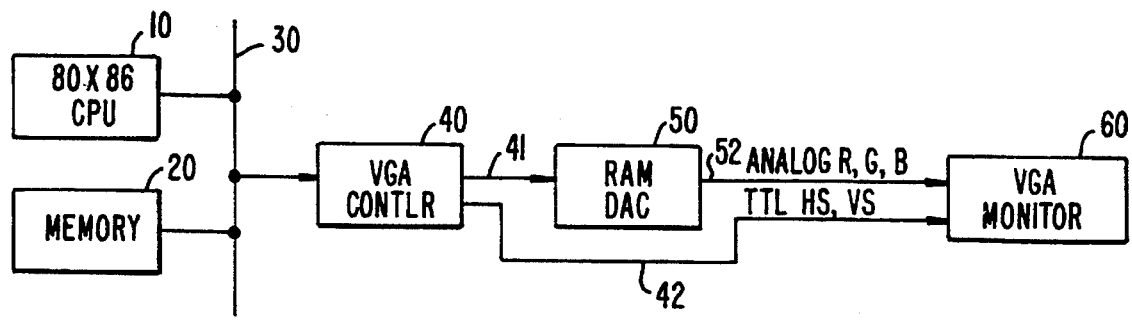
FIG. 1 is a block diagram of a conventional single-user VGA display system.

A conventional single-user VGA display system is shown in FIG. 1. An 80×86 CPU 10 and a memory 20 are coupled to an ISA bus 30, as is a VGA controller 40. VGA controller 40 in turn is coupled via line 41 to a RAMDAC 50 and via line 42 to a VGA monitor. RAMDAC 50 also is coupled to VGA monitor 60, via line 52. Line 42 carries two digital signals, Horizontal Sync and Vertical Sync, from VGA controller 40 to VGA monitor 60, and line 52 carries three analog signals, Red, Green, and Blue, from RAMDAC 50 to VGA monitor 60.

Figure 2:
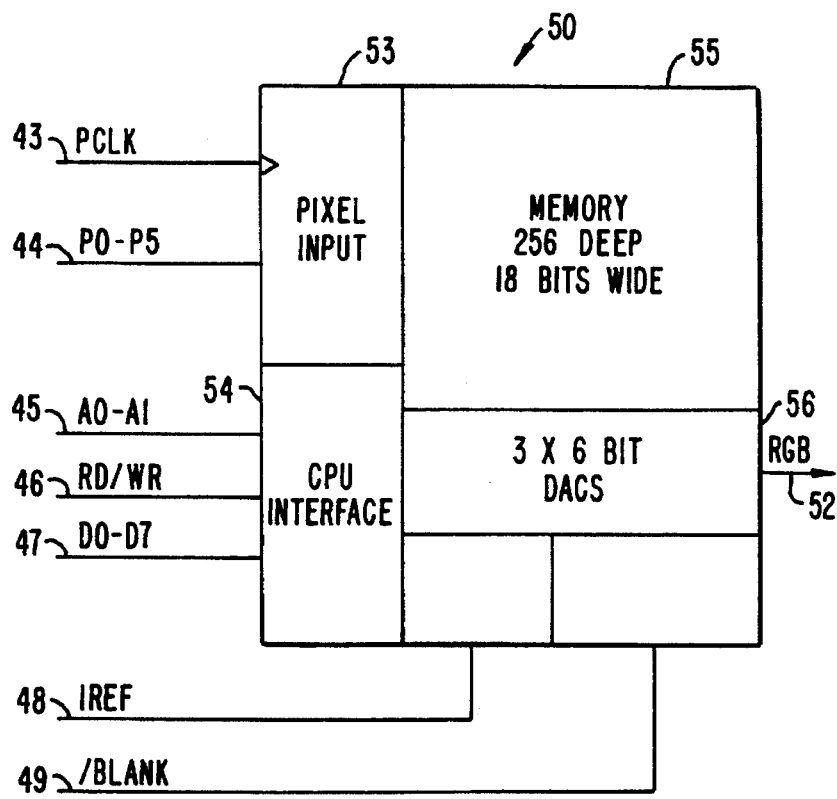
FIG. 2 is a block diagram of a conventional RAMDAC.

RAMDAC 50 is illustrated in greater detail in FIG. 2. Lines 43 through 49 make up line 41 from VGA controller 40 to RAMDAC 50. Line 43 carries a pixel clock (pclk) signal to RAMDAC pixel input portion 53. The pixel clock can vary from 16 MHz to 28 MHz. Six pixel signals P0–P5 are also supplied to pixel input portion 53 via line 44. Supplied to RAMDAC CPU interface portion 54 are address lines A0–A1 on line 45, Read/Write on line 46, and eight data signals D0–D7 on line 47. Also provided to RAMDAC 50 are IREF signal 48 providing a reference current, and /Blank signal 49 indicating the video blanking interval (VBI) of the display signal. RAMDAC 50 in turn provides RGB signals 52 via three six-bit DACS 56. RAMDAC 50 thus has twenty digital inputs and three analog outputs.

When the VGA monitor of FIG. 1 is desired to be placed substantially remote from CPU 10, such as in a typical multi-user system, RAMDAC 50 is either kept local by extending line 52, or RAMDAC 50 is placed with the remote monitor. Line 42, which carries only two digital signals, does not by itself create serious difficulties to extension. However, bus 30 transmits a large number of signals, so expensive and cumbersome cabling is typically required to extend it. Extension of line 41, because of the high number of signals it carries, would conventionally require expensive cabling as well. Line 52 carries 30 MHz analog signals, which are relatively difficult to transmit over long distances, and which require substantial shielding. The conventional solutions therefore require heavy or specialized cabling and its attendant complex installation/maintenance.

To obviate this need for expensive cabling, the present invention provides a system employing a local VGA controller and a remote RAMDAC, but which has a primary transmission to the remote location of only a portion of the signals required by the remote RAMDAC, with the remainder of the RAMDAC input signals being transmitted periodically through a general data transmit line. Furthermore, the transmitted signals are intelligently encoded so that inexpensive standard ten-line telephone cable, or other similar unshielded ribbon-type cable, is sufficient to carry not only the necessary video signals, but a ground reference and data transmit and receive signals as well.

Figure 3:
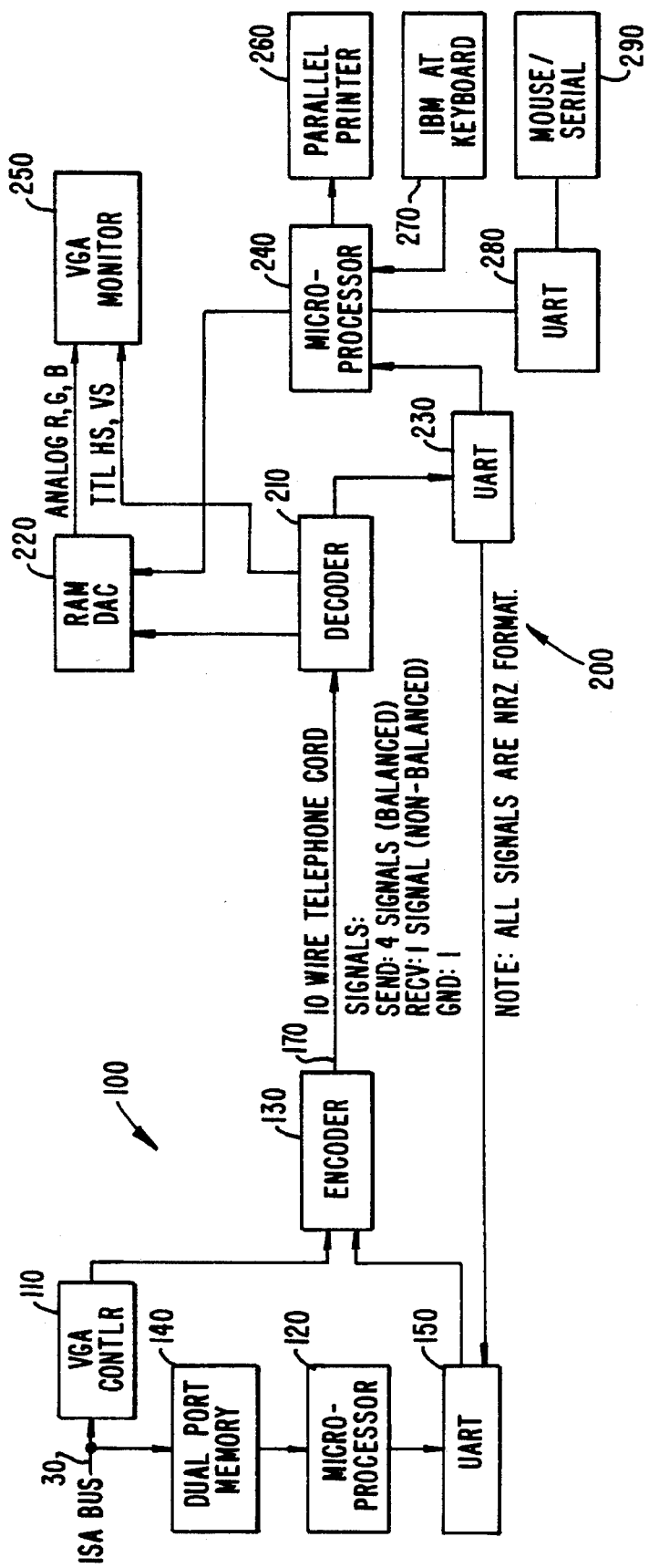
FIG. 3 is a block diagram of a host controller and base unit of a particular embodiment of the present invention.

An overview of a particular embodiment of the present invention is illustrated in FIG. 3. At the host computer side the system comprises a host computer controller 100, which has as its primary components a VGA controller 110, a microprocessor 120, and an encoder 130. VGA controller 110 is coupled to host computer ISA bus 30, and is coupled to provide video signals to encoder 130. Microprocessor 120 is also coupled to ISA bus 30, through a dual port RAM 140, and is coupled through a Universal Asynchronous Receive and Transmit unit (UART) 150 to encoder 130. VGA controller 110, encoder 130, and UART 150 together serve a single channel for a single remote workstation. Controller 100 includes an additional three channels, not shown, which each have their own VGA controller, encoder, and UART. Microprocessor 120 serves all four channels.

Encoder 130 accepts as input a data transmit signal from microprocessor 120 through UART 150, and ten video signals from VGA controller 110. Encoder 130 combines these eleven signals to produce four balanced pair signals which are transmitted to the remote workstation via RJ-45 (ten line) telephone cable 170, each balanced pair signal requiring two conductors. One of the remaining two conductors of telephone cable 170 is used to supply a data receive signal from the remote workstation to microprocessor 120 through UART 150, and the other (not shown) is used to supply a ground reference voltage to the remote workstation.

At the remote workstation side, base unit 200 comprises a decoder 210, a RAMDAC 220, a UART 230, and a microprocessor 240. Decoder 210 is coupled to RAMDAC 220 to provide a video blanking interval signal, a pixel clock signal, and six pixel data signals thereto, and is coupled through UART 230 to microprocessor 240 to provide a data transmit signal from microprocessor 120. Decoder 210 is also coupled to a VGA monitor 250 to provide Vertical and Horizontal sync signals thereto. Microprocessor 240 is coupled to a parallel printer 260, to a keyboard 270, and through a UART 280 to a mouse or other serial device 290. Microprocessor 240 also provides a data receive signal through UART 230, telephone cable 170, and UART 150 to microprocessor 120.

Figure 4:
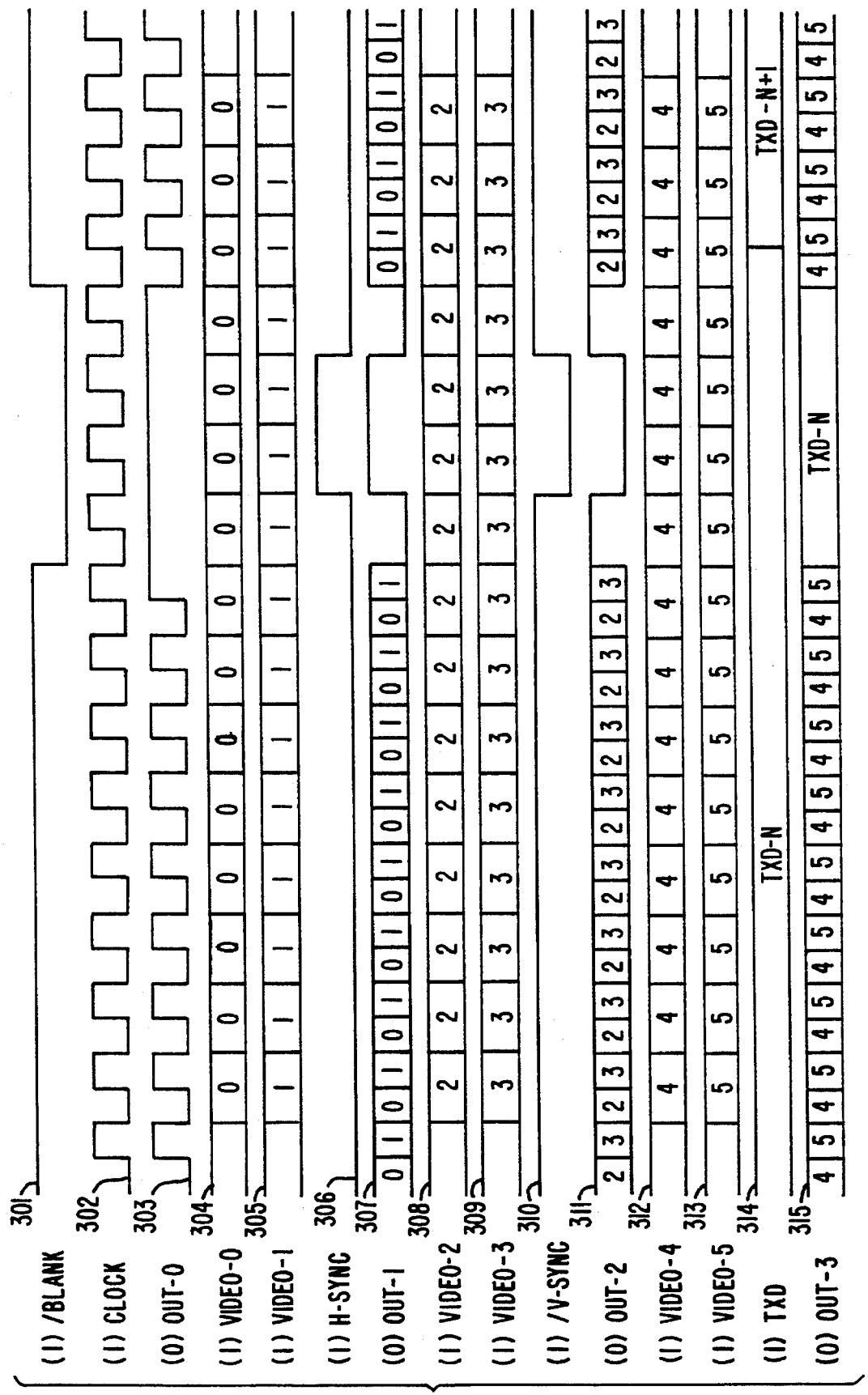
FIG. 4 is a timing diagram for the encoder of FIG. 3.

The timing diagram for encoder 130 is illustrated in FIG. 4. /Blank (video blanking) signal 301 is combined with pixel clock signal 302 to produce out-0 signal 303. Pixel data P0 signal 304, P1 signal 305, and horizontal sync signal 306 are combined to produce out-1 signal 307. P2 signal 308, P3 signal 309, and vertical sync signal 310 are combined to produce out-2 signal 311. Finally, P4 signal 312, P5 signal 313, and TXD (data transmit) signal 314 are combined to produce out-3 signal 315.

Figure 5:
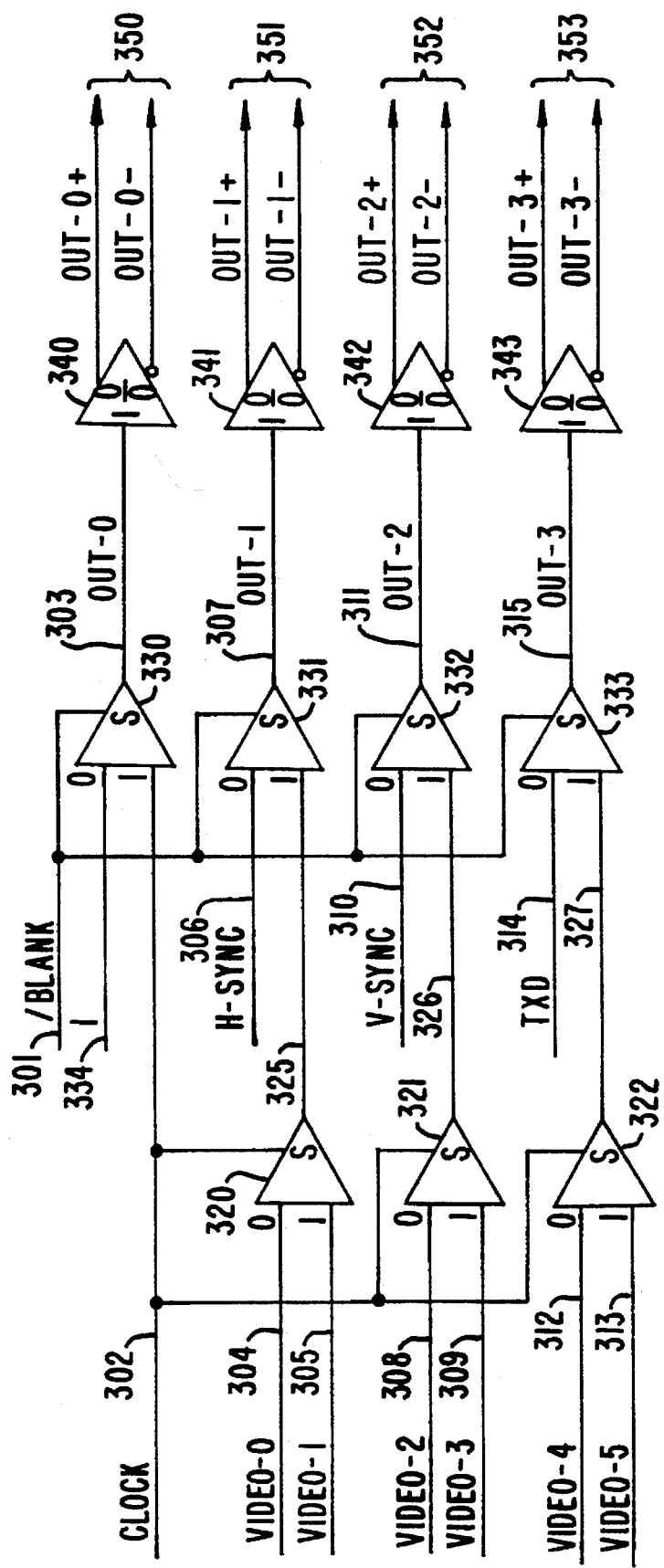
FIG. 5 is a block diagram of the encoder of FIG. 3.

A block diagram for encoder 130 is illustrated in FIG. 5. Encoder 130 is organized in three levels. A first level consists of two-input muxes 320, 321, and 322, which are all controlled by pixel clock signal 302. Mux 320 accepts as inputs P0 signal 304 and P1 signal 305 to produce intermediate signal 325. Mux 321 accepts as inputs P2 signal 308 and P3 signal 309 to produce intermediate signal 326. Mux 322 accepts as inputs P4 signal 312 and P5 signal 313 to produce intermediate signal 327. These three intermediate signals thus each consist of two alternating pixel signals.

The second layer consists of two-input muxes 330, 331, 332, and 333, which are all controlled by /Blank signal 301 so that they have a primary output, and an alternate output during the VBI. Mux 330 accepts as "0" and "1" inputs, respectively, a constant high logic signal 334 and pixel clock signal 302 to produce out-0 signal 303. Out-0 signal 303 thus tracks the pixel clock when /Blank is high, and is a constant high output during the VBI, when /Blank is low. Mux 331 accepts as "0" and "1" inputs, respectively, horizontal sync signal 306 and intermediate signal 325 to produce out-1 signal 307. Mux 332 accepts as "0" and "1" inputs, respectively, vertical sync signal 310 and intermediate signal 326 to produce out-2 signal 311. Mux 333 accepts as "0" and "1" inputs, respectively, TXD signal 314 and intermediate signal 327 to produce out-3 signal 315. Finally, output signals 303, 307, 311, and 315 pass through the third level, dual output buffers 340–343, to produce balanced pair outputs 351–353, respectively.

Figure 6:
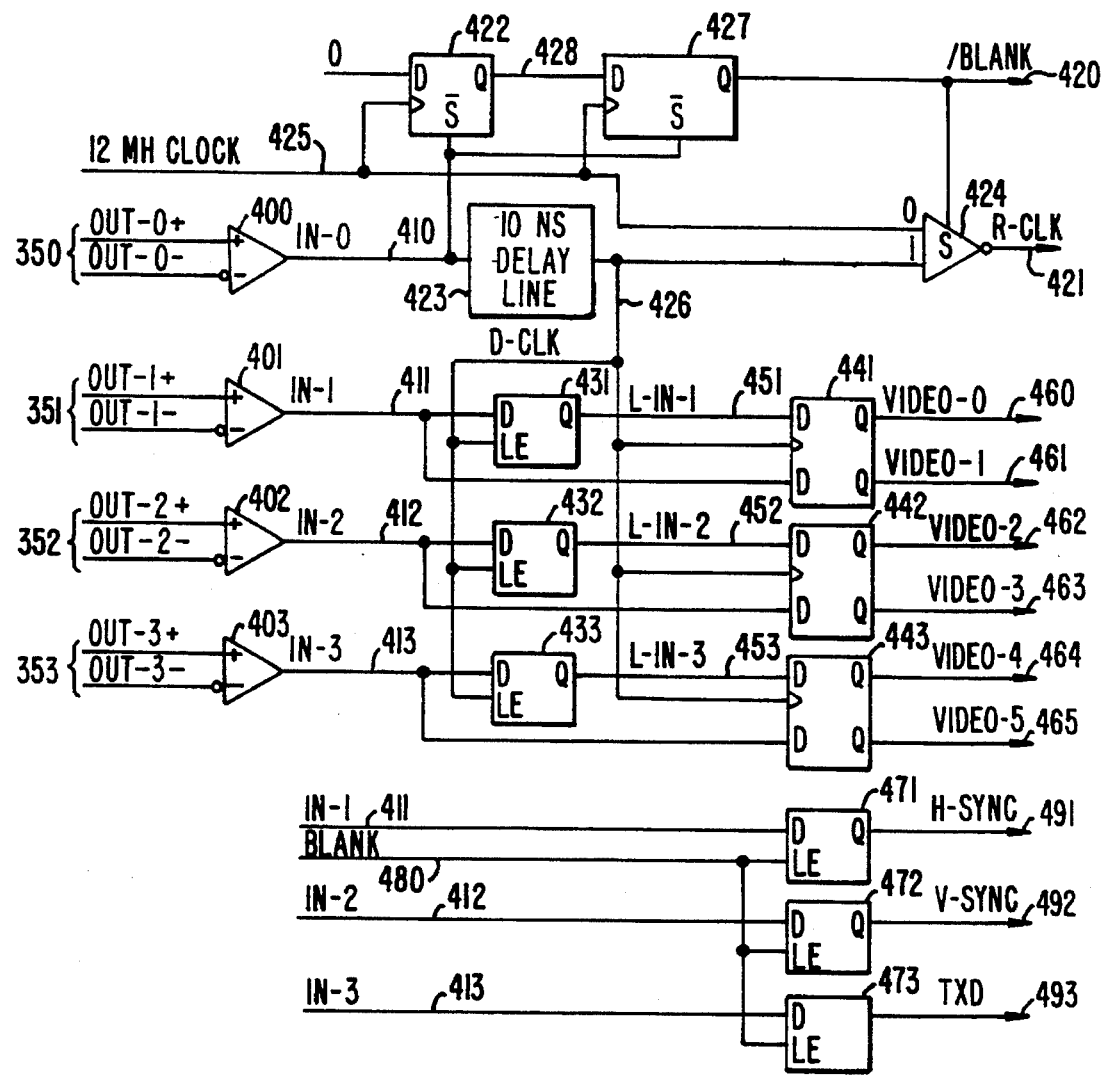
FIG. 6 is a block diagram of the decoder of FIG. 3.
Figure 7:
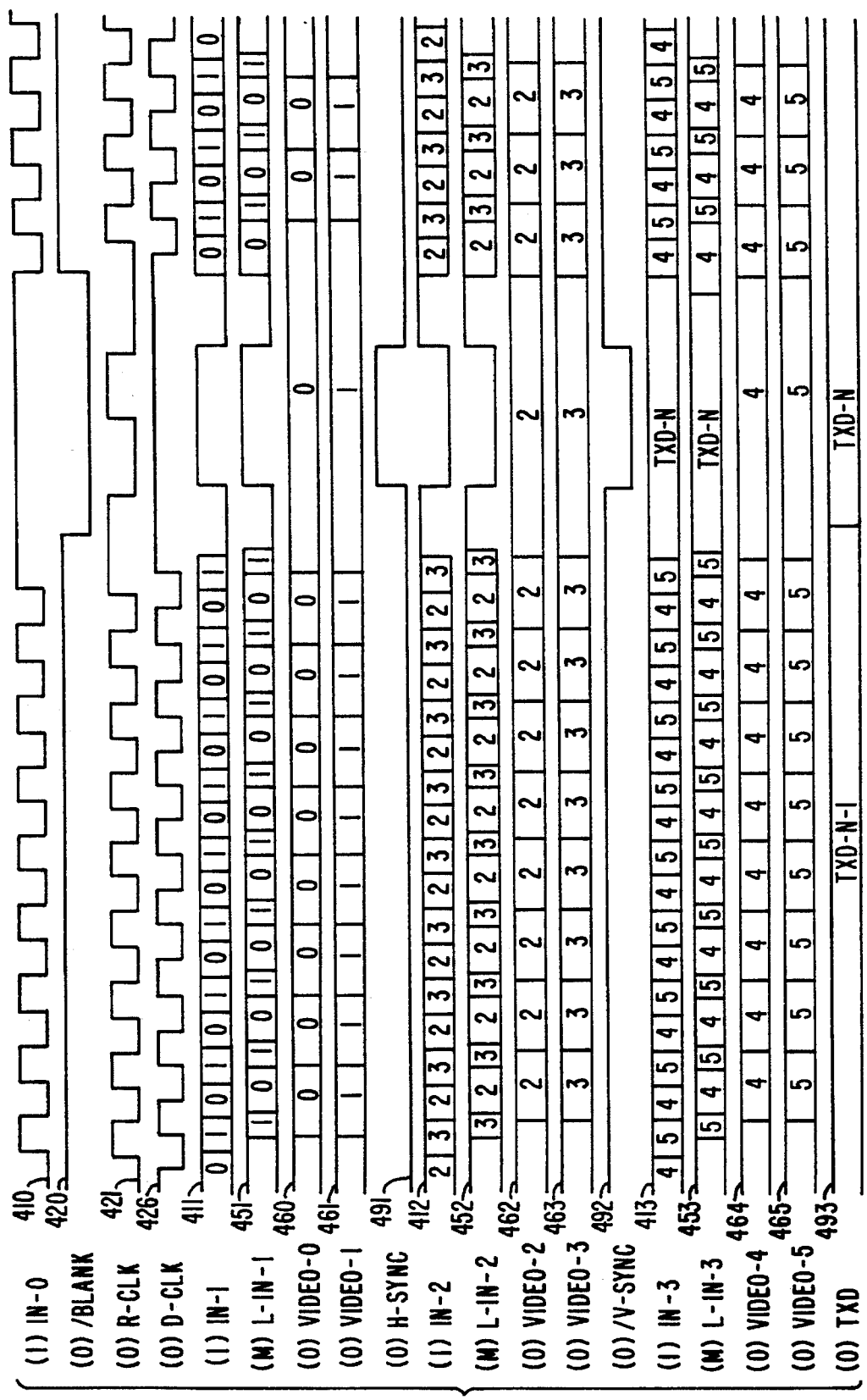
FIG. 7 is a timing diagram for the decoder of FIG. 3.

FIG. 6 illustrates a block diagram of decoder 210, the signal timing of which is illustrated in FIG. 7. Decoder 210 has four primary sections. The first is an input section comprising balanced pair receivers 400–403 to convert balanced pairs 350–353 into standard format signals IN-0 signal 410, IN-1 signal 411, IN-2 signal 412, and IN-3 signal 413. The second section decodes a /Blank (VBI) signal 420 and an R-CLK pixel clock signal 421 from IN-0 signal 410, and employs flip-flops 422 and 428, a 10 ns delay gate 423, and a two-input mux 424. Flip-flop 422 has its data input grounded, for a constant low logic level, and is clocked by a 12 Mhz clock signal 425. Flip-flop 422 also has a low-active set input connected to IN-0 signal 410. During the non VBI portion of signal 410, which tracks the pixel clock, flip-flop 422 is thus constantly being set at a rate slightly faster than its clock rate. Many of the 12 MHz pulses will create glitches in output 427 of flip-flop 422, however, depending upon the interaction with the pixel clock. For this reason, an extra flip-flip 428 follows flip flop 422. Flip-flop 428 receives output 427 as its data input, and is clocked and set by the same signals as flip-flop 422. Output 420 of flip-flop 428 is thus glitch free. When signal 410 stays high, during the VBI portion, 12 MHz clock signal 425 causes the low input to be propagated through, giving the flip flop outputs 427 and 420 a low level. In this manner the original /Blank signal 301 is restored as /Blank signal 420.

To restore the clock signal, IN-0 signal 410 is first delayed 10 ns by gate 423 to form D-CLK signal 426. The 10-ns delay is employed because D-CLK is also used to clock gates for decoding the signals which were originally encoded by the pixel clock, and these signals need some settling time. D-CLK signal 426 and 12 MHz clock signal 425 are then provided as the "1" and "0" inputs to mux 424, which is controlled by /Blank signal 420, to produce R-CLK signal 421. /Blank signal 420 thus selects the pixel clock portion of D_CLK signal 426 during the non-VBI portion. During the VBI portion, the RGB values are zero and no clock is strictly needed. However, the RAMDAC pixel data is pipelined, and to ensure the pipeline is flushed out, the 12 MHz clock signal 425' is selected by /Blank signal 420 during the VBI portion.

The third section of decoder 210 restores the pixel data signals P0–P5. D-CLK signal 426 is supplied as a latch enable to latches 431–433 and as a clock signal to dual flip-flops 441–443. The latches operate so that they pass their input signal through when the enable signal is high, and latch the input signal when the enable signal falls. The dual flip-flops are rising edge triggered by their clocks. IN-1 signal 411, IN-2 signal 412, and IN-3 signal 413 are gated by latches 441, 442, and 443, to produce intermediate L-IN-1 signal 451, L-IN-2 signal 452, and L-IN-3 signal 453, respectively. Intermediate signals 451–452 are thus offset from input signals 411–413. Signals 451 and 411, signals 452 and 412, and signals 453 and 413 are applied to the data inputs of flip-flops 441–443, respectively, which are clocked by D-CLK signal 426, to restore pixel data signals 460 and 461 (P0 and P1), 462 and 463 (P2 and P3), and 464 and 465 (P4 and P5), respectively.

The fourth section of decoder 210 restores the vertical and horizontal sync signals and the data transmit signal. This section employs three latches 471–473 whose data inputs are input signals 411–413, respectively. Each of latches are gated by a VBI signal 480 created by inverting VBI signal 420. Latches 471, 472, and 473 thus produce horizontal sync signal 491, vertical sync signal 492, and transmit data signal 493, respectively.

In the above described manner the pixel clock, pixel data signals, and VBI signal are restored for the RAMDAC, and the horizontal and vertical sync signals are restored for the VGA monitor, at the remote workstation. The IREF current reference signal is simply established by the base unit as a constant. The remaining signals required by the RAMDAC are constructed by the workstation microprocessor in response to data sent through the transmit data signal from the host computer. Communication between the host computer and remote workstation, via the transmit data signal and receive data signal, will now be discussed in detail. The following description of these communications is sufficient for an understanding of the present invention. Complete detail is available through reference to the accompanying Appendices A and B, which are Z-80 assembly language source code for the host controller microprocessor and workstation base unit microprocessor, respectively.

Data communications from the host to the remote workstation are carried through the transmit data signal one bit per pulse of the /Blank VBI signal, as shown in the timing diagram of FIG. 4. Data communicated from the workstation to the host on the receive data signal is carried at this rate as well. All communications are organized as bytes at the sending and receiving ends. The host computer controls the workstation through control codes and accompanying data. The control codes make take the hexadecimal values 00h to 0Fh, and are shown in Table I.

TABLE I

| Code | Meaning |
|---|---|
| 00h | Nop |
| 01h | Command |

TABLE I-continued

| Code | Meaning |
|---|---|
| 02h | Serial Data |
| 03h | Printer Data |
| 04h | Echo Data |
| 05h | (Reserved) |
| 06h | Serial Stop |
| 07h | (Reserved) |
| 08h | RAMDAC Data |
| 09h | (Reserved) |
| 0Ah | Serial Start |
| 0Bh | (Reserved) |
| 0Ch | (Reserved) |
| 0Dh | (Reserved) |
| 0Eh | Mark Character |
| 0Fh | Request WS Response |

The control codes Serial Data, Printer Data, Echo Data, and RAMDAC Data all establish a type of data to follow. The workstation microprocessor will treat all data thereafter as being of the indicated type, until a contrary control code is received. The control code range is strictly reserved for control codes. If a data value to be transmitted lies within the control code range, it must be OR'd with 80h and preceded by the Mark Character control code. When the workstation microprocessor receives a Mark Character control code, it AND's the next byte with 7Fh to produce the correct data value.

Of these data types the RAMDAC type is of particular relevance to the present invention. RAMDAC data is sent in four-byte packets consisting of one byte for each of the following: address, red value, green value, and blue value (RGB values). The workstation microprocessor then writes these values to the RAMDAC at the address specified.

Figure 8:
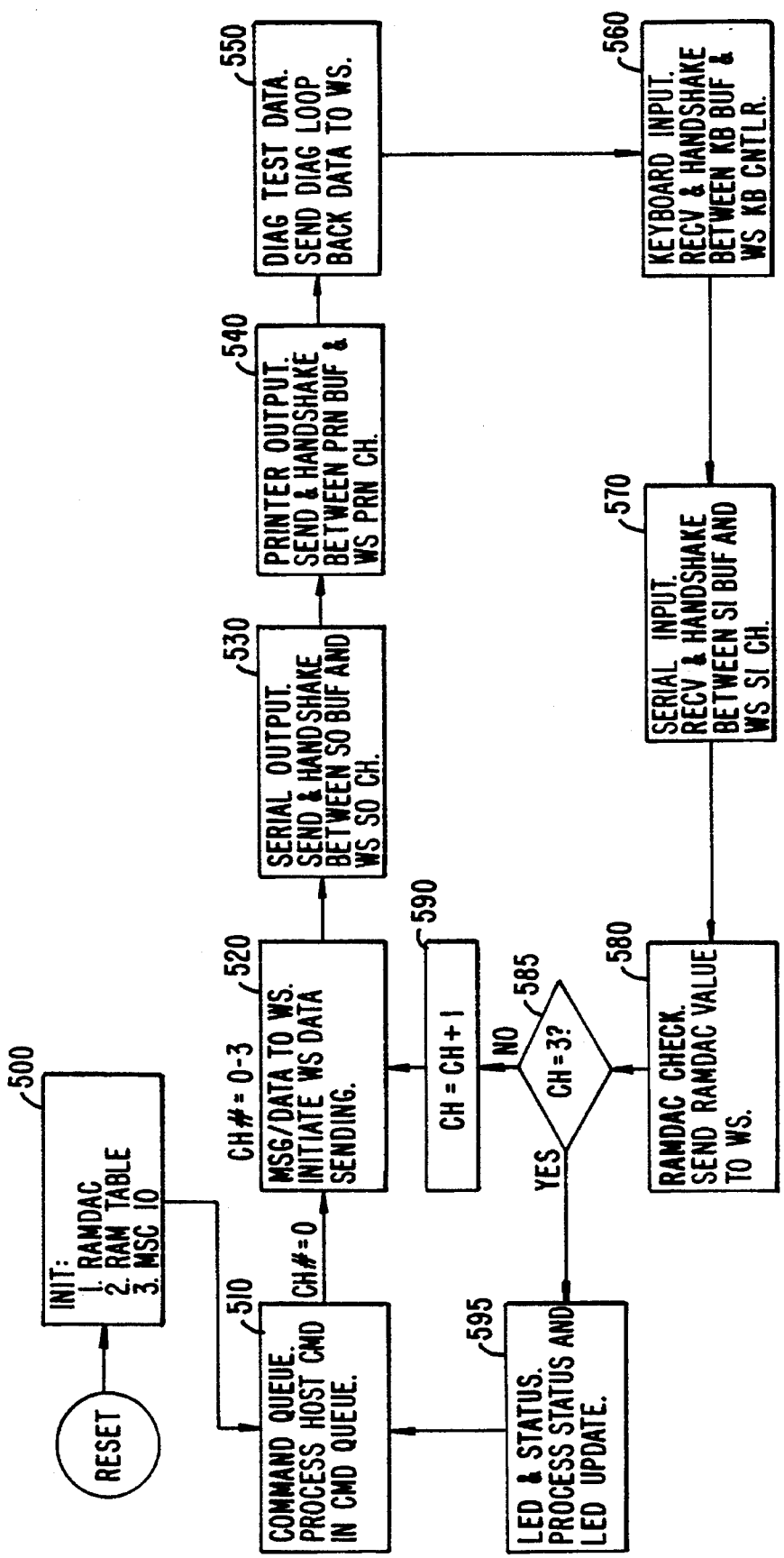
FIG. 8 is a flowchart of steps performed by the host controller microprocessor of FIG. 3.

A flowchart of steps performed by the host controller microprocessor is illustrated in FIG. 8. References to a handshake procedure refer to such procedures as telling a sending unit that a receiving buffer is full. Further details regarding the operation of the controller microprocessor, and its interaction with the host computer, may be found in Appendix C, which provides source code samples for interacting with the controller together with interface specifications for the same.

Referring to FIG. 8, from a reset state control first passes to block 500 for general initialization of memory areas and variables. Included in this initialization is setup, for each remote workstation channel, of two RAMDAC memory maps in dual port memory 140. One of these RAMDAC memory maps is for the host computer to write to, and the other is for the controller microprocessor to maintain the current state of the remote RAMDAC, as explained below. Each channel also has its own buffers for I/O, command processing, etc. Next, control passes to block 510 for processing of a host command, if any are present in a command queue, such as establishing communications details (baud rate, etc.) or controlling status lights on the remote workstation. Processing of many of the commands involves both the controller environment and the placement of a message for the workstation into a message buffer to await transmission. A channel variable is then set to zero, and control passes to block 520, which is the beginning of the controller idle/service loop. At block 520 the controller checks the message buffer, and if any packets are present transmission is begun. Next, at block 530, any serial output for the workstation is processed into a corresponding packet and placed in the message queue. Following this, at block 540 any printer output for the workstation is likewise processed into a message. After block 540, control passes to block 550, wherein any requested diagnostic information is packaged for transmission to the workstation.

After block 550, at block 560 any keyboard input from the remote workstation is processed. Block 570 follows, in which any serial input from the remote workstation is processed, similar to block 560. After block 570, the RAMDAC memory is checked for updates. When the host writes to the RAMDAC memory map, it can set a flag to indicate that the memory map contents have been updated. In response to such a flag, at this block the new RAMDAC information is packaged into a message for the workstation. Next, in block 585, the channel variable is checked to see if it is equal to three. If not, then control passes to block 590 at which the channel number is incremented before returning to block 520. In this manner the idle loop is performed for each channel. If the channel had been equal to three at block 585, control would have passed to block 595, where the current status is processed and workstation LEDs are updated as necessary. After block 595 control returns to block 510 to again process any commands.

Figure 9:
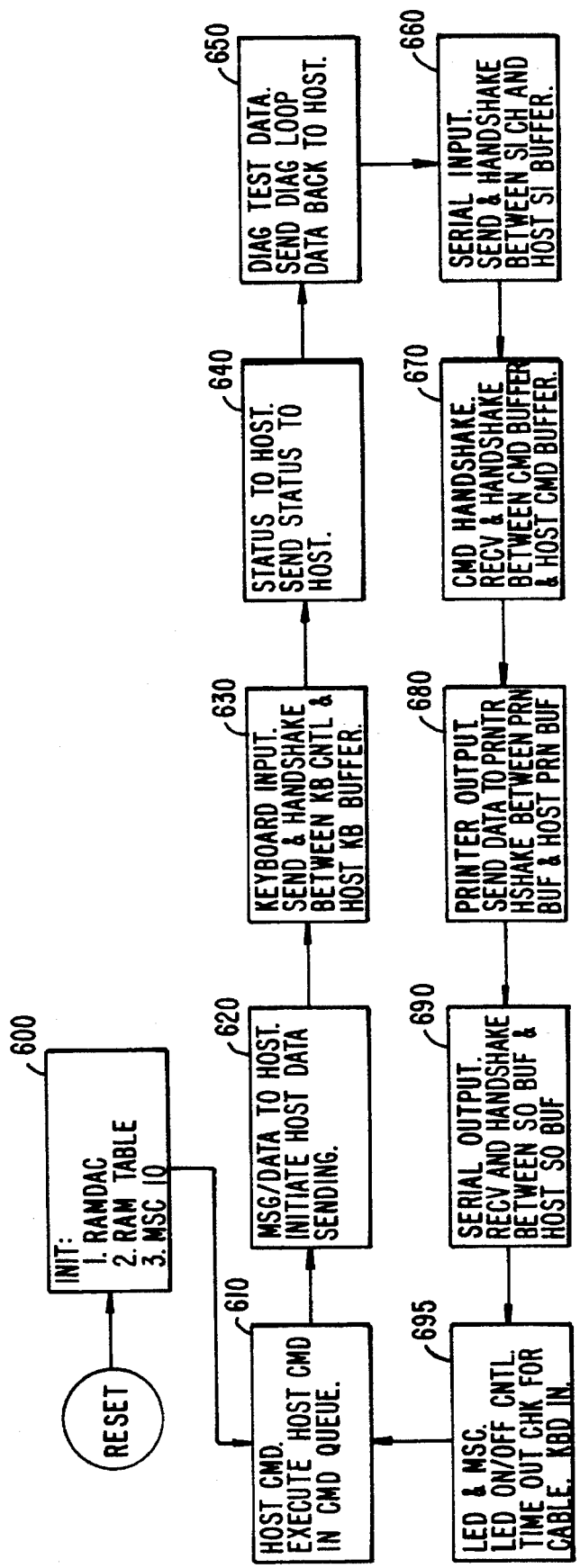
FIG. 9 is a flowchart of steps performed by the base unit microprocessor of FIG. 3.

The steps performed by the workstation microprocessor are similar to those performed by the controller microprocessor, and are illustrated by the flowchart of FIG. 9. Beginning from a reset state, at block 600 various memory locations are initialized, a RAMDAC memory map which is actually coupled to the RAMDAC. Next, at block 610, any host commands previously received through the transmit data line are processed. Following this, a message buffer is checked for any packets to be sent to the host/controller via the receive data line. Control next passes to block 630 to handle any keyboard input to the host. Next, at block 640, a workstation status is sent to the host, if requested. Control then passes to block 650, at which any diagnostic information is passed to the host. Next, at block 660, any serial input is passed on to the host. Following block 660, the receipt of any new commands from the host is handled at block 670. Next, any printer output data from the host is handled at block 680. Following this, at block 690 any serial output from the host is received and managed. The next step, at block 695, is to manage any LED manipulations and other miscellaneous commands, after which the processing loop is begun again at block 610.

It is to be understood that the above description is intended to be illustrative and not restrictive. Many embodiments will be apparent to those of skill in the art upon reviewing the above description. The scope of the invention should, therefore, be determined with reference to the appended claims, along with the full scope of equivalents to which such claims are entitled.

WORK.CON  TEST (CONTROLLER)

```
;--------------------------------------------------
;       I/O ADDRESS EQUATES
;--------------------------------------------------

UART0D:         EQU     0F8H            ;A2
UART0C:         EQU     UART0D+01H
UART1D:         EQU     UART0D+02H
UART1C:         EQU     UART0D+03H
UART2D:         EQU     0F4H            ;A3
UART2C:         EQU     UART2D+01H
UART3D:         EQU     UART2D+02H
UART3C:         EQU     UART2D+03H
UART4D:         EQU     0ECH            ;A4 FOR SH-6 & SH8
UART4C:         EQU     UART4D+01H
UART5D:         EQU     UART4D+02H
UART5C:         EQU     UART4D+03H
UART6D:         EQU     0DCH            ;A5 FOR SH-8
UART6C:         EQU     UART6D+01H
UART7D:         EQU     UART6D+02H
UART7C:         EQU     UART6D+03H

;--------------------------------------------------
;     constant definition
;--------------------------------------------------
bit0:           EQU     1
bit1:           EQU     2
bit2:           EQU     4
bit3:           EQU     8
bit4:           EQU     10H
bit5:           EQU     20H
bit6:           EQU     40H
bit7:           EQU     80H
;--------------------------------------------------
;     DATA CONSTANT DEFINITION
;--------------------------------------------------

QMINSZ:         EQU     100
ROMSIZE:        EQU     80H
MASK31:         EQU     01FH
MASK63:         EQU     03FH
SIHWMK:         EQU     0C0H
SILWMK:         EQU     020H

;--------------------------------------------------
;       COMMAND TYPE
;
;       00 - 0F : SYSTEM CONTROL DATA, NO USER DATA IS ALLOWED.
;       10 - FF : USER DATA REGION.
;--------------------------------------------------

;------ COMMAND SEND TO HWS

DT_NOP:         EQU     00H     ; NOP
CM_TYP:         EQU     01H     ; COMMAND
SO_TYP:         EQU     02H     ; SERIAL DATA
PO_TYP:         EQU     03H     ; PRINTER DATA
EC_TYP:         EQU     04H     ; ECHO DATA
ST_STP:         EQU     05H     ;
SI_STP:         EQU     06H     ; SERIAL STOP
KB_STP:         EQU     07H     ;
RM_TYP:         EQU     08H     ; RAMDAC DATA
ST_STR:         EQU     09H     ;
SI_STR:         EQU     0AH     ; SERIAL START
KB_STR:         EQU     0BH     ;
DT_RES2:        EQU     0CH     ;
DT_RES3:        EQU     0DH     ;
DT_MARK:        EQU     0EH     ; MARK CHAR
DT_ONL:         EQU     0FH     ; REQUEST HWS TO RESPONSE

;------ COMMAND RECEIVED FROM HWS

ST_TYP:         EQU     01H     ; STATUS.
SI_TYP:         EQU     02H     ; SERIAL DATA
KB_TYP:         EQU     03H     ; KEYBOARD DATA
CM_STP:         EQU     05H     ; COMMAND STOP
SO_STP:         EQU     06H     ; SERIAL STOP
PO_STP:         EQU     07H     ; PO STOP
CM_STR:         EQU     09H     ; COMMAND START
SO_STR:         EQU     0AH     ; SERIAL START
PO_STR:         EQU     0BH     ; PO START

;--------------------------------------------------
;       THE FOLLOWING CONSTANT TABLE IS DEFINED FOR EACH CHANNEL
```

```
;       FGOUT, FGINP, CTINP
;
;---------------------------------------------
B_CM_FUL:       EQU     0               ;CQ FULL STATE IN FGOUT
B_SO_FUL:       EQU     1               ;SO FULL STATE IN FGOUT
B_PO_FUL:       EQU     2               ;PO FULL STATE IN FGOUT
B_EC_FUL:       EQU     3               ;ECHO
B_CM_STP:       EQU     4               ;CQ STOP STATE IN FGOUT
B_SO_STP:       EQU     5               ;SO STOP STATE IN FGOUT
B_PO_STP:       EQU     6               ;PO STOP STATE IN FGOUT
B_RM_FUL:       EQU     7               ;RM FULL STATE IN FGOUT

B_ST_STR:       EQU     0               ;SQ START CMD
B_SI_STR:       EQU     1               ;SI START CMD
B_KB_STR:       EQU     2               ;
B_ST_STP:       EQU     4               ;SQ STOP CMD IN  FGINP
B_SI_STP:       EQU     5               ;SI STOP CMD IN  FGINP
B_KB_OVF:       EQU     6               ;KB OVERFLOW CMD

B_PEND:         EQU     7               ;COMMAND PENDING IN FGINP

CNT_CMD:        EQU     2
CNT_ST:         EQU     4
CNT_SO:         EQU     32
CNT_PO:         EQU     32
CNT_RM:         EQU     4

;---------------------------------------------
;       SH-8 MEMORY MAP
;---------------------------------------------

;       FFFF            Z80 USE
;       FE00
;       FD00            SH-8 POINTER & REGISTER
;       FC00            SS-8 POINTER & REGISTER
;       FB00            ECHO LOOP BACK BUFFER
;       FA00            KEYBOARD INPUT BUFFER
;       F900            SH-8 STATUS BUFFER
;       F800            SH-8 STATUS BUFFER
;       F700            SS-8 STATUS BUFFER
;       F600            SS-8 STATUS BUFFER
;       F500            COMMAND BUFFER
;       F400            COMMAND BUFFER
;       F300            COMMAND BUFFER
;       F200            COMMAND BUFFER
;       F100            Z80 RESERVE (VARIABLE)
;       F000            Z80 RESERVE (VARIABLE)
;
;       E800            CMD BUFFER              256
;       E000            TXD BUFFER              256
;       D800            HANDSHAKE BUFFER        256
;       D000            SERIAL INPUT BUFFER     256
;       C800            VGA STATION RAM DAC     256 = 64 X 3
;       C000            VIDEO RAM DAC BUFFER    256 = 64 X 3
;       A000            SERIAL OUTPUT BUFFER    1024
;       8000            PRINTER BUFFER          1024

;---------------------------------------------
;       FOR EACH CHANNEL THERE ARE 8 QUEUES FOR IT
;---------------------------------------------

;       NAME            BYTES   ADDR
;       ==========================================
;       1. KI  BUFFER    32     FA00 - FAFF
;       2. EC  BUFFER    32     FB00 - FBFF
;       3. CMD BUFFER   256     E800 - EFFF
;       4. TXD BUFFER   256     E000 - E7FF
;       5  HS  BUFFER   256     D800 - DFFF
;       6. SI  BUFFER   256     D000 - D7FF
;       7. SO  BUFFER  1024     A000 - BFFF
;       8. PO  BUFFER  1024     8000 - 9FFF

;---------------------------------------------
;       VARIABLE MEMORY ADDRESS ASSIGNMENT
;---------------------------------------------
RAMADDR:        EQU     08000H
IDADDR:         EQU     0F100H
  ID_LO:        EQU     34H
  ID_HI:        EQU     12H
INT_VT:         EQU     0F000H          ;VECTOR TABLE AREA
ONEBYTE:        EQU     0F040H          ;60H BYTES
HIKB:           EQU     0FAH            ;KI QUE MSB ADDRESS
HIEC:           EQU     0FBH            ;ECHO DATA
SS8BASE:        EQU     0FC00H          ;100H BYTES
SH8KBASE:       EQU     0FD00H          ;80H
SHSIGADR:       EQU     0FE00H          ;
SSSIGADR:       EQU     0FE40H          ;30H BYTES
PORTNUM:        EQU     0FE43H          ;PORT #
```

```
STACKTOP:        EQU      0FFFFH          ;TOP OF THE STACK

;------------------------------------------------
;
;       INTERRUPT TABLE IN RAM ADDRESS
;       00=TX, 02=EX, 04=RX, 06=ER
;
;       F000H
;
;------------------------------------------------

INT_VT0:         EQU      INT_VT+008H
INT_VT1:         EQU      INT_VT+000H
INT_VT2:         EQU      INT_VT+018H
INT_VT3:         EQU      INT_VT+010H
INT_VT4:         EQU      INT_VT+028H
INT_VT5:         EQU      INT_VT+020H
INT_VT6:         EQU      INT_VT+038H
INT_VT7:         EQU      INT_VT+030H
VEC_TX:          EQU      0
VEC_EX:          EQU      2
VEC_RX:          EQU      4
VEC_ER:          EQU      6

;------------------------------------------------
;
;       Z80 VARIABLE ADDRESS EQUATE
;
;       ONE BYTE & TWO BYTE
;
;------------------------------------------------
                 ORG      ONEBYTE

WORKCMD:         DS       1       ;TEMP STORAGE FOR CMD
WORKCHAN:        DS       1       ;TEMP STORAGE FOR CH #
WORKBYT1:        DS       1       ;TEMP STORAGE FOR CMD
WORKBYT2:        DS       1       ;TEMP STORAGE FOR CMD
ERRDCD:          DS       1       ;ST Q NOT EMPTY FLAG
ERRBRK:          DS       1       ;ST Q NOT EMPTY FLAG
ERRROM:          DS       1       ;ST Q NOT EMPTY FLAG
ONLCNT0:         DS       1       ;ON LINE CHAR CNT
ONLCNT1:         DS       1
ONLCNT2:         DS       1
ONLCNT3:         DS       1
ONLCNT4:         DS       1
ONLCNT5:         DS       1
ONLCNT6:         DS       1
ONLCNT7:         DS       1
istrip0:         ds       1       ;input strip msb flag
istrip1:         ds       1
istrip2:         ds       1
istrip3:         ds       1
istrip4:         ds       1
istrip5:         ds       1
istrip6:         ds       1
istrip7:         ds       1

QSZS00:          DS       2       ;SERIAL OUTPUT QUEUE SIZE
QSZS01:          DS       2
QSZS02:          DS       2
QSZS03:          DS       2
QSZS04:          DS       2
QSZS05:          DS       2
QSZS06:          DS       2
QSZS07:          DS       2
QSZP00:          DS       2       ;PARALLEL OUTPUT QUEUE SIZE
QSZP01:          DS       2
QSZP02:          DS       2
QSZP03:          DS       2
QSZP04:          DS       2
QSZP05:          DS       2
QSZP06:          DS       2
QSZP07:          DS       2
ONLZCNT0:        DS       1       ;ON LINE ZERO RECEIVED CNT
ONLZCNT1:        DS       1
ONLZCNT2:        DS       1
ONLZCNT3:        DS       1
ONLZCNT4:        DS       1
ONLZCNT5:        DS       1
ONLZCNT6:        DS       1
ONLZCNT7:        DS       1
CNTDAC0:         DS       1       ;CNT FOR DAC DATA SEND
CNTDAC1:         DS       1
CNTDAC2:         DS       1
CNTDAC3:         DS       1
CNTDAC4:         DS       1
CNTDAC5:         DS       1
CNTDAC6:         DS       1
CNTDAC7:         DS       1
```

```
;----------------------------------------------------
;
;       SS-8 VARIABLE ADDRESS EQUATE
;
;       FC00H
;
;----------------------------------------------------

SS8QTAB:        MACRO
TBBASO$0:       EQU     SS8BASE+0$00H
TBEASO$0:       EQU     SS8BASE+0$02H
TBHASO$0:       EQU     SS8BASE+0$04H
TBTLSO$0:       EQU     SS8BASE+0$06H
TBBASI$0:       EQU     SS8BASE+0$08H
TBEASI$0:       EQU     SS8BASE+0$0AH
TBHASI$0:       EQU     SS8BASE+0$0CH
TBTLSI$0:       EQU     SS8BASE+0$0EH
TCHBUD$0:       EQU     SS8BASE+090H+$0*5
TCHCFG$0:       EQU     SS8BASE+091H+$0*5
TCHSRT$0:       EQU     SS8BASE+092H+$0*5
TCHSTP$0:       EQU     SS8BASE+093H+$0*5
TCHHSK$0:       EQU     SS8BASE+094H+$0*5
                MACND

SS8QTAB 0
                SS8QTAB 1
                SS8QTAB 2
                SS8QTAB 3
                SS8QTAB 4
                SS8QTAB 5
                SS8QTAB 6
                SS8QTAB 7

TBBACMD:        EQU     SS8BASE+080H
TBEACMD:        EQU     SS8BASE+082H
TBHACMD:        EQU     SS8BASE+084H
TBTLCMD:        EQU     SS8BASE+086H
TBBASTA:        EQU     SS8BASE+088H
TBEASTA:        EQU     SS8BASE+08AH
TBHASTA:        EQU     SS8BASE+08CH
TBTLSTA:        EQU     SS8BASE+08EH

;----------------------------------------------------------------------
;
;       SERIAL STATUS AL AND AH INT 14 EMULATION
;
; AL    7       6       5       4       3       2       1       0
;       ----------------------------------------------------------
; =1    DCD     RI      DSR     CTS     DCD     NA      DSR     CTS
;                                       CHANGE  CHANGE  CHAGNE  CHAGNE
;
; AH    7       6       5       4       3       2       1       0
;       ----------------------------------------------------------
; =1    TIME    TXQ     TXQ     BREAK   FE      PE      OE      DATA
;       OUT     EMPTY   EMPTY                                   READY
;
;----------------------------------------------------------------------

;SSAL0:         EQU     SS8BASE+0C0H
;SSAL1:         EQU     SS8BASE+0C1H
;SSAL2:         EQU     SS8BASE+0C2H
;SSAL3:         EQU     SS8BASE+0C3H
;SSAL4:         EQU     SS8BASE+0C4H
;SSAL5:         EQU     SS8BASE+0C5H
;SSAL6:         EQU     SS8BASE+0C6H
;SSAL7:         EQU     SS8BASE+0C7H
;SSAH0:         EQU     SS8BASE+0C8H
;SSAH1:         EQU     SS8BASE+0C9H
;SSAH2:         EQU     SS8BASE+0CAH
;SSAH3:         EQU     SS8BASE+0CBH
;SSAH4:         EQU     SS8BASE+0CCH
;SSAH5:         EQU     SS8BASE+0CDH
;SSAH6:         EQU     SS8BASE+0CEH
;SSAH7:         EQU     SS8BASE+0CFH

FGTXACT:        EQU     SS8BASE+0E0H
FGSISTA:        EQU     SS8BASE+0E1H
FGDTR:          EQU     SS8BASE+0E2H
FGDCD:          EQU     SS8BASE+0E3H
FGRTS:          EQU     SS8BASE+0E4H
FGCTS:          EQU     SS8BASE+0E5H
FGBRK:          EQU     SS8BASE+0E6H
ERRRAM:         EQU     SS8BASE+0E7H
```

```
SINEM0:     EQU     SS8BASE+0F0H
SINEM1:     EQU     SS8BASE+0F1H
SINEM2:     EQU     SS8BASE+0F2H
SINEM3:     EQU     SS8BASE+0F3H
SINEM4:     EQU     SS8BASE+0F4H
SINEM5:     EQU     SS8BASE+0F5H
SINEM6:     EQU     SS8BASE+0F6H
SINEM7:     EQU     SS8BASE+0F7H

FGENBS:     EQU     SS8BASE+0F9H
FGSIQNEM:   EQU     SS8BASE+0FAH
FGSOQNFL:   EQU     SS8BASE+0FCH
DISKOLD:    EQU     SS8BASE+0FDH            ;SH4 ONLY
FGBRDSTA:   EQU     SS8BASE+0FEH
DISKLED:    EQU     SS8BASE+0FFH            ;SH4 ONLY
;--------------------------------------------------
;
;       SH-8 VARIABLE ADDRESS EQUATE
;
;       FD00H
;
;--------------------------------------------------
;
KBHA:       EQU     00H             ;KEYBOARD QUEUE HEAD LSB
KBTL:       EQU     01H             ;KEYBOARD QUEUE TAIL LSB
TXHA:       EQU     02H             ;TX QUEUE HEAD LSB
TXTL:       EQU     03H             ;TX QUEUE TAIL LSB
CMHA:       EQU     04H             ;COMMAND QUEUE HEAD LSB
CMTL:       EQU     05H             ;COMMAND QUEUE TAIL LSB
HSHA:       EQU     06H             ;HANDSHAKE QUE HEAD PTR
HSTL:       EQU     07H             ;HANDSHAKE QUE TAIL PTR
FGOUT:      EQU     08H             ;OUTPUT QUEUE STATE
FGINP:      EQU     09H             ;INPUT QUEUE STATE
RDMASK:     EQU     0AH             ;INPUT DATA MASK BYTE
RXDSW:      EQU     0BH             ;RX CH OUTPUT SWITCH
ECHA:       EQU     0CH             ;ECHO QUEUE HEADER
ECTL:       EQU     0DH             ;ECHO QUEUE TAIL
ECRTL:      EQU     0EH             ;
;TATA:      EQU     0FH             ;
TBBAPO:     EQU     10H
TBEAPO:     EQU     12H
TBHAPO:     EQU     14H
TBTLPO:     EQU     16H
;TATA:      EQU     18H             ;
;TATA:      EQU     19H             ;
TBDAC:      EQU     1AH             ;RAM DAC BUFFER ADDRESS
FGDAC:      EQU     1CH             ;RAMDAC BUFFER FLAG = 0 OWN BY 386
                                    ; = 1, OWN BY Z80.
STATA:      EQU     1DH             ;
STATB:      EQU     1EH             ;
KBNEM:      EQU     1FH

;--------------------------------------------------------------------------
;               7       6       5       4       3       2       1       0
;--------------------------------------------------------------------------
; STAT A =1     ROM     RAM     TXQ     HWS     FIRMWARE REVISION (3-0)
;               FAIL    FAIL    OVERRUN ONLINE
;--------------------------------------------------------------------------
; STAT B =1                             PRINTER PRINTER PRINTER
;                                       P OUT   SELECT  ERROR
;--------------------------------------------------------------------------

SH8KTAB:    MACRO
KEOFF$0:    EQU     $0 * 20H                ;HI NIBBLE OF KBD AND ECHO CMD
HIHS$0:     EQU     0D8H+$0H                ;HANDSHAKE QUEUE MSB ADDRESS
HITX$0:     EQU     0E0H+$0H                ;TX QUE MSB ADDRESS
HICM$0:     EQU     0E8H+$0H                ;CM QUE MSB ADDRESS
KBHA$0:     EQU     SH8KBASE+00H+$0*20H     ;KEYBOARD QUEUE HEAD LSB
KBTL$0:     EQU     SH8KBASE+01H+$0*20H     ;KEYBOARD QUEUE TAIL LSB
TXHA$0:     EQU     SH8KBASE+02H+$0*20H     ;TX QUEUE HEAD LSB
TXTL$0:     EQU     SH8KBASE+03H+$0*20H     ;TX QUEUE TAIL LSB
CMHA$0:     EQU     SH8KBASE+04H+$0*20H     ;COMMAND QUEUE HEAD LSB
CMTL$0:     EQU     SH8KBASE+05H+$0*20H     ;COMMAND QUEUE TAIL LSB
HSHA$0:     EQU     SH8KBASE+06H+$0*20H     ;HANDSHAKE QUE HEAD PTR
HSTL$0:     EQU     SH8KBASE+07H+$0*20H     ;HANDSHAKE QUE TAIL PTR
FGOUT$0:    EQU     SH8KBASE+08H+$0*20H     ;OUTPUT QUEUE STATE
FGINP$0:    EQU     SH8KBASE+09H+$0*20H     ;INPUT QUEUE STATE
RDMASK$0:   EQU     SH8KBASE+0AH+$0*20H     ;INPUT DATA MASK BYTE
RXDSW$0:    EQU     SH8KBASE+0BH+$0*20H     ;RX CH OUTPUT SWITCH
ECHA$0:     EQU     SH8KBASE+0CH+$0*20H     ;ECHO QUEUE HEADER
ECTL$0:     EQU     SH8KBASE+0DH+$0*20H     ;ECHO QUEUE TAIL
ECRTL$0:    EQU     SH8KBASE+0EH+$0*20H     ;
;TATB$0:    EQU     SH8KBASE+0FH+$0*20H     ;
TBBAPO$0:   EQU     SH8KBASE+10H+$0*20H
TBEAPO$0:   EQU     SH8KBASE+12H+$0*20H
TBHAPO$0:   EQU     SH8KBASE+14H+$0*20H
TBTLPO$0:   EQU     SH8KBASE+16H+$0*20H
```

```
;TATA$0:    EQU    SH8KBASE+18H+$0*20H    ;
;TATA$0:    EQU    SH8KBASE+19H+$0*20H    ;
TBDAC$0:    EQU    SH8KBASE+1AH+$0*20H    ;RAMDAC BUFFER ADDRESS
FGDAC$0:    EQU    SH8KBASE+1CH+$0*20H    ;RAMDAC OWNER FLAG
STATA$0:    EQU    SH8KBASE+1DH+$0*20H    ;
STATB$0:    EQU    SH8KBASE+1EH+$0*20H    ;
KBNEM$0:    EQU    SH8KBASE+1FH+$0*20H    ;
            MACND

SH8KTAB 0
            SH8KTAB 1
            SH8KTAB 2
            SH8KTAB 3
            SH8KTAB 4
            SH8KTAB 5
            SH8KTAB 6
            SH8KTAB 7
```

WDE INC

```
;---------------------------------------
;       SH4 FIRMWARE COPYRIGHT MAXPEED CO
;---------------------------------------
;---------------------------------------
;
; IDLE LOOP TX DATA AND COMMAND OUTPUT ROUTINE
; ALL COMMAND QUEUE'S DATA ARE PREPROCESSED
; TX QUE HAS ENOUGH ROOM TO HOLD DATA NO NEED TO CHECK
;
;---------------------------------------

IDTX:   MACRO

; 1ST CHECK TX QUEUE NEED TO START SENDING DATA OR NOT

LD      IY,KBHA$0
        BIT     4,(IY+STATA)    ;
        JR      NZ,IDTX04=
        LD      (IY+CMHA),0     ;RESET HEAD
        LD      (IY+CMTL),0     ;RESET TAIL
        JP      IDEXIT$0        ;DO NOTHING
IDTX04=:
        LD      HL,FGTXACT
        BIT     $0,(HL)
        JR      NZ,IDTX1=       ;IF TX IS ON -> SKIP
        LD      A,(IY+TXTL)
        CP      (IY+TXHA)       ;COMP TX QUEUE HEAD AND TAIL
        JR      NZ,IDTX03=

RES     B_CM_FUL,(IY+FGOUT)             ;0 = CM
        RES     B_SO_FUL,(IY+FGOUT)             ;1 = SO
        RES     B_PO_FUL,(IY+FGOUT)             ;2 = PO
        RES     B_EC_FUL,(IY+FGOUT)             ;3 = EC
        RES     B_RM_FUL,(IY+FGOUT)             ;7 = RM
        JR      IDTXT=                          ;TX IS EMPTY -> SKIP

IDTX03=:
        LD      E,A             ;MOV TAIL TO L
        LD      D,HITX$0        ;LOAD HIGH BYTE ADDRESS FOR TX CH
        LD      A,(DE)          ;LOAD DATA TO BE SENT
        INC     E
        LD      (IY+TXTL),E     ;SAVE NEW TAIL PTR
        DI
        SET     $0,(HL)
        EI
        OUT     (UART$0D),A
        CP      PO_TYP + 1
        JR      NC,IDTX1=
        LD      HL,FGOUT$0
        CP      CM_TYP
        JR      NZ,IDTX00=
        RES     B_CM_FUL,(HL)           ;1 = CM
        JR      IDTXT=
IDTX00=:
        CP      SO_TYP
        JR      NZ,IDTX01=
        RES     B_SO_FUL,(HL)           ;2 = SO
        JR      IDTXT=
IDTX01=:
        CP      PO_TYP
        JR      NZ,IDTX02=
        RES     B_PO_FUL,(HL)           ;3 = PO
        JR      IDTXT=
IDTX02=:
        CP      EC_TYP
        JR      NZ,IDTX05=
        RES     B_EC_FUL,(HL)           ;4 = EC
        JR      IDTXT=
IDTX05=:
        CP      RM_TYP
        JR      NZ,IDTX1=
        RES     B_RM_FUL,(HL)           ;8 = RM

;------ CHECK COMMAND QUEUE FOR ANY DATA TO BE COPIED TO TX QUEUE

IDTX1=:
        LD      A,(IY+CMTL)
        CP      (IY+CMHA)
        JR      Z,IDTX3=        ;IF CMD QUEUE IS EMPTY

BIT     B_CM_FUL,(IY + FGOUT)
        JR      NZ,IDTX3=                       ;IF FULL
        BIT     B_CM_STP,(IY + FGOUT)
        JR      NZ,IDTX3=                       ;IF STOP
                                                ; -> JUMP

; START COPY DATA FROM COMMAND QUEUE TO TX QUEUE
;
```

```
              LD       B,CNT_CMD
              LD       E,(IY + CMTL)
              LD       D,HICM$O          ;DE = COMMAND TAIL (SOURCE)
              LD       L,(IY + TXHA)
              LD       H,HITX$O          ;HL = TX HEAD (DEST)
              LD       A,CM_TYP          ;LOAD TYPE INTO CMQ
              LD       (HL),A            ;STORE COMMAND TYPE INTO TX Q
              INC      L
IDTX2=:
              LD       A,(DE)            ;LOAD CMD
              CP       10H
              JR       NC,IDTX20=
              LD       (HL),DT_MARK
              INC      L
              OR       80H
IDTX20=:
              LD       (HL),A            ;STORE INTO TX Q
              INC      L
              INC      E
              DJNZ     IDTX2=

;------ SET COMMAND FULL FLAG

SET      B_CM_FUL,(IY+ FGOUT)
              LD       (IY + TXHA),L     ;TX HEAD
              LD       (IY + CMTL),E     ;CMD TAIL
IDTX3=:
              MACND

;----------------------------------------
;
; IDLE LOOP FOR PRINTER OUTPUT OR SERIAL OUTPUT
; PSCOPY NEED TWO PARAMETER
; NEED TO PUT MARKER FOR DATA WHICH IS < 10H
;
; EX: PSCOPY  PO,1      FOR PO CH # 1
; EX: PSCOPY  SO,3      FOR SO CH # 3
;
;----------------------------------------

PSCOPY: MACRO

BIT      B_$O_FUL,(IY + FGOUT)
              JR       NZ,PSEND=                  ;IF FULL
              BIT      B_$O_STP,(IY + FGOUT)
              JR       NZ,PSEND=                  ;IF STOP
                                                  ; -> JUMP
              OR       A                          ;CLEAR CF
PSCP0=:
              LD       A,(TBHA$O$1+1)
              LD       HL,(TBHA$O$1)              ;HEAD
              XOR      H
              JR       NZ,PSCP0=
              LD       DE,(TBTL$O$1)              ;TAIL
              SBC      HL,DE
              JR       Z,PSEND=                   ;IF EMPTY -> JUMP
              JR       NC,PSCP1=
              LD       BC,(QSZ$O$1)
              ADD      HL,BC                      ;# OF CHAR IN SO QUEUE
PSCP1=:
              PUSH     HL
              LD       BC,CNT_$O
              SBC      HL,BC
              POP      BC
              JR       C,PSCP2=
              LD       BC,CNT_$O                  ;TOTAL XFER CNT
PSCP2=:
              LD       B,C                        ;GET COUNT
              LD       L,(IY + TXHA)     ;TX HEAD
              LD       H,HITX$1          ;HL = TX HEAD
              LD       A,$O_TYP
              LD       (HL),A
              INC      L
PSCP3=:
              LD       A,(DE)
              CP       10H
              JR       NC,PSCP4=
              LD       (HL),DT_MARK
              INC      L
              OR       80H               ;SET 80H FOR SPECIAL DATA BYTE
PSCP4=:
              LD       (HL),A
              INC      L
              INC      DE
              LD       A,E
              OR       A
              JR       NZ,PSCP5=
              LD       A,(TBEA$O$1+1)
              INC      A
              CP       D
```

```
                JR      NZ,PSCP5=
                LD      A,(TBBA$0$1+1)
                LD      D,A
PSCP5=:
                DJNZ    PSCP3=

SET     B_$0_FUL,(IY+ FGOUT)
                LD      (IY + TXHA),L           ;TX HEAD
                XOR     A
                LD      (TBTL$0$1+1),A          ;$0 TAIL
                LD      (TBTL$0$1),DE           ;$0 TAIL

PSEND=:
                MACND

;----------------------------------------
;
; IDLE RAMDAC UPDATE ROUTINE
;       1. COMPARE RAMDAC DATA IN TBDAC AND TBDAC_SAV (VGA STATION'S VALUE)
;          IF COMPARE OK -> NEXT ADDRESS ELSE SEND THIS ADDRESS'S RAMDAC VALUE
;          TO VGA MAXSTATION.
;
;----------------------------------------
IDRM:   MACRO
                LD      A,(FGDAC$0)
                OR      A
                JR      Z,IDRM9=
                BIT     B_RM_FUL,(IY + FGOUT)
                JR      NZ,IDRM9=               ;IF STOP -> JUMP
                LD      A,(CNTDAC$0)
                LD      HL,(TBDAC$0)
                LD      E,(IY + TXHA)           ;TX HEAD
                LD      D,HITX$0                ;HL = TX HEAD
                CALL    IDRMS
                OR      A
                JR      NZ,IDRM1=
                LD      (FGDAC$0),A
IDRM1=:
                LD      (CNTDAC$0),A
IDRM9=:
                MACND

;----------------------------------------
;
; IDLE LOOP ECHO ROUTINE FOR STATUS
;
;----------------------------------------
IDEC:   MACRO
                LD      A,(IY+ECHA)
                SUB     (IY+ECTL)
                JR      Z,IDEC99=               ;IF QUE EMPTY
                BIT     B_EC_FUL,(IY+FGOUT)
                JR      NZ,IDEC99=              ;IF PIPE FUL
                CP      8
                LD      B,A
                JR      C,IDEC1=
                LD      B,8
IDEC1=:
                LD      A,(IY+ECTL)             ;GET TAIL
                AND     MASK31
                OR      KEOFF$0                 ;OR HI NIBBLE
                LD      E,A
                LD      D,HIEC
                LD      L,(IY+TXHA)
                LD      H,HITX$0
                LD      A,EC_TYP
                LD      (HL),A
                INC     L
IDEC2=:
                LD      A,(DE)
                CP      10H
                JR      NC,IDEC3=
                LD      (HL),DT_MARK
                INC     L
                OR      80H
IDEC3=:
                LD      (HL),A
                INC     L
                LD      A,E
                INC     A
                AND     MASK31
                OR      KEOFF$0                 ;OR HI NIBBLE
                LD      E,A
                DJNZ    IDEC2=
                LD      A,E
                AND     MASK31
                LD      (IY+ECTL),A
                LD      (IY+TXHA),L
                SET     B_EC_FUL,(IY+FGOUT)
IDEC99=:
                MACND
```

```
;---------------------------------------
;
; IDLE LOOP INPUT ROUTINE FOR KEYBOARD
;
;---------------------------------------

IDKI:        MACRO
        LD      A,(KBHA$0)              ;HEAD POINTER
        SUB     (IY + KBTL)             ;HEAD - TAIL
        LD      HL,KBNEM$0
        JR      NZ,IDKI1=               ;IF NOT EMPTY
        LD      (HL),0                  ;RESET KB NOT EMPTY FLAG
        JR      IDKI2=
IDKI1=:
        LD      (HL),0FFH               ;SET KB NOT EMPTY FLAG
IDKI2=:
        BIT     B_KB_OVF, (IY+FGINP)    ;CHECK OVERFLOW FLAG
        JR      Z,IKIEN=                ;TEST OVERFLOW
        RES     B_KB_OVF, (IY+FGINP)    ;CLEAR OVERFLOW FLAG
        LD      L,(IY+TXHA)
        LD      H,HITX$0
        LD      (HL),CM_TYP             ;LOAD LSB OF CMD QUE
        INC     L
        LD      (HL),2BH                ;WRITE BEEPER CMD
        INC     L
        LD      (HL),81H                ;1 SHORT BEEP
        INC     L
        LD      (IY+TXHA),L             ;LOAD LSB OF TX QUE
IKIEN=:
        MACND

;----------------------------------------------------
;
; IDLE LOOP SERIAL INPUT DATA ROUTINE
;
;----------------------------------------------------
IDSI:        MACRO
        LD      A,(TBHASI$0)            ;LOAD HEAD POINTER
        LD      HL,TBTLSI$0
        SUB     (HL)
        LD      B,A
        LD      HL,FGSIQNEM             ;for unix only
        JR      Z,IDSI1=
        LD      A,0FFH
        LD      (SINEM$0),A             ;SET CH 0 NOT EMPTY FG = FF
        SET     $0,(HL)                 ;for unix only
        JR      IDSI11=
IDSI1=:
        LD      A,0
        LD      (SINEM$0),A             ;SET CH 0 NOT EMPTY FG = 0
        RES     $0,(HL)                 ;for unix only
IDSI11=:
        LD      A,B
        BIT     B_SI_STP,(IY + FGINP)   ;TEST SI CHANNEL START/STOP
        JR      NZ,IDSI2=               ;   IF STOPPED -> JUMP
        CP      SIHWMK                  ;SI IS ON CHECK HIGH WATER MARK
        JR      C,IDSI4=

;------ SEND STOP CMD

SET     B_SI_STP,(IY + FGINP)   ;SET STOP FLAG IN FGINP
        LD      L,(IY+HSHA)             ;LOAD LSB OF HANDSHAKE QUE
        LD      H,HIHS$0
        LD      (HL),SI_STP
        INC     L
        LD      (IY+HSHA),L             ;LOAD LSB OF HANDSHAKE QUE
        JR      IDSI3=
IDSI2=:
        CP      SILWMK                  ;SI IS OFF CHECK LOW WATER MARK
        JR      NC,IDSI4=               ;HIGHER THEN LWMK -> LEAVE IT ALONE

;------ SEND START CMD

RES     B_SI_STP,(IY + FGINP)   ;RESET STOP FLAG IN FGINP
        LD      L,(IY+HSHA)             ;LOAD LSB OF HANDSHAKE QUE
        LD      H,HIHS$0
        LD      (HL),SI_STR
        INC     L
        LD      (IY+HSHA),L             ;LOAD LSB OF HANDSHAKE QUE

IDSI3=:
        SET     B_PEND,(IY + FGINP)     ;SET COMMAND PENDING FLAG

;------ IS TIME TO CHECK COMMAND PEND OR NOT IF YES THEN DO IT NOW

IDSI4=:
        BIT     B_PEND,(IY + FGINP)     ;TEST COMMAND PENDING FLAG
        JR      Z,IDSIEN=
        RES     B_PEND,(IY + FGINP)     ;RESET COMMAND PENDING FLAG
```

```
            LD      HL,FGTXACT
            BIT     $0,(HL)               ;TEST TX ACTIVE ?
            JR      NZ,IDSI6=             ;IF ACTIVE -> JUMP
            LD      E,(IY+HSTL)           ;TAIL PTR
            LD      D,HIHS$0
            LD      A,(DE)
            INC     E
            LD      (IY+HSTL),E           ;NEW TAIL PTR
            DI
            SET     $0,(HL)               ;SET TX ACTIVE FLAG
            OUT     (UART$0D),A           ;SEND START CMD
IDSI6=:
            LD      HL,INT_HS$0
            DI
            LD      (INT_VT$0 + VEC_TX),HL            ;CHANGE TX INT PRGM
            EI
IDSIEN=:
            MACND

;--------------------------------------------------------
;   IDLE COMMAND CHECK COMMAND QUEUE FULL OR NOT
;       IY = WRKTBL
;
;--------------------------------------------------------

IDCMDQCK:   MACRO
            LD      L,(IY + WKSHAD)
            LD      H,(IY + WKSHAD + 1)   ;HL = KBHA
            LD      A,CMHA
            ADD     A,L
            LD      L,A
            LD      A,(HL)                ;LOAD COMMAND HEAD LOW BYTE
            INC     HL                    ;POINT TO CMD TAIL
            SUB     (HL)
            ADD     A,5
            JP      C,IDCMDEN2            ;BUFFER OVERFLOW
            DEC     HL
            LD      L,(HL)                ;LOAD CMD HD PT LOW BYTE
            LD      H,(IY + WKCMHI)       ;HL = COMMAND HEAD PT HI BYTE
            MACND

HEADDX:     MACRO
            LD      L,(IY + WKSHAD)
            LD      H,(IY + WKSHAD + 1)   ;HL = KBHA
            LD      A,$0
            ADD     A,L
            LD      L,A
            MACND

;--------------------------------------------------------
;
;       INTERRUPT SERVICE ROUTINE
;
;--------------------------------------------------------
;--------------------------------------------------------
;   TX INTERRUPT SERVICE ROUTINE
;--------------------------------------------------------

URTXINT:    MACRO
            EX      AF,AF
            EXX
            LD      HL,TXTL$0             ;HL = TAIL ADDRESS
            LD      A,(TXHA$0)            ;A=HEAD
            CP      (HL)                  ;COMP TAIL AND HEAD
            JR      NZ,TX1=
            LD      A,5
            OUT     (UART$0C),A           ;SELECT RERG 5
            LD      A,0E8H
            OUT     (UART$0C),A           ;CLEAR BREAK CMD
            LD      A,28H                 ; AT HERE TX Q IS EMPTY
            OUT     (UART$0C),A           ;RESET PENDING TX INT
            LD      HL,FGTXACT
            RES     $0,(HL)               ;RESET TX ACTIVE FLAG
            JR      TX2=
TX1=:
            LD      D,HITX$0
            LD      E,(HL)                ;HL -> TAIL
            LD      A,(DE)
            INC     DE
            LD      (HL),E
            OUT     (UART$0D),A           ;SEND DATA OUT
            CP      PO_TYP + 1
            JR      C,TX3=
TX2=:       EXX
            EX      AF,AF
            EI
            RETI
TX3=:       LD      HL,FGOUT$0
```

```
            CP      CM_TYP
            JR      NZ,TX4=
            RES     B_CM_FUL,(HL)       ;CLEAR FULL FLAG
            JR      TX2=
TX4=:       CP      SO_TYP
            JR      NZ,TX5=
            RES     B_SO_FUL,(HL)
            JR      TX2=
TX5=:       CP      PO_TYP
            JR      NZ,TX6=
            RES     B_PO_FUL,(HL)
            JR      TX2=
TX6=:       CP      EC_TYP
            JR      NZ,TX7=
            RES     B_EC_FUL,(HL)
            JR      TX2=
TX7=:       CP      RM_TYP
            JR      NZ,TX2=
            RES     B_RM_FUL,(HL)
            JR      TX2=

MACND
;---------------------------------------------------
;
; RX INTERRUPT SERVICE ROUTINE
;
;---------------------------------------------------
URRXINT:    MACRO
            EX      AF,AF
            EXX
            IN      A,(UART$0D)
            CP      10H
            JR      NC,RX1=

;------ HANDSHAKE COMMAND RECEIVED FROM HWS

LD      B,A
            LD      IX,KBHA$0           ;COMMAND FROM HWS RECV
            SLA     A
            LD      HL,RXJMPTB          ;COMMAND TABLE
            ADD     A,L
            LD      L,A
            LD      E,(HL)
            INC     HL
            LD      D,(HL)
            EX      DE,HL
            LD      A,B
            JP      (HL)

RX1=:
            LD      HL,RDMASK$0
            AND     (HL)
            LD      (HL),0FFH           ;CLEAR IT FOR NEXT TIME
            LD      B,A                 ;SAVE DATA
            LD      A,(RXDSW$0)         ;CHECK SW
            DEC     A
            JR      NZ,RX2=

;------ STATUS RECEIVED EXECUTE THE STATUS CMD

LD      IX,KBHA$0           ;
            LD      A,B
            AND     0FEH                ;MASK OFF STATE BIT
            CP      STALEN
            JR      NC,RX22=            ;OUT OF RANGE -> RETURN
            LD      HL,STATABLE
            LD      E,A
            LD      D,0
            ADD     HL,DE
            LD      E,(HL)
            INC     HL
            LD      D,(HL)
            EX      DE,HL
            ld      c,bit$0             ;set ch bit
            JP      (HL)

;------ SERIAL INPUT DATA RECEIVED FROM HWS

RX2=:       DEC     A
            JR      NZ,RX3=
            LD      HL,(TBHASI$0)       ;SERIAL INPUT DATA
            ld      a,(istrip$0)
            and     b
            LD      (HL),a              ;do mask for input only
            INC     HL
            LD      A,(TBTLSI$0)        ;TEST HEAD AND TAIL
            CP      L
            JR      NZ,RX21=
            LD      A,(TBTLSI$0+1)
            CP      H
```

```
            JR      Z,RX22=         ;IF OVERFLOW -> JUMP
RX21=:                              ;STILL HAS ROOM TO STORE
            XOR     A
            CP      L
            JR      NZ,RX23=
            LD      A,(TBEASI$0+1)
            CP      H
            JR      NC,RX23=
            LD      A,(TBBASI$0+1)
            LD      H,A             ;RELOAD STARTING POINT
RX23=:      XOR     A
            LD      (TBHASI$0+1),A
            LD      (TBHASI$0),HL
RX22=:      EXX
            EX      AF,AF
            EI
            RETI

;------ KEYBOARD INPUT DATA

RX3=:       DEC     A
            JR      NZ,RX4=
            LD      A,(KBTL$0)      ;NOW IT IS KEYBOARD DATA
            LD      HL,KBHA$0
            DEC     A               ;TAIL - 1
            SUB     (HL)
            AND     MASK31
            JR      Z,RX31=         ;OVERFLOW
            LD      A,(HL)          ;GET HEAD index
            AND     MASK31
            OR      KEOFF$0
            LD      L,A
            LD      H,HIKB
            LD      (HL),B
            INC     L
            LD      A,L
            AND     MASK31
            LD      (KBHA$0),A      ;SAVE KBD INDEX
RX32=:      EXX
            EX      AF,AF
            EI
            RETI RX31=:      LD      HL,FGINP$0      ;SET KEYBOARD OVERFLOW FLAG
            SET     B_KB_OVF,(HL)
            JR      RX32=

;------ ECHO BACK DATA RECEIVED

RX4=:       DEC     A
            JR      NZ,RX32=
            LD      A,(ECRTL$0)
            AND     MASK31
            OR      KEOFF$0
            LD      L,A
            LD      H,HIEC
            LD      A,B             ;GET DATA
            CP      (HL)

JR      NZ,$            ;LINE ERROR HERE

INC     L
            LD      A,L
            AND     MASK31
            LD      (ECRTL$0),A     ;SAVE NEW TAIL POINTER
            JR      RX32=

MACND

;----------------------------------------------------
;
; EXTERNAL STATUS INTERRUPT SERVICE ROUTINE
;
;----------------------------------------------------

UREXINT:    MACRO
            EX      AF,AF
            EXX
            LD      A,10H
            OUT     (UART$0C),A     ;CLEAR EXT INTR
            IN      A,(UART$0C)     ;read rr0
            AND     80H             ;TEST FOR BREAK
            JR      Z,EX99=         ;if NOT then jump
            LD      HL,STATA$0
            RES     4,(HL)          ;CLEAR ONLINE STATUS
            LD      HL,INT_OT$0
            LD      (INT_VT$0 + VEC_TX),HL
            LD      HL,INT_OR$0
            LD      (INT_VT$0 + VEC_RX),HL
```

```
            xor     a
            ld      (statb$0),a     ;clear status byte b
            ld      (txha$0),a      ;clear it
            ld      (txtl$0),a      ;clear it
            ld      (cmha$0),a      ;clear it
            ld      (cmtl$0),a      ;clear it
            ld      (hsha$0),a      ;clear it
            ld      (hstl$0),a      ;clear it
            ld      (kbha$0),a      ;clear it
            ld      (kbtl$0),a      ;clear it
            ld      (fgout$0),a     ;clear it
            ld      (fginp$0),a     ;clear it
            ld      hl,fgtxact
            res     $0,(hl)         ;clear tx act bit LD      A,5
            OUT     (UART$0C),A     ;SELECT RERG 5
            LD      A,0E8H
            OUT     (UART$0C),A     ;CLEAR BREAK CMD
            XOR     A
            LD      (ONLCNT$0),A    ;RESET ONLINE CNT
            LD      (ONLZCNT$0),A   ;RESET NOP CNT

EX99=:
            EXX
            EX      AF,AF
            EI
            RETI

MACND

;------------------------------------------------
;
;   UART RX ERROR INTERRUPT SERVICE ROUTINE
;
;------------------------------------------------

URERINT:    MACRO
            EX      AF,AF
            EXX

IN      A,(UART$0C)     ;RESET ERROR HERE
            LD      A,30H           ;SET ERROR RESET CMD
            OUT     (UART$0C),A
            LD      HL,(INT_VT$0+VEC_RX)
            INC     HL
            INC     HL
            JP      (HL)

MACND

;------------------------------------------------
;
;   HANDSHAKE QUEUE TRANSMIT ROUTINE
;
;------------------------------------------------

URHSINT:    MACRO
            EX      AF,AF
            EXX

LD      HL,HSTL$0       ;HL = TAIL PTR
            LD      A,(HSHA$0)      ;A=HEAD
            CP      (HL)            ;CMP HEAD & TAIL
            JR      NZ,HS1=
            LD      A,28H           ; AT HERE HS Q IS EMPTY
            OUT     (UART$0C),A     ;RESET PENDING HS INT
            LD      HL,FGTXACT
            RES     $0,(HL)         ;RESET HS ACTIVE FLAG
            LD      HL,INT_TX$0     ;NORMAL HS INT PRGM
            LD      (INT_VT$0 + VEC_TX),HL
            EXX
            EX      AF,AF
            EI
            RETI
HS1=:
            LD      D,HIHS$0
            LD      E,(HL)          ;DE = TAIL
            LD      A,(DE)
            INC     DE
            LD      (HL),E
            OUT     (UART$0D),A     ;SEND DATA OUT
            EXX
            EX      AF,AF
            EI
            RETI

MACND
```

```
;----------------------------------------------
;
; REQUEST FOR ON LINE TRANSMIT ROUTINE
;
;----------------------------------------------
URONLTX:        MACRO
        EX      AF,AF
        EXX
        LD      A,28H           ; AT HERE TX Q IS EMPTY
        OUT     (UART$0C),A     ;RESET PENDING TX INT
        EXX
        EX      AF,AF
        EI
        RETI
                MACND

;----------------------------------------------
;
; WAIT FOR ON LINE RECEIVE ROUTINE
;
;----------------------------------------------
URONLRX:        MACRO
        EX      AF,AF
        EXX
        IN      A,(UART$0D)     ;CLEAR ERROR DATA
        CP      DT_ONL          ;SEND REQUEST TO CONNECT CMD
        JR      Z,ONR4=
        CP      DT_NOP
        JP      NZ,ONR1=
        LD      A,(ONLZCNT$0)
        INC     A
        LD      (ONLZCNT$0),A
        CP      80H
        JP      NZ,ONR1=
        JR      ONR2=
ONR4=:
        LD      A,(ONLCNT$0)
        INC     A
        LD      (ONLCNT$0),A
        CP      5
        JR      Z,ONR2=
        LD      A,DT_ONL
        OUT     (UART$0D),A     ;SEND ONLINE CHAR BACK
        JP      ONR1=
;
;       MAXSTATION IS ONLINE SETUP TABLE FOR THIS CHANNEL
;
ONR2=:
        LD      HL,SHQDAT$0
        LD      DE,KBHA$0
        LD      BC,20H
        LDIR
        LD      HL,DFQUEDAT + $0 * 16   ;CLEAR ALL BUFFER
        LD      DE,TBBAS0$0
        LD      BC,10H
        LDIR
        LD      HL,(TBDAC$0)
        LD      A,H
        ADD     A,8
        LD      D,A
        LD      E,L
        LD      HL,RM_TABLE             ;INIT RMA_DAC DEFAULT VALUE
        LD      BC,192
        LDIR
        LD      A,0FFH
        LD      (FGDAC$0),A             ;SET UPDATE FLAG

LD      HL,INT_TX$0
        LD      (INT_VT$0 + VEC_TX),HL
        LD      HL,INT_RX$0
        LD      (INT_VT$0 + VEC_RX),HL
        LD      HL,STATA$0
        SET     4,(HL)          ;ONLINE STATUS
        LD      H,HICH$0
        LD      A,(CMHA$0)
        LD      L,A
        LD      (HL),29H
        INC     L
        LD      (HL),82H        ;LED0 ON (POWER LED)
        INC     L

LD      (HL),2AH
        INC     L
        LD      (HL),80H        ;LED1 OFF (ACTIVITY LED)
        INC     L

LD      (HL),2CH
        INC     L
        LD      (HL),0FFH       ;KBD RESET CMD
        INC     L
```

```
                LD      (HL),2FH
                INC     L
                LD      (HL),0FFH       ;STATUS REQUEST CMD
                INC     L
;               LD      (HL),2CH
;               INC     L
;               LD      (HL),0F0H       ;KBD SCAN CODE OPTION
;               INC     L
;               LD      (HL),2DH
;               INC     L
;               LD      (HL),81H        ;KBD SET 1
;               INC     L

LD      (HL),21H
                INC     L
                LD      A,(TCHBUD$0)    ;SET BAUD RATE
                OR      80H
                LD      (HL),A
                INC     L
                LD      (HL),27H
                INC     L
                LD      A,(TCHSRT$0)    ;START BYTE
                OR      80H
                LD      (HL),A
                INC     L
                LD      (HL),28H
                INC     L
                LD      A,(TCHSTP$0)    ;STOP BYTE
                OR      80H
                LD      (HL),A
                INC     L
                LD      (HL),22H
                INC     L
                LD      A,(TCHCFG$0)    ;CONFIG BYTE
                LD      (HL),A
                INC     L
                LD      (HL),23H
                INC     L
                LD      A,(TCHHSK$0)    ;HANDSHAKE BYTE
                OR      80H
                LD      (HL),A
                INC     L
                LD      (HL),2BH        ;BEEPER CMD
                INC     L
                LD      (HL),81H        ;1 SHORT
                INC     L
                LD      (HL),31H        ;RTS CMD
                INC     L
                LD      A,(FGRTS)
                BIT     $0,A
                LD      A,80H
                JR      Z,ONR3=
                LD      A,81H           ;SET RTS = 1
ONR3=:
                LD      (HL),A
                INC     L

LD      A,(FGENBS)
                BIT     $0,A
                JR      Z,ONR0=
                LD      (HL),20H        ;ENABLE HWS' SIO
                INC     L
                LD      (HL),82H        ;
                INC     L
ONR0=:
                LD      A,L
                LD      (CMHA$0),A
ONR1=:
                EXX
                EX      AF,AF
                EI
                RETI
                        MACND

;------------------------------------------
;
;       B=ERROR CODE, D=ER CH, E=VAL,
;
;------------------------------------------

DO_ERR:         MACRO

BIT     $0,D            ;TEST BIT
                JR      Z,DO_ER1=
                LD      C,$0            ;LOAD CH
                BIT     $0,E            ;TEST VAL
                LD      A,0
```

```
            JR      Z,DO_ER2=
            LD      A,1
DO_ER2=:
            PUSH    DE
            CALL    DO_ERX
            POP     DE
DO_ER1=:
                    MACND
```

;----------------------------------------------------
;
; IDLED DO GLOBE LED CMD PROCESS
;
;----------------------------------------------------

```
IDLED:          MACRO
            ld      hl, stata$0
            bit     4,(hl)
            jr      z,idled2=           ;offline -> jmp
            ld      h,hicm$0            ;base tx seg
            ld      a,(cmha$0)
            ld      l,a                 ;hl -> head
            ld      a,(cmtl$0)          ;a=tail
            dec     a
            dec     a
            sub     L
            jr      z,idled2=
            ld      (hl),2ah
            inc     l
            ld      (hl),b
            inc     l
            ld      a,l
            ld      (cmha$0),a
idled2=:
                    MACND
```

```
DEBUG:   EQU     0

;----------------------------------------------------------
;       SH4 FIRMWARE        RELEASE NOTE:
;              XEN MOS
;              === ===
; 02-25-92 rev sva    ADD SV-4
; 01-26-92 REV C7     SH8 LED SUPPORT
; 12-09-91 REV C6     SH8 SUPPORT,
; 08-17-91 REV C5     SAME AS D3 BUT USE C5 INSTEAD
; 08-16-91 REV D3     CMD 16 DTR AND RTS REVERSED PROBLEM
; 08-08-91 REV D1     ISTRIP CMD
; 08-06-91            FIX FGDTR, FGRTS, FGSI
; 06-XX-91 REC C4     FIX KEYRDY FLAG
; 05-21-91 REV B3  C3 CREATE UNIX VERSION FIRMWARE FOR REV C
; 03-11-91 REV B3     ONLINE CHECK
; 02-08-91 REV B2     INCREASE SO BUFFER TO 1K FOR EMULINK/SEND/FETCH
; 02-08-91 REV B2     SPLIT MOS/UNIX VERSION BY CONTROL ...FGRXQNEM...
; 01-10-91 REV B1     FIX FGRXQNEM FOR UNIX
; 01-01-91 REV B      ADD GLOBAL LED CONTROL.
; 04-23-90 REV A      GET SOURCE FROM SS-8
;
; THIS IS A VERY IMPORTANT RULE THAT
;   IY IS ONLY USED ONLY IN NON INTERRUPT ROUTINE
;   IX IS ONLY USED ONLY IN NONINTERRUPT ROUTINE
;
;----------------------------------------------------------
        NOLST
        NCLUD   WORK.CON        ;CONSTANT & LABEL DEFINITION
        NCLUD   WORK.INC        ;MACRO LIBRARY

LIST

ORG     00000H
        JP      RSTZ80
SIGNMSG:
        DB      'SH-4 REV D  Copyright 1992 Maxpeed Corp  '

ORG     70H
WRKTBL:

WKCHB:    EQU   0       ;-- CHANNEL BIT                CBIT
WKX5:     EQU   1       ;-- CHANNEL # X 5              CHX5
WKCMHI:   EQU   2       ;-- EC  QUEUE HIGH NIBL ADDRESS KEOFF
WKURTC:   EQU   3       ;-- KBI QUEUE HIGH BYTE ADDRESS KEOFF

WKTXTL:   EQU   4       ;-- TXD QUEUE TAIL
WKSHAD:   EQU   6       ;-- SHX CHANNEL TABLE START ADDRESS

DB      01H, 00,HICM0,UART0C
        DW      TXTL0,KBHA0
        DB      02H, 05,HICM1,UART1C
        DW      TXTL1,KBHA1
        DB      04H, 10,HICM2,UART2C
        DW      TXTL2,KBHA2
        DB      08H, 15,HICM3,UART3C
        DW      TXTL3,KBHA3
        DB      10H, 20,HICM4,UART4C
        DW      TXTL4,KBHA4
        DB      20H, 25,HICM5,UART5C
        DW      TXTL5,KBHA5
        DB      40H, 30,HICM6,UART6C
        DW      TXTL6,KBHA6
        DB      80H, 35,HICM7,UART7C
        DW      TXTL7,KBHA7

RXJMPTB:
        DW      RXCASE00,RXCASE01,RXCASE02,RXCASE03
        DW      RXCASE04,RXCASE05,RXCASE06,RXCASE07
        DW      RXCASE08,RXCASE09,RXCASE0A,RXCASE0B
        DW      RXCASE0C,RXCASE0D,RXCASE0E,RXCASE0F

ORG     100H

UARTBL: DB      UART0C,UART1C,UART2C,UART3C,UART4C,UART5C,UART6C,UART7C

SIG_OS:                         ;DON'T CHANGE THE FOLLOWING MSG
        if      _pcmos
        db      'PCMOS   ',1,2,3,4,5
        endif
        if      _xenix
        db      'GENERIC ',7,8,9
        endif
        if      _vm386
        db      'VM386   ',1,3,5,7,9,11,13,15
        endif

;------------------------
;
```

```
;   Z80 RESET ENTRY
;
;------------------------

RSTZ80:
        DI                              ;DISABLE INTERRUPT
        LD      A,00H
        LD      (FGBRDSTA),A            ;BOARD IS UNDER TEST
        LD      SP,STACKTOP             ;INIT STACK PT
        IM      2
        LD      A,INT_VT/256            ;INIT INTERRUPT TABLE
        LD      I,A
        LD      HL,IDADDR               ;INIT ID BYTE FOR MCA
        LD      (HL),ID_LO              ;LOW ID BYTE
        INC     HL
        LD      (HL),ID_HI              ;HIGH ID BYTE
        LD      A,0
        INC     HL
        LD      (HL),A
        INC     HL
        LD      (HL),A
        INC     HL
        LD      (HL),A
        INC     HL
        LD      (HL),A
        INC     HL
        LD      (HL),A
        INC     HL
        LD      (HL),A
                                        ;add 06-19-89
        LD      HL,RAMADDR              ;08000H
        LD      BC,IDADDR               ;MCA ID BYTE
AUTO00A6:
        LD      (HL),00H                ;ZERO OUT RAM
        INC     HL
        LD      A,L
        CP      C
        JR      NZ,AUTO00B2
        LD      A,H
        CP      B
        JR      NZ,AUTO00B2
        INC     HL
        INC     HL
        INC     HL
        INC     HL
        INC     HL
        INC     HL
        INC     HL
        INC     HL
        INC     HL
        INC     HL
        INC     HL
AUTO00B2:
        LD      A,H
        OR      L
        JR      NZ,AUTO00A6

;       CALL    RESETST                 ;do eprom,ram test
                                        ;do init table to default
        LD      HL,SIGNMSG              ;ID INIT = SH-X ...
        LD      DE,SSSIGADR
        LD      BC,30H
        LDIR LD      HL,SIG_OS               ;OS MSG
        LD      DE,SHSIGADR             ;0FE00H
        ld      bc,20h                  ;FE0D --
        LDIR LD      HL,DFQUEDAT             ;SS-8 QUEUE POINTER INIT
        LD      DE,TBBAS00              ;FC00
        LD      BC,0c0H
        LDIR LD      HL,SH4QDAT              ;SH-8 QUEUE POINTER INIT
        LD      DE,SH8KBASE             ;FD00
        LD      BC,100H
        LDIR LD      HL,INT_TB               ;INTR ROUTINE JUMP PTR
        LD      DE,INT_VT
        LD      BC,40H
        LDIR LD      HL,RM_TABLE             ;INIT RAMDAC TABLE
        LD      DE,(TBDAC0)
        LD      BC,192
        LDIR
        LD      HL,RM_TABLE             ;INIT RAMDAC TABLE
        LD      DE,(TBDAC1)
```

```
        LD      BC,192
        LDIR
        LD      HL,RM_TABLE     ;INIT RAMDAC TABLE
        LD      DE,(TBDAC2)
        LD      BC,192
        LDIR
        LD      HL,RM_TABLE     ;INIT RAMDAC TABLE
        LD      DE,(TBDAC3)
        LD      BC,192
        LDIR

CALL    QSIZING         ;OUTPUT Q SIZING
        CALL    DARTINIT        ;DART INIT
        LD      A,0FFH
        LD      (FGSOQNFL),A
        LD      (FGRTS),A       ;INIT VALUE
        LD      (FGDTR),A
        ld      (istrip0),a
        ld      (istrip1),a
        ld      (istrip2),a
        ld      (istrip3),a
        ld      (istrip4),a
        ld      (istrip5),a
        ld      (istrip6),a
        ld      (istrip7),a LD      A,000H          ;RESET ENABLE BITS
        LD      (FGENBS),A
        CALL    SNDBRK          ;SEND BREAK
        LD      A,01H
        LD      (FGBRDSTA),A    ;TELL SYSTEM WE ARE READY NOW IN      A,(UART0C)
        LD      B,A
        BIT     5,B             ;TEST SV OR SH, IF = 0 -> SH, ELSE -> SV
        JR      NZ,RST12
        LD      A,'V'
        LD      (SHSIGADR+1),A  ;0FE01H
        IN      A,(UART1C)
        LD      B,A
        BIT     3,B
        JR      NZ,RST13        ;IF 4 PORT -> JUMP
        BIT     5,B
        LD      A,'3'
        JR      NZ,RST13
        LD      A,'2'
        JR      RST13
RST12:                          ;TEST 4 OR 8 PORT
        BIT     3,B             ;TEST DCD
        JR      NZ,IDLE
        LD      A,'8'
RST13:
        LD      (PORTNUM),A ;----------------------------------------
;
;   IDLE LOOP BEGIN
;   IY = WRKTBL
;
;----------------------------------------
IDLE:
        EI
        LD      A,(TBHACMD+1)
        LD      HL,(TBHACMD)
        XOR     H
        JR      NZ,IDLE
        OR      A               ;CLEAR CARRY
        LD      DE,(TBTLCMD)
        SBC     HL,DE           ;IS ANY CMD IN Q
        JP      Z,IDCMDEN3
        EX      DE,HL           ;HL = BRD CMD QUE TAIL PTR
        LD      DE,WORKCMD      ;DE = TEMP CMD AREA
        LD      BC,4
        LDIR
        PUSH    HL              ;NEW CMD Q TAIL PTR LD      A,(WORKCHAN)
        SLA     A
        SLA     A
        SLA     A               ;X 8
        LD      C,A
        LD      B,0
        LD      IY,WRKTBL       ;IY = TABLE ADDRESS
        ADD     IY,BC LD      A,(WORKCMD)
        CP      MAX_CMD
        JP      NC,IDCMDEND
        SLA     A
```

```
            LD      HL,CMDJPTAB      ;COMMAND TABLE
            LD      C,A
            LD      B,0
            ADD     HL,BC
            LD      E,(HL)
            INC     HL
            LD      D,(HL)
            EX      DE,HL
            JP      (HL)

if      _pcmos
            DB      'THIS IS A PCMOS EPROM'
            endif
            IF      _XENIX
            DB      'THIS IS A GENERIC EPROM'
            ENDIF
            IF      _VM386
            DB      'THIS IS A VM386 EPROM    '
            ENDIF CMDJPTAB:   DW      _CMD0            ;RESET CHANNEL CMD
            DW      _CMD1            ;CH CONFIG / BAUD RATE
            DW      _CMD2            ;DEFINE START/STOP CHAR
            DW      _CMD3            ;SET CHANNEL HANDSHAKE
            DW      _CMD4            ;BREAK CMD
            DW      _CMD5            ;XENIX CMD
            DW      _CMD6            ;DTR
            DW      _CMD7            ;BOARD RESET CMD
            DW      _CMD8            ;BOARD RESET CMD
            DW      _CMD9            ;LED 0 (POWER LED/GREEN)
            DW      _CMDA            ;LED 1 (ACTIVITY LED/YELLOW)
            DW      _CMDB            ;BEEPER CMD
            DW      _CMDC            ;KEYBOARD CMD
            DW      _CMDD            ;KEYBOARD CMD
            DW      _CMDE            ;KEYBOARD CMD
            DW      _CMDF            ;STATUS REQUEST
            DW      _CMD10           ;SET SCAN CODE TABLE
            DW      _CMD11           ;RTS
            DW      _CMD12           ;Reset workstation
            DW      _CMD13           ;PRESET ASYNC CH
            DW      _CMD14           ;set channel baud rate
            DW      _CMD15           ;set ch conf
            DW      _CMD16           ;set modem control
;           DW      _CMD17           ;
;           DW      _CMD18           ;

MAX_CMD:    EQU     ($-CMDJPTAB) / 2

;---------------------------------------
;
; 0 = RESET CHANNEL COMMAND FROM PC
;
;---------------------------------------
_CMD0:
            IDCMDQCK
            LD      (HL),20H         ;_CMD 0 FOR HWS
            INC     L
            LD      A,(WORKBYT1)     ;LOAD ENABLE/DISABLE CMD
            AND     1
            ADD     A,A              ;LEFT SHIFT 1
            LD      B,A
            LD      A,(WORKBYT2)     ;RESET CMD
            AND     1
            OR      80H
            OR      B
            LD      (HL),A           ;_2ND BYTE
            INC     L
            LD      E,L
            HEADDX  CMHA             ;HL = CMD HEAD PTR
            LD      (HL),E           ;SAVE NEW CMD PTR
            LD      A,(WORKBYT2)     ;RESET OR NOT
            OR      A
            JR      Z,_CMD02
_CMD01:                              ;RESET CH ONLY
            LD      A,(WORKCHAN)
            CALL    DFQTINIT
            LD      A,(WORKCHAN)
            CALL    DFCHINIT
            LD      A,(IY+WKCHB)
            LD      B,A
            LD      HL,FGDTR
            OR      (HL)
            LD      (HL),A
            LD      A,B
            XOR     0FFH
            LD      HL,FGSIGNEM
            AND     (HL)
            LD      (HL),A

LD      A,(WORKCHAN)     ;LOAD CHANNEL #
```

```
                LD      HL,SINEMO
                ADD     A,L
                LD      L,A
                XOR     A
                LD      (HL),A          ;SET RX NOT EMPTY FG = 0
_CMD02:
                LD      HL,FGENBS
                LD      A,(WORKBYT1)    ;ENABLE /DISABLE BYTE
                OR      A
                JR      Z,_CMD03
                LD      A,(IY+WKCHB)    ;ENABLE CH
                OR      (HL)
                LD      (HL),A
                JP      IDCMDEND
_CMD03:
                LD      A,(IY+WKCHB)    ;DISABLE
                XOR     0FFH
                AND     (HL)
                LD      (HL),A
                JP      IDCMDEND
;----------------------------------------
;
; 1 = SET CHANNEL BAUD RATE AND CONFIG
;
;----------------------------------------
_CMD1:
                IDCMDQCK
                LD      (HL),21H        ;_CMD 1 FOR HWS
                INC     L
                LD      A,(WORKBYT1)    ;LOAD baud rate
                OR      80H
                LD      (HL),A          ;_1ST BYTE
                INC     L
                LD      (HL),22H        ;CONFIGURATION CMD
                INC     L
                LD      A,(WORKBYT2)    ;load config byte
                LD      (HL),A          ;_2ND BYTE
                INC     L
                LD      E,L
                HEADDX  CMHA            ;HL = CMD HEAD PTR
                LD      (HL),E          ;SAVE NEW CMD PTR LD      HL,TCHBUD0
                LD      A,(IY+WKX5)     ;CH X 5
                ADD     A,L
                LD      L,A
                LD      A,(WORKBYT1)    ;LOAD baud rate
                LD      (HL),A
                INC     HL
                LD      A,(WORKBYT2)    ;load config byte
                LD      (HL),A LD      HL,FGDTR
                AND     20h             ;test dtr on or off
                LD      A,(IY+WKCHB)    ;LOAD CH BIT
                JR      NZ,_CMD1_1
                XOR     0FFH            ;REVERSE CH BIT
                AND     (HL)            ;CLEAR IT
                JR      _CMD1_2
_CMD1_1:
                OR      (HL)            ;SET DTR FLAG = 1
_CMD1_2:
                LD      (HL),A

JP      IDCMDEND

;----------------------------------------
;
; 2 = SET START & STOP CHAR
;
;----------------------------------------
_CMD2:
                IDCMDQCK
                LD      (HL),27H        ;_CMD 7 FOR HWS
                INC     L
                LD      A,(WORKBYT1)    ;LOAD START
                OR      80H
                LD      (HL),A          ;_1ST BYTE
                INC     L
                LD      (HL),28H
                INC     L
                LD      A,(WORKBYT2)    ;load config byte
                OR      80H
                LD      (HL),A          ;_2ND BYTE
                INC     L
                LD      E,L
                HEADDX  CMHA            ;HL = CMD HEAD PTR
                LD      (HL),E          ;SAVE NEW CMD PTR

LD      HL,TCHSRT0
```

```
        LD      A,(IY+WKX5)     ;CH X 5
        ADD     A,L
        LD      L,A
        LD      A,(WORKBYT1)    ;LOAD START
        LD      (HL),A
        INC     HL
        LD      A,(WORKBYT2)    ;load STOP
        LD      (HL),A
        JP      IDCMDEND ;----------------------------------------
;
;  3 = SET HANDSHAKE MODE FOR CHANNEL
;
;----------------------------------------
_CMD3:
        IDCMDQCK
        LD      (HL),23H        ;_CMD 3 FOR HWS
        INC     L
        LD      A,(WORKBYT1)    ;LOAD TX HANDSHAKE
        res     6,a
        bit     2,a
        jr      z,_cmd3_1
        set     6,a
_cmd3_1:
        AND     43h
        LD      B,A
        LD      A,(WORKBYT2)    ;load RX HANDSHAKE
        AND     3
        add     a,A
        add     a,A
        add     a,A
        OR      80H
        OR      B
        LD      (HL),A          ;_2ND BYTE
        INC     L
        LD      E,L
        HEADDX  CMHA            ;HL = CMD HEAD PTR
        LD      (HL),E          ;SAVE NEW CMD PTR LD      HL,TCHHSK0
        LD      A,(IY+WKX5)     ;CH X 5
        ADD     A,L
        LD      L,A
        LD      A,(WORKBYT1)    ;LOAD TX HANDSHAKE
        AND     03H
        LD      B,A
        LD      A,(WORKBYT2)    ;LOAD RX HANDSHAKE
        AND     03H
        ADD     A,A
        ADD     A,A
        ADD     A,A
        OR      B
        LD      (HL),A
        JP      IDCMDEND ;----------------------------------------
;
;  4 = SEND BREAK 0=END, 1=START
;
;----------------------------------------
_CMD4:
        IDCMDQCK
        LD      (HL),24H        ;_CMD 4 FOR HWS
        INC     L
        LD      A,(WORKBYT1)    ;LOAD START/STOP BREAK
        OR      80H
        LD      (HL),A          ;_1ST BYTE
        INC     L
        LD      E,L
        HEADDX  CMHA            ;HL = CMD HEAD PTR
        LD      (HL),E          ;SAVE NEW CMD PTR
        JP      IDCMDEND ;----------------------------------------
;
;  5 = XENIX CMD  IGNBRK,IGNPAR,PARMRK,ISTRIP,NPRERR,TCXONC
;
;----------------------------------------
_CMD5:
        IDCMDQCK
        LD      (HL),25H        ;_CMD 3 FOR HWS
        INC     L
        LD      A,(WORKBYT1)    ;LOAD XENIX COMMAND
        AND     0FH
        cp      03
        jr      z,_cmd5_1
        ADD     A,A
        OR      80H
        LD      B,A
```

```
              LD      A,(WORKBYT2)    ;LOAD VALUE COMMAND
              AND     1
              OR      B
              LD      (HL),A          ;_2ND BYTE
              INC     L
              LD      E,L
              HEADDX  CMHA            ;HL = CMD HEAD PTR
              LD      (HL),E          ;SAVE NEW CMD PTR
              JP      IDCMDEND
_cmd5_1:
              ld      hl,istrip0
              ld      a,(workchan)
              add     a,l
              ld      l,a             ;hl -> istrip byte
              ld      a,(workbyt2)    ;load value
              or      a
              ld      a,0ffh
              jr      z,_cmd5_2
              ld      a,7fh
_cmd5_2:
              ld      (hl),a
              jp      idcmdend ;----------------------------------------
;
;  6 = DTR CMD   0 -> DTR = 0,  <>0 -> DTR = 1
;
;----------------------------------------
_CMD6:
              IDCMDQCK
              LD      (HL),26H        ;_CMD 6 FOR HWS
              INC     L
              LD      A,(WORKBYT1)    ;LOAD DTR CMD
              OR      80H
              LD      (HL),A          ;_1ST BYTE
              INC     L
              LD      E,L
              HEADDX  CMHA            ;HL = CMD HEAD PTR
              LD      (HL),E          ;SAVE NEW CMD PTR
              LD      HL,FGDTR
              ld      b,(hl)

LD      HL,TCHCFG0
              LD      A,(IY+WKX5)     ;CH X 5
              ADD     A,L
              LD      L,A
              SET     5,(HL)          ;SET DTR INTO CFG BYTE
              LD      A,(WORKBYT1)    ;VALUE
              AND     1
              LD      A,(IY+WKCHB)    ;LOAD CH BIT
              JR      NZ,_CMD61
              RES     5,(HL)          ;RESET DTR FLAG INTO CFG BYTE
              XOR     0FFH            ;REVERSE CH BIT
              AND     b               ;CLEAR IT
              JR      _CMD62
_CMD61:
              OR      b               ;SET DTR FLAG = 1
_CMD62:
              LD      (fgdtr),A
              JP      IDCMDEND ;----------------------------------------
;
;  7 = BOARD RESET COMMAND
;
;----------------------------------------
_CMD7:
_CMD8:
              JP      RSTZ80

;----------------------------------------
;  9 = LED 0 ON/OFF PULSE CMD. PWR LED
;      00 = OFF, 01 = PULSE, 10 = ON
;----------------------------------------
_CMD9:
              IDCMDQCK
              LD      (HL),29H        ;_CMD 9 FOR HWS
              INC     L
              LD      A,(WORKBYT1)    ;OFF/PULSE/ON CMD
              OR      80H
              LD      (HL),A          ;_1ST BYTE
              INC     L
              LD      E,L
              HEADDX  CMHA            ;HL = CMD HEAD PTR
              LD      (HL),E          ;SAVE NEW CMD PTR
              JP      IDCMDEND

;----------------------------------------
;  A = LED 1 ON/OFF PULSE CMD. ACTIVITY LED
;      00 = OFF, 01 = PULSE, 10 = ON
```

```
;----------------------------------------
_CMDA:
        IDCMDQCK
        LD      (HL),2AH        ;_CMD A FOR HWS
        INC     L
        LD      A,(WORKBYT1)    ;LOAD ON/PULSE/OFF CMD
        OR      80H
        LD      (HL),A          ;_1ST BYTE
        INC     L
        LD      E,L
        HEADDX  CMHA            ;HL = CMD HEAD PTR
        LD      (HL),E          ;SAVE NEW CMD PTR
        JP      IDCMDEND

;----------------------------------------
; B = BEEP COMMAND
;     B6-B4 LONG SOUND, B3-B0 SHORT SOUND
;----------------------------------------
_CMDB:
        IDCMDQCK
        LD      (HL),2BH        ;_CMD B FOR HWS
        INC     L
        LD      A,(WORKBYT1)    ;BEEP SOUND
        OR      80H
        LD      (HL),A          ;_1ST BYTE
        INC     L
        LD      E,L
        HEADDX  CMHA            ;HL = CMD HEAD PTR
        LD      (HL),E          ;SAVE NEW CMD PTR
        JP      IDCMDEND

;----------------------------------------
; C = keyboard cmd 3rd byte = keyboard cmd ( ED - LED CMD )
;                  4 th byte = ind
;----------------------------------------
_CMDC:
_CMDD:
_CMDE:
        IDCMDQCK
        LD      (HL),2CH        ;_CMD C FOR HWS KEYBRD LED
        INC     L
        LD      A,(WORKBYT1)    ;BEEP SOUND
        LD      (HL),A          ;_1ST BYTE
        INC     L LD      (HL),2DH        ;_CMD D FOR HWS OPTIONS
        INC     L
        LD      A,(WORKBYT2)    ;BEEP SOUND
        OR      80H
        LD      (HL),A          ;_1ST BYTE
        INC     L
        LD      E,L
        HEADDX  CMHA            ;HL = CMD HEAD PTR
        LD      (HL),E          ;SAVE NEW CMD PTR
        JP      IDCMDEND ;----------------------------------------
; F = STATUS REQUEST CMD
;----------------------------------------
_CMDF:
        IDCMDQCK
        LD      (HL),2FH        ;_CMD F FOR HWS STATUS REQUEST
        INC     L
        LD      (HL),080H       ;DUMMY BYTE
        INC     L
        LD      E,L
        HEADDX  CMHA            ;HL = CMD HEAD PTR
        LD      (HL),E          ;SAVE NEW CMD PTR
        JP      IDCMDEND ;----------------------------------------
; 10 = SCAN CODE SETECT CMD
;      3RD BYTE = 0 -> AT CODE (IBM CODE SET 2)
;      3RD BYTE = 1 -> XT CODE (IBM CODE SET 1) HWS DEFAULT VALUE
;----------------------------------------
_CMD10:
        IDCMDQCK
        LD      (HL),30H        ;_CMD 10 FOR HWS
        INC     L
        LD      A,(WORKBYT1)    ;SCAN CODE SELECT CMD
        OR      80H
        LD      (HL),A          ;_1ST BYTE
        INC     L
        LD      E,L
        HEADDX  CMHA            ;HL = CMD HEAD PTR
        LD      (HL),E          ;SAVE NEW CMD PTR
        JP      IDCMDEND ;----------------------------------------
;
; 11 = RTS CMD  0 -> RTS = 0, <>0 -> RTS = 1
```

```
;
;----------------------------------------
_CMD11:
        IDCMDQCK
        LD      (HL),31H        ;_CMD 11 FOR HWS
        INC     L
        LD      A,(WORKBYT1)    ;LOAD RTS CMD
        OR      80H
        LD      (HL),A          ;_1ST BYTE
        INC     L
        LD      E,L
        HEADDX  CMHA            ;HL = CMD HEAD PTR
        LD      (HL),E          ;SAVE NEW CMD PTR
        LD      HL,FGRTS
        LD      A,(WORKBYT1)    ;VALUE
        AND     1
        LD      A,(IY+WKCHB)    ;LOAD CH BIT
        JR      NZ,_CMD111
        XOR     0FFH            ;REVERSE CH BIT
        AND     (HL)            ;CLEAR IT
        JR      _CMD112
_CMD111:
        OR      (HL)            ;SET RTS FLAG = 1
_CMD112:
        LD      (HL),A
        JP      IDCMDEND

;-------------------------------------------------------------
;
;  12 = RESET HWS CMD, (FLUSH ALL BUFFERS, SI, SO, KB, PRN)
;
;-------------------------------------------------------------

_CMD12:
        LD      A,(IY+WKURTC)
        LD      C,A             ;POINT TO DART COMMAND PORT
        IN      A,(C)           ;
        LD      A,5
        OUT     (C),A
        LD      A,0F8H
        OUT     (C),A
        LD      L,(IY + WKTXTL) ;LOAD TX TAIL POINTER
        LD      H,(IY+WKTXTL + 1)
        LD      A,(HL)
        ADD     A,80H
        DEC     HL
        LD      (HL),A          ;HL -> HEAD PTR
        ld      a,stata - txha
        add     a,l
        ld      l,a             ;hl -> stata LD      A,0
        DEC     C               ;C -> UART DATA
        OUT     (C),A
        ld      (hl),a          ;reset on line state
        JP      IDCMDEND ;----------------------------------------
;
; 13 = preset ch cmd   2400,8 bit,1 stop, no parity
;      dtr=0,rts=0,flow control off, update dcd & cts
;
;----------------------------------------
_CMD13:
                                ;need room for 6 cmd
        LD      L,(IY + WKSHAD)
        LD      H,(IY + WKSHAD + 1)     ;HL = KBHA
        LD      A,CMHA
        ADD     A,L
        LD      L,A
        LD      A,(HL)          ;LOAD COMMAND HEAD LOW BYTE
        INC     HL              ;POINT TO CMD TAIL
        SUB     (HL)
        ADD     A,13
        JP      C,IDCMDEN2      ;BUFFER OVERFLOW
        DEC     HL
        LD      L,(HL)          ;LOAD CMD HD PT LOW BYTE
        LD      H,(IY + WKCMHI) ;HL = COMMAND HEAD PT HI BYTE LD      (HL),21H        ;baud rate cmd
        INC     L
        LD      (HL),83h        ;2400
        INC     L
        LD      (HL),22H        ;CONFIGURATION CMD
        INC     L
        LD      (HL),0c4h       ;8 data bit, no par, dtr=0
        INC     L
        ld      (hl),23h
```

```
        inc     l
        ld      (hl),80h        ; no handshake
        inc     l
        ld      (hl),31h
        inc     l
        ld      (hl),80h        ; rts = 0
        inc     l
        ld      (hl),2fh
        inc     l
        ld      (hl),80h        ; request status
        inc     l
        LD      E,L
HEADDX  CMHA                    ;HL = CMD HEAD PTR
        LD      (HL),E          ;SAVE NEW CMD PTR ld      a,(iy + wkchb)  ;get chan bit
        xor     0ffh            ;
        ld      b,a
        ld      a,(fgdtr)
        and     b
        ld      (fgdtr),a
        ld      a,(fgrts)
        and     b
        ld      (fgrts),a LD      HL,TCHBUD0
        LD      A,(IY+WKX5)     ;CH X 5
        ADD     A,L
        LD      L,A
        ld      (hl),3          ;2400
        inc     hl
        ld      (hl),0c4h       ;8,1,n
        inc     hl
        inc     hl
        inc     hl
        ld      (hl),0          ;no handshake

JP      IDCMDEND

;----------------------------------------
;
; 14 = set baud rate  2=1200 3=2400 4=4800 5=9600 6=19200 7=38400
;
;----------------------------------------

_CMD14:
        IDCMDQCK
        LD      (HL),21H        ;_CMD 1 FOR HWS
        INC     L
        LD      A,(WORKBYT1)    ;LOAD baud rate
        OR      80H
        LD      (HL),A          ;_1ST BYTE
        INC     L
        LD      E,L
HEADDX  CMHA                    ;HL = CMD HEAD PTR
        LD      (HL),E          ;SAVE NEW CMD PTR
        LD      HL,TCHBUD0
        LD      A,(IY+WKX5)     ;CH X 5
        ADD     A,L
        LD      L,A
        LD      A,(WORKBYT1)    ;LOAD baud rate
        LD      (HL),A
        JP      IDCMDEND ;----------------------------------------
;
; 15 = set line control  number of data bits, stop bits, parity,
;       bits 1-0 -  00 = 5 bits, 01 = 6 bits, 10 = 7 bits, 11 = 8 bits.
;       bit 2    -  0 = 1 stop bit, 1 = 2 stop bits.
;       bit 3    -  0 = no parity, 1 = parity enable.
;       bit 4    -  0 = odd parity, 1 = even parity.
;       bits 5-7 --- always 0.
;
;----------------------------------------

_CMD15:
        IDCMDQCK
        LD      (HL),22H        ;_CMD 2 FOR HWS
        INC     L
        push    hl
        LD      HL,TCHcfg0
        LD      A,(IY+WKX5)     ;CH X 5
        ADD     A,L
        LD      L,A
        LD      A,(hl)          ;LOAD baud rate
        and     20h
        ld      b,a             ;save dtr flag
        LD      A,(WORKBYT1)    ;LOAD config byte
        bit     0,a             ;test data bit
        jr      z,_cmd15_1
```

```
                set     7,b
_cmd15_1:
                bit     1,a
                jr      z,_cmd15_2
                set     6,b
_cmd15_2:
                bit     2,a             ;stop bits
                jr      z,_cmd15_3
                set     3,b
_cmd15_3:
                set     2,b             ;stop bit
                bit     3,a             ;parity enb?
                jr      z,_cmd15_4
                set     0,b
_cmd15_4:
                bit     4,a             ;odd/even
                jr      z,_cmd15_5
                set     1,b
_cmd15_5:
                ld      (hl),b          ;new config byte
                pop     hl
                ld      (hl),b
                INC     L
                LD      E,L
                HEADDX  CMHA            ;HL = CMD HEAD PTR
                LD      (HL),E          ;SAVE NEW CMD PTR
                JP      IDCMDEND ;------------------------------------
;
; 16 = set modem control  bit 0 = dtr, bit 1 = rts
;
;------------------------------------

_CMD16:
                IDCMDQCK
                LD      (HL),26H        ;_CMD 6 FOR HWS dtr cmd
                INC     L
                LD      A,(WORKBYT1)
                ld      b,a
                and     1
                OR      80H
                LD      (HL),A          ;_1ST BYTE
                INC     L
                LD      (HL),31H        ;rts cmd
                INC     L
                LD      A,b             ;load config byte
                sra     a
                and     1
                or      80h
                LD      (HL),A          ;_2ND BYTE
                INC     L
                LD      E,L
                HEADDX  CMHA            ;HL = CMD HEAD PTR
                LD      (HL),E          ;SAVE NEW CMD PTR LD      HL,FGRTS
                LD      A,(WORKBYT1)    ;rts cmd
                AND     2
                LD      A,(IY+WKCHB)    ;LOAD CH BIT
                JR      NZ,_CMD16_1
                XOR     0FFH            ;REVERSE CH BIT
                AND     (HL)            ;CLEAR IT
                JR      _CMD16_2
_CMD16_1:
                OR      (HL)            ;SET RTS FLAG = 1
_CMD16_2:
                LD      (HL),A LD      HL,FGDTR
                ld      b,(hl)

LD      HL,TCHCFG0
                LD      A,(IY+WKX5)     ;CH X 5
                ADD     A,L
                LD      L,A
                SET     5,(HL)          ;SET DTR INTO CFG BYTE
                LD      A,(WORKBYT1)    ;VALUE
                AND     1
                LD      A,(IY+WKCHB)    ;LOAD CH BIT
                JR      NZ,_CMD16_3
                RES     5,(HL)          ;RESET DTR FLAG INTO CFG BYTE
                XOR     0FFH            ;REVERSE CH BIT
                AND     b               ;CLEAR IT
                JR      _CMD16_4
_CMD16_3:
                OR      b               ;SET DTR FLAG = 1
_CMD16_4:
                LD      (fgdtr),A
```

```
            JP      IDCMDEND
;----------------------------------------
IDCMDEN2:
        POP     DE
        JR      IDCMDEN3
IDCMDEND:
        POP     DE              ;DE = NEW POINT
        LD      HL,(TBEACMD)
        XOR     A
        SBC     HL,DE
        JR      NC,IDCMDEN1
        LD      DE,(TBBACMD)
IDCMDEN1:
        DI
        LD      (TBTLCMD+1),A
        EI
        LD      (TBTLCMD),DE
IDCMDEN3:

;----------------------------------------
;
;       DUMMY CODE HERE FOR PROTECTION
;
;----------------------------------------
;       NOEX
;       IF      _XENIX
;       jp      dum_end
;       IDTX    7
;       IDEC    6
;       IDKI    4
;dum_end:
;       ENDIF
;       EXPN
;
;----------------------------------------
;
;       IDLE LOOP SERVICE ROUTINE
;
;----------------------------------------
;
;       IY = KBHA POINTER
;
        IDTX    0
        PSCOPY  S0,0
        PSCOPY  P0,0
        IDEC    0
        IDKI    0
        IDSI    0
        IDRM    0
IDEXIT0:

IDTX    1
        PSCOPY  S0,1
        PSCOPY  P0,1
        IDEC    1
        IDKI    1
        IDSI    1
        IDRM    1
IDEXIT1:

IDTX    2
        PSCOPY  S0,2
        PSCOPY  P0,2
        IDEC    2
        IDKI    2
        IDSI    2
        IDRM    2
IDEXIT2:

IDTX    3
        PSCOPY  S0,3
        PSCOPY  P0,3
        IDEC    3
        IDKI    3
        IDSI    3
        IDRM    3
IDEXIT3:

NOEX
        IDTX    4
        PSCOPY  S0,4
        PSCOPY  P0,4
        IDEC    4
        IDKI    4
        IDSI    4
```

```
IDEXIT4:
        IDTX    5
        PSCOPY  S0,5
        PSCOPY  P0,5
        IDEC    5
        IDKI    5
        IDSI    5
IDEXIT5:
        IDTX    6
        PSCOPY  S0,6
        PSCOPY  P0,6
        IDEC    6
        IDKI    6
        IDSI    6
IDEXIT6:
        IDTX    7
        PSCOPY  S0,7
        PSCOPY  P0,7
        IDEC    7
        IDKI    7
        IDSI    7
IDEXIT7:

EXPN
;
; DO ERROR REPORTING
;
        DI
        LD      HL,ERRDCD
        LD      D,(HL)          ;D=ERRDCD
        LD      (HL),0          ;CLEAR ERROR
        LD      A,(FGDCD)
        LD      E,A             ;E=VAL
        EI
        LD      B,3             ;B=ERROR CODE
        LD      A,D
        OR      A
        JP      Z,IDER1

DO_ERR  0
        DO_ERR  1
        DO_ERR  2
        DO_ERR  3
        DO_ERR  4
        DO_ERR  5
        DO_ERR  6
        DO_ERR  7

IDER1:
        DI
        LD      HL,ERRBRK
        LD      A,(HL)
        LD      (HL),0          ;CLEAR ERROR
        EI
        OR      A
        JP      Z,IDER2
        LD      D,A             ;D=ERRBRK
        LD      E,0
        LD      B,0             ;B=ERROR CODE

DO_ERR  0
        DO_ERR  1
        DO_ERR  2
        DO_ERR  3
        DO_ERR  4
        DO_ERR  5
        DO_ERR  6
        DO_ERR  7

IDER2:

;-----------------------------------------------------
;
;   handle diskled cmd here
;
;-----------------------------------------------------
        ld      hl,diskled      ;host cmd
        ld      a,(diskold)     ;old copy
        xor     (hl)
        jp      z,idled9
        ld      a,(hl)
        ld      (diskold),a     ;store it
        or      a
        jr      z,idled1
        ld      a,2
idled1: or      80h             ;a has cmd byte for led
        ld      b,a
```

```
                idled   0
                idled   1
                idled   2
                idled   3
                idled   4
                idled   5
                idled   6
                idled   7
idled9:
                JP      idle
;----------------------------------------------------------------
;
;       IDLE LOOP END
;
;----------------------------------------------------------------

;----------------------------------------------------------------
;
;       INTERRUPT SERVICE ROUTINE
;
;----------------------------------------------------------------

INT_HS0:        URHSINT 0
INT_RX0:        URRXINT 0
INT_TX0:        URTXINT 0
INT_EX0:        UREXINT 0
INT_ER0:        URERINT 0
INT_OT0:        URONLTX 0
INT_OR0:        URONLRX 0

INT_HS1:        URHSINT 1
INT_RX1:        URRXINT 1
INT_TX1:        URTXINT 1
INT_EX1:        UREXINT 1
INT_ER1:        URERINT 1
INT_OT1:        URONLTX 1
INT_OR1:        URONLRX 1

INT_HS2:        URHSINT 2
INT_RX2:        URRXINT 2
INT_TX2:        URTXINT 2
INT_EX2:        UREXINT 2
INT_ER2:        URERINT 2
INT_OT2:        URONLTX 2
INT_OR2:        URONLRX 2

INT_HS3:        URHSINT 3
INT_RX3:        URRXINT 3
INT_TX3:        URTXINT 3
INT_EX3:        UREXINT 3
INT_ER3:        URERINT 3
INT_OT3:        URONLTX 3
INT_OR3:        URONLRX 3

NOEX
INT_HS4:        URHSINT 4
INT_RX4:        URRXINT 4
INT_TX4:        URTXINT 4
INT_EX4:        UREXINT 4
INT_ER4:        URERINT 4
INT_OT4:        URONLTX 4
INT_OR4:        URONLRX 4

INT_HS5:        URHSINT 5
INT_RX5:        URRXINT 5
INT_TX5:        URTXINT 5
INT_EX5:        UREXINT 5
INT_ER5:        URERINT 5
INT_OT5:        URONLTX 5
INT_OR5:        URONLRX 5

INT_HS6:        URHSINT 6
INT_RX6:        URRXINT 6
INT_TX6:        URTXINT 6
INT_EX6:        UREXINT 6
INT_ER6:        URERINT 6
INT_OT6:        URONLTX 6
INT_OR6:        URONLRX 6

INT_HS7:        URHSINT 7
INT_RX7:        URRXINT 7
INT_TX7:        URTXINT 7
INT_EX7:        UREXINT 7
INT_ER7:        URERINT 7
INT_OT7:        URONLTX 7
INT_OR7:        URONLRX 7

EXPN
```

```
;----------------------------------------------------------
;
;  INITIALIZE QUEUE BEG, END, HEAD & TAIL VALUE TO DEFAULT
;
;  INPUT A = CH #
;----------------------------------------------------------
DFQTINIT:
        ADD     A,A
        ADD     A,A
        ADD     A,A
        ADD     A,A
        LD      C,A
        LD      B,0
        LD      HL,TBBAS00
        ADD     HL,BC
        EX      DE,HL
        LD      HL,DFQUEDAT
        ADD     HL,BC
        LD      BC,10H
        LDIR
        RET

;----------------------------------------------------------
;
;  SET UP DEFAULT CHANNEL DATA INTO CHANNEL STATUS AREA
;
;  INPUT A = CH #
;----------------------------------------------------------
DFCHINIT:
        LD      B,A
        ADD     A,A
        ADD     A,A
        ADD     A,B
        LD      DE,TCHBU00
        ADD     A,E
        LD      E,A
        LD      HL,DFCHNDAT
        LD      BC,05
        LDIR
        RET
;----------------------------------------------------------

DO_ERX:
        LD      HL,(TBHASTA)
        LD      (HL),05H        ;ERROR STATUS = 5
        INC     HL
        LD      (HL),C          ;REG C = ERR CH
        INC     HL
        LD      (HL),B          ;REG B = ERR CODE
        INC     HL
        LD      (HL),A          ;REG A = VAL
        INC     HL
        EX      DE,HL
        LD      HL,(TBEASTA)
        XOR     A
        SBC     HL,DE
        JR      NC,DO_ERX0
        LD      DE,(TBBASTA)
DO_ERX0:
        LD      A,(TBTLSTA+1)
        LD      HL,(TBTLSTA)
        XOR     H
        JR      NZ,DO_ERX0
        SBC     HL,DE
        JR      NZ,DO_ERX1
        RET
DO_ERX1:
        XOR     A
        DI
        LD      (TBHASTA+1),A
        EI
        LD      (TBHASTA),DE
        RET
;

CHTABINT:
        XOR     A
AUTO1253:
        LD      (WORKCHAN),A
        CALL    DFQTINIT        ;TX RX Q HD/TL PT INIT
        LD      A,(WORKCHAN)
        CALL    DFCHINIT        ;CHAN TABLE INIT
        LD      A,(WORKCHAN)
        INC     A
        CP      08H
        JR      NZ,AUTO1253
        RET

;--------------------------------
;  OUTPUT QUEUE SIZING
```

```
;---------------------------------
QSIZING:
        LD      B,8
        LD      DE,12H
        LD      HL,TBEAS00+1
        LD      IY,QSZSC0
QSIZI00:
        LD      (IY+00H),00H
        LD      A,(HL)          ;MSB OF END ADDR
        DEC     HL
        DEC     HL
        SUB     (HL)            ;HL -> MSB OF BEG ADDR
        INC     A               ;END - BEG + 1
        LD      (IY+01H),A      ;SAVE IT
        ADD     HL,DE           ;DE = 12H I.E. HL -> NEXT END ADDR
        INC     IY
        INC     IY
        DJNZ    QSIZI00

LD      B,8
        LD      DE,22H
        LD      HL,TBEAP00+1
        LD      IY,QSZP00
QSIZI10:
        LD      (IY+00H),00H
        LD      A,(HL)          ;MSB OF END ADDR
        DEC     HL
        DEC     HL
        SUB     (HL)            ;HL -> MSB OF BEG ADDR
        INC     A               ;END - BEG + 1
        LD      (IY+01H),A      ;SAVE IT
        ADD     HL,DE           ;DE = 12H I.E. HL -> NEXT END ADDR
        INC     IY
        INC     IY
        DJNZ    QSIZI10
        RET

;----------------------------------------------------
;
;   DART INIT ROUTINE
;
;----------------------------------------------------
DARTINIT:
        LD      HL,URTDATA0
        LD      B,0BH
        LD      C,UART0C
        OTIR
        LD      HL,URTDATA1
        LD      B,0BH
        LD      C,UART1C
        OTIR
        LD      HL,URTDATA2
        LD      B,0BH
        LD      C,UART2C
        OTIR
        LD      HL,URTDATA3
        LD      B,0BH
        LD      C,UART3C
        OTIR
        LD      HL,URTDATA4
        LD      B,0BH
        LD      C,UART4C
        OTIR
        LD      HL,URTDATA5
        LD      B,0BH
        LD      C,UART5C
        OTIR
        LD      HL,URTDATA6
        LD      B,0BH
        LD      C,UART6C
        OTIR
        LD      HL,URTDATA7
        LD      B,0BH
        LD      C,UART7C
        OTIR
        RET

;---------------------------------------
;
;   SEND BREAK CODE TO HWS
;
;---------------------------------------
SNDBRK:
        IN      A,(UART0C)      ;JUST RESET POINTER
        IN      A,(UART1C)
        IN      A,(UART2C)
        IN      A,(UART3C)
        IN      A,(UART4C)
        IN      A,(UART5C)
        IN      A,(UART6C)
```

```
                IN      A,(UART7C)
                LD      A,5
                OUT     (UART0C),A
                OUT     (UART1C),A
                OUT     (UART2C),A
                OUT     (UART3C),A
                OUT     (UART4C),A
                OUT     (UART5C),A
                OUT     (UART6C),A
                OUT     (UART7C),A
                LD      A,0F8H
                OUT     (UART0C),A
                OUT     (UART1C),A
                OUT     (UART2C),A
                OUT     (UART3C),A
                OUT     (UART4C),A
                OUT     (UART5C),A
                OUT     (UART6C),A
                OUT     (UART7C),A
                LD      A,80H                   ;SEND BREAK TO WS
                LD      (TXHA0),A
                LD      (TXHA1),A
                LD      (TXHA2),A
                LD      (TXHA3),A
                LD      (TXHA4),A
                LD      (TXHA5),A
                LD      (TXHA6),A
                LD      (TXHA7),A
                LD      A,0
                OUT     (UART0D),A
                OUT     (UART1D),A
                OUT     (UART2D),A
                OUT     (UART3D),A
                OUT     (UART4D),A
                OUT     (UART5D),A
                OUT     (UART6D),A
                OUT     (UART7D),A
                RET

;----------------------------------------
;
; UPON ENTRY:                           UPDATE: SAVE TABLE, B_RM_FUL
;       A = CNTDAC
;       HL = TBDAC
;       DE = TX BUF HEADER
; RETURN:
;       A = NEW CNTDAC
;
;----------------------------------------
IDRMS:
                PUSH    DE                      ;SAVE TX POINTER
                LD      B,A                     ;B = CNTDAC
                ADD     A,A
                ADD     A,B                     ;CURRENT INDEX
                LD      C,A                     ;INDEX SAVE
                LD      D,H
                LD      E,A                     ;DE -> HOST TABLE
                LD      A,H
                ADD     A,8                     ;SET SAVE TABLE ADDRESS
                LD      H,A
                LD      L,E                     ; HL -> SAVE TABLE
IDRMS1:
                LD      A,(DE)
                CP      (HL)
                JR      NZ,IDRMS2               ;COMPARE 'R'
                INC     E
                INC     L
                LD      A,(DE)
                CP      (HL)
                JR      NZ,IDRMS2               ;COMPARE 'G'
                INC     E
                INC     L
                LD      A,(DE)
                CP      (HL)
                JR      NZ,IDRMS2               ;COMPARE 'B'
                INC     E
                INC     L
                LD      C,E                     ;GET NEW SAVE
                INC     B                       ;INCREASE CNTDAC
                LD      A,B
                CP      3FH
                JR      C,IDRMS1
                LD      A,0
                POP     HL                      ;BALANCE STACK
                RET                             ;IF END

IDRMS2:
                LD      E,C                     ;RECOVER STARTING ADDR
                LD      L,C
                LD      A,(DE)                  ;COPY FROM HOST TABLE TO SAVE TABLE
```

```
        LD      (HL),A
        INC     E
        INC     L
        LD      A,(DE)
        LD      (HL),A
        INC     E
        INC     L
        LD      A,(DE)
        LD      (HL),A
        LD      E,C                     ;DE = HOST TABLE ADDRESS
                                        ;B = CNTDAC
        POP     HL                      ;GET TX HEAD
        LD      A,RM_TYP
        LD      (HL),A
        INC     L
        LD      A,B
        OR      0C0H                    ;ADDRESS BYTE
        LD      (HL),A
        INC     L
        LD      A,(DE)
        OR      80H                     ;SET 80H FOR SPECIAL DATA BYTE
        LD      (HL),A
        INC     L
        INC     DE
        LD      A,(DE)
        OR      80H                     ;SET 80H FOR SPECIAL DATA BYTE
        LD      (HL),A
        INC     L
        INC     DE
        LD      A,(DE)
        OR      80H                     ;SET 80H FOR SPECIAL DATA BYTE
        LD      (HL),A
        INC     L
        LD      (IY + TXHA),L           ;TX HEAD
        SET     B_RM_FUL,(IY+ FGOUT)
        INC     B
        LD      A,B
        CP      3FH
        RET     C
        LD      A,0
        RET

;------------------------------------
;
; SELF TEST ONLY CALLED BY RESET
;
;------------------------------------

RESETST:
        XOR     A
        LD      HL,00
ROMTST:
        ADD     A,(HL)                  ;DO ROM CHECK SUM
        INC     HL
        LD      B,A
        LD      A,H
        CP      ROMSIZE                 ;80H
        LD      A,B
        JR      NZ,ROMTST
        OR      A
        JR      Z,RAMTST
        LD      HL,ERROM
        LD      (HL),0FFH               ;ROM CHECK SUM ERROR
RAMTST:
        LD      HL,RAMADDR              ;RAM TEST START
        LD      DE,FGBRDSTA
RAMTST0:
        LD      B,(HL)
        LD      (HL),55H                ;TEST 55H
        LD      A,(HL)
        CP      55H
        JR      NZ,RAMTST2
        LD      (HL),0AAH               ;TEST AAH
        LD      A,(HL)
        CP      0AAH
        JR      NZ,RAMTST2
        LD      (HL),B
        INC     HL
        LD      A,L
        CP      E
        JR      NZ,RAMTST1
        LD      A,H
        CP      D
        JR      NZ,RAMTST1
        INC     HL
RAMTST1:
        LD      A,H
        OR      L
        JR      NZ,RAMTST0
        LD      A,C
```

```
                OR      A
                RET     Z
RAMTST2:
                LD      HL,ERRRAM
                LD      (HL),0FFH
                RET
```

;----------------------------------------------
;
; RX INTERRUPT ROUTINE
;       COMMAND ROUTINE
;
;----------------------------------------------

```
RXCASE00:
RXCASE04:
RXCASE08:
RXCASE0C:
RXCASE0D:
RXCASE0F:
                EXX
                EX      AF,AF
                EI
                RETI

RXCASE01:
                LD      (IX+RXDSW),A
                EXX
                EX      AF,AF
                EI
                RETI

RXCASE02:
                LD      (IX+RXDSW),A
                EXX
                EX      AF,AF
                EI
                RETI
RXCASE03:
                LD      (IX+RXDSW),A
                EXX
                EX      AF,AF
                EI
                RETI
RXCASE05:
                SET     B_CM_STP,(IX+FGOUT)
                EXX
                EX      AF,AF
                EI
                RETI
RXCASE06:
                SET     B_SO_STP,(IX+FGOUT)
                EXX
                EX      AF,AF
                EI
                RETI
RXCASE07:
                SET     B_PO_STP,(IX+FGOUT)
                EXX
                EX      AF,AF
                EI
                RETI
RXCASE09:
                RES     B_CM_STP,(IX+FGOUT)
                EXX
                EX      AF,AF
                EI
                RETI
RXCASE0A:
                RES     B_SO_STP,(IX+FGOUT)
                EXX
                EX      AF,AF
                EI
                RETI
RXCASE0B:
                RES     B_PO_STP,(IX+FGOUT)
                EXX
                EX      AF,AF
                EI
                RETI
RXCASE0E:
                LD      (IX+RDMASK),7FH
                EXX
                EX      AF,AF
                EI
                RETI
```

;----------------------------------------------
; RX INTERRUPT ROUTINE
;       STATUS COMMAND ROUTINE
;       UPON ENTRY: IX= KBHA$0

```
;                       B = STATUS RECEIVED
;                       C = CHANNEL BIT
;--------------------------------------------------
STATABLE:
        DW      _STANUL,_STANUL,_STANUL,_STANUL ;NULL STATUS
        DW      _STANUL,_STANUL,_STANUL,_STANUL ;NULL STATUS
        DW      _STA10,_STA12,_STA14,_STA16
        DW      _STA18,_STA1A,_STA1C,_STA1E
        DW      _STA20,_STA22,_STA24,_STA26
        DW      _STA28,_STA2A,_STA2C,_STA2E
        DW      _STA30,_STA32,_STA34,_STA36

STALEN: EQU     $ - STATABLE

_STA32:
_STA34:
_STA36:
_STANUL:
        EXX
        EX      AF,AF
        EI
        RETI
;--------------------------------------------------
; STATUS 10 - 1F  EPROM REV. 0 TO F
;--------------------------------------------------
_STA10:
_STA12:
_STA14:
_STA16:
_STA18:
_STA1A:
_STA1C:
_STA1E:
        LD      A,B
        AND     0FH             ;KEEP REV #
        LD      B,A
        LD      A,0F0H
        AND     (IX+STATA)      ;MASK OFF THE FW REV #
        OR      B
        LD      (IX+STATA),A
        JR      _STANUL
;--------------------------------------------------
; STATUS 20 - 21  ROM OK/FAIL, 0=OK, 1=FAIL (stata b7)
;--------------------------------------------------
_STA20:
        LD      A,B
        AND     1
        JR      Z,_STA201
        SET     7,(IX+STATA)
        JR      _STANUL
_STA201:
        RES     7,(IX+STATA)
        JR      _STANUL
;--------------------------------------------------
; STATUS 22 - 23  RAM OK/FAIL, 0=OK, 1=FAIL
;--------------------------------------------------
_STA22:
        LD      A,B
        AND     1
        JR      Z,_STA221
        SET     6,(IX+STATA)
        JR      _STANUL
_STA221:
        RES     6,(IX+STATA)
        JR      _STANUL
;--------------------------------------------------
; STATUS 24 - 25  PRINTER PAPER OUT
;--------------------------------------------------
_STA24:
        LD      A,B
        AND     1
        JR      Z,_STA241
        SET     5,(IX+STATB)
        JR      _STANUL
_STA241:
        RES     5,(IX+STATB)
        JR      _STANUL
;--------------------------------------------------
; STATUS 26 - 27  PRINTER SELECT
;--------------------------------------------------
_STA26:
        LD      A,B
        AND     1
        JR      Z,_STA261
        SET     4,(IX+STATB)
        JR      _STANUL
_STA261:
        RES     4,(IX+STATB)
        JR      _STANUL
;--------------------------------------------------
```

```
; STATUS 28 - 29  PRINTER ERROR
;------------------------------------------------------------
_STA28:
        LD      A,B
        AND     1
        JR      Z,_STA281
        SET     3,(IX+STATB)
        JR      _STANUL
_STA281:
        RES     3,(IX+STATB)
        JR      _STANUL
;------------------------------------------------------------
; STATUS 2A - 2B  DCD LINE STATUS CHANGED
;------------------------------------------------------------
_STA2A:
        LD      HL,ERRDCD
        LD      A,C
        OR      (HL)
        LD      (HL),A          ;SET ERROR DCD
        LD      HL,FGDCD
        LD      A,B
        AND     1
        JR      Z,_STA2A1
        LD      A,C
        OR      (HL)            ;SET DCD
        LD      (HL),A
        JR      _STANUL
_STA2A1:
        LD      A,C
        XOR     0FFH
        AND     (HL)
        LD      (HL),A
        JP      _STANUL
;------------------------------------------------------------
; STATUS 2C - 2D  BREAK DETECT
;------------------------------------------------------------
_STA2C:
        LD      HL,ERRBRK
        LD      A,C
        OR      (HL)
        LD      (HL),A          ;SET ERROR BREAK
        JP      _STANUL
;------------------------------------------------------------
; STATUS 2E - 2F  HWS ONLINE 1=ON,0=OFF
;------------------------------------------------------------
_STA2E:
        LD      A,B
        AND     1
        JR      Z,_STA2E1
        SET     4,(IX+STATA)
        JP      _STANUL
_STA2E1:
        RES     4,(IX+STATA)
        JP      _STANUL
;------------------------------------------------------------
; STATUS 30 - 31  HWS CTS LINE CHANGE
;------------------------------------------------------------
_STA30:
        LD      HL,FGCTS
        LD      A,B
        AND     1
        JR      Z,_STA301
        LD      A,C
        OR      (HL)            ;SET CTS
        LD      (HL),A
        JP      _STANUL
_STA301:
        LD      A,C
        XOR     0FFH
        AND     (HL)
        LD      (HL),A
        JP      _STANUL

;
;
;         NAME        BYTES   ADDR
;         ==================================
;       1. KI  BUFFER    32    FA00 - FAFF
;       2. EC  BUFFER    32    FB00 - FBFF
;       3. CMD BUFFER   256    E800 - EFFF
;       4. TXD BUFFER   256    E000 - E7FF
;       5  HS  BUFFER   256    D800 - DFFF
;       6. SI  BUFFER   256    D000 - D7FF
;       7. SO  BUFFER  1024    A000 - BFFF
;       8. PO  BUFFER  1024    8000 - 9FFF
;

DFQUEDAT:
        DW      0A000H,0A3FFH,0A000H,0A000H, 0D000H,0D0FFH,0D000H,0D000H
```

```
            DW      0A400H,0A7FFH,0A400H,0A400H, 0D100H,0D1FFH,0D100H,0D100H
            DW      0A800H,0ABFFH,0A800H,0A800H, 0D200H,0D2FFH,0D200H,0D200H
            DW      0AC00H,0AFFFH,0AC00H,0AC00H, 0D300H,0D3FFH,0D300H,0D300H
            DW      0B000H,0B3FFH,0B000H,0B000H, 0D400H,0D4FFH,0D400H,0D400H
            DW      0B400H,0B7FFH,0B400H,0B400H, 0D500H,0D5FFH,0D500H,0D500H
            DW      0B800H,0BBFFH,0B800H,0B800H, 0D600H,0D6FFH,0D600H,0D600H
            DW      0BC00H,0BFFFH,0BC00H,0BC00H, 0D700H,0D7FFH,0D700H,0D700H
CHDSTAQ:
            DW      0F200H,0F5FFH,0F200H,0F200H, 0F600H,0F7FFH,0F600H,0F600H
            DB      05,0E4H,11H,13H,12H
            DB      05,0E4H,11H,13H,12H
            DB      05,0E4H,11H,13H,12H
            DB      05,0E4H,11H,13H,12H
            DB      05,0E4H,11H,13H,12H
            DB      05,0E4H,11H,13H,12H
            DB      05,0E4H,11H,13H,12H
            DB      05,0E4H,11H,13H,12H

SH4QDAT:
SHQDAT0:
            DB      0,0,0,0, 0,0,0,0, 0,0,0FFH,0, 0,0,0,0
            DW      08000H,083FFH,08000H,08000H, 0,0C000H,0,0
SHQDAT1:
            DB      0,0,0,0, 0,0,0,0, 0,0,0FFH,0, 0,0,0,0
            DW      08400H,087FFH,08400H,08400H, 0,0C100H,0,0
SHQDAT2:
            DB      0,0,0,0, 0,0,0,0, 0,0,0FFH,0, 0,0,0,0
            DW      08800H,08BFFH,08800H,08800H, 0,0C200H,0,0
SHQDAT3:
            DB      0,0,0,0, 0,0,0,0, 0,0,0FFH,0, 0,0,0,0
            DW      08C00H,08FFFH,08C00H,08C00H, 0,0C300H,0,0
SHQDAT4:
            DB      0,0,0,0, 0,0,0,0, 0,0,0FFH,0, 0,0,0,0
            DW      09000H,093FFH,09000H,09000H, 0,0C400H,0,0
SHQDAT5:
            DB      0,0,0,0, 0,0,0,0, 0,0,0FFH,0, 0,0,0,0
            DW      09400H,097FFH,09400H,09400H, 0,0C500H,0,0
SHQDAT6:
            DB      0,0,0,0, 0,0,0,0, 0,0,0FFH,0, 0,0,0,0
            DW      09800H,09BFFH,09800H,09800H, 0,0C600H,0,0
SHQDAT7:
            DB      0,0,0,0, 0,0,0,0, 0,0,0FFH,0, 0,0,0,0
            DW      09C00H,09FFFH,09C00H,09C00H, 0,0C700H,0,0

;-----------------------------------------------------------------
;
; UART INTERRUPT JUMP TABLE [TX, EXT/STA, RX, ERR PE/OE/FE)
;       ONLY FOR INIT CODE
;-----------------------------------------------------------------
INT_TB:
INT_CH1:        DW      INT_TX1,INT_EX1,INT_RX1,INT_ER1
INT_CH0:        DW      INT_TX0,INT_EX0,INT_RX0,INT_ER0
INT_CH3:        DW      INT_TX3,INT_EX3,INT_RX3,INT_ER3
INT_CH2:        DW      INT_TX2,INT_EX2,INT_RX2,INT_ER2
INT_CH5:        DW      INT_TX5,INT_EX5,INT_RX5,INT_ER5
INT_CH4:        DW      INT_TX4,INT_EX4,INT_RX4,INT_ER4
INT_CH7:        DW      INT_TX7,INT_EX7,INT_RX7,INT_ER7
INT_CH6:        DW      INT_TX6,INT_EX6,INT_RX6,INT_ER6

;-----------------------------------------------------------------
;
;   START/STOP SENDING ROUTINE
;
;-----------------------------------------------------------------

DFCHNDAT:
            DB      05H,0E4H,11H,13H,12H

URTDATA0:       ;DART INIT DATA,
            DB      18H,14H,04H,13H,0C1H,15H,0E8H,12H,00H,11H,17H
URTDATA1:       ;DART INIT DATA,
            DB      18H,14H,04H,13H,0C1H,15H,0E8H,12H,00H,11H,17H
URTDATA2:       ;DART INIT DATA,
            DB      18H,14H,04H,13H,0C1H,15H,0E8H,12H,10H,11H,17H
URTDATA3:       ;DART INIT DATA,
            DB      18H,14H,04H,13H,0C1H,15H,0E8H,12H,10H,11H,17H
URTDATA4:       ;DART INIT DATA,
            DB      18H,14H,04H,13H,0C1H,15H,0E8H,12H,20H,11H,17H
URTDATA5:       ;DART INIT DATA,
            DB      18H,14H,04H,13H,0C1H,15H,0E8H,12H,20H,11H,17H
URTDATA6:       ;DART INIT DATA,
            DB      18H,14H,04H,13H,0C1H,15H,0E8H,12H,30H,11H,17H
URTDATA7:       ;DART INIT DATA,
            DB      18H,14H,04H,13H,0C1H,15H,0E8H,12H,30H,11H,17H

;       0       18h = reset dart
;       1       14h = reset ext/status int, select reg 4
;       2       04h -> wr4 data. x1 clk, 1 stop bit, no parity
```

```
;       3               13h = reset ext/status int, select reg 3
;       4               c1h -> wr3 data. rx 8 bits, rx enable.
;       5               15h = reset ext/status int, select reg 5
;       6               e8h -> wr5 data. dtr,tx 8 bits,tx enable
;       7               12h = reset ext/status int, select reg 2
;       8               xxh -> wr2 data. int vector offset
;       9               11h = reset ext/status int, select reg 1
;       a               17h -> wr1 data : en tx_int, ext/st_int, rx_int
;                           rx_err_int
;--------------------------------------------------------------------;
;
;------ DEFAULT RAMDAC COLOR VALUE TABLE                             ;
;
;              R       G       B       address
RM_TABLE:
        DB     00H,    00H,    00H     ; 00
        DB     00H,    00H,    2AH     ; 01
        DB     00H,    2AH,    00H     ; 02
        DB     00H,    2AH,    2AH     ; 03
        DB     2AH,    00H,    00H     ; 04
        DB     2AH,    00H,    2AH     ; 05
        DB     2AH,    2AH,    00H     ; 06
        DB     2AH,    2AH,    2AH     ; 07
        DB     00H,    00H,    15H     ; 08
        DB     00H,    00H,    3FH     ; 09
        DB     00H,    2AH,    15H     ; 0A
        DB     00H,    2AH,    3FH     ; 0B
        DB     2AH,    00H,    15H     ; 0C
        DB     2AH,    00H,    3FH     ; 0D
        DB     2AH,    2AH,    15H     ; 0E
        DB     2AH,    2AH,    3FH     ; 0F
        DB     00H,    15H,    00H     ; 10
        DB     00H,    15H,    2AH     ; 11
        DB     00H,    3FH,    00H     ; 12
        DB     00H,    3FH,    2AH     ; 13
        DB     2AH,    15H,    00H     ; 14
        DB     2AH,    15H,    2AH     ; 15
        DB     2AH,    3FH,    00H     ; 16
        DB     2AH,    3FH,    2AH     ; 17
        DB     00H,    15H,    15H     ; 18
        DB     00H,    15H,    3FH     ; 19
        DB     00H,    3FH,    15H     ; 1A
        DB     00H,    3FH,    3FH     ; 1B
        DB     2AH,    15H,    15H     ; 1C
        DB     2AH,    15H,    3FH     ; 1D
        DB     2AH,    3FH,    15H     ; 1E
        DB     2AH,    3FH,    3FH     ; 1F
        DB     15H,    00H,    00H     ; 20
        DB     15H,    00H,    2AH     ; 21
        DB     15H,    2AH,    00H     ; 22
        DB     15H,    2AH,    2AH     ; 23
        DB     3FH,    00H,    00H     ; 24
        DB     3FH,    00H,    2AH     ; 25
        DB     3FH,    2AH,    00H     ; 26
        DB     3FH,    2AH,    2AH     ; 27
        DB     15H,    00H,    15H     ; 28
        DB     15H,    00H,    3FH     ; 29
        DB     15H,    2AH,    15H     ; 2A
        DB     15H,    2AH,    3FH     ; 2B
        DB     3FH,    00H,    15H     ; 2C
        DB     3FH,    00H,    3FH     ; 2D
        DB     3FH,    2AH,    15H     ; 2E
        DB     3FH,    2AH,    3FH     ; 2F
        DB     15H,    15H,    00H     ; 30
        DB     15H,    15H,    2AH     ; 31
        DB     15H,    3FH,    00H     ; 32
        DB     15H,    3FH,    2AH     ; 33
        DB     3FH,    15H,    00H     ; 34
        DB     3FH,    15H,    2AH     ; 35
        DB     3FH,    3FH,    00H     ; 36
        DB     3FH,    3FH,    2AH     ; 37
        DB     15H,    15H,    15H     ; 38
        DB     15H,    15H,    3FH     ; 39
        DB     15H,    3FH,    15H     ; 3A
        DB     15H,    3FH,    3FH     ; 3B
        DB     3FH,    15H,    15H     ; 3C
        DB     3FH,    15H,    3FH     ; 3D
        DB     3FH,    3FH,    15H     ; 3E
        DB     3FH,    3FH,    3FH     ; 3F

END
```

*Appendix B*
*Emity Workstation*

```
;----------------------------------------------------------
;           RELEASE NOTE:
;    02-20-1992     rev e vws support
;                   increase power on time out to 1.3 sec for ast keyboard
;                   add ramdac support feature.
;    01-26-1992     rev d, receive status time out to check
;                   host does not send pwr led on cmd.
;    01-22-1992     REV D, SEND MORE HS INFO FOR HOST
;                   INSTEAD SEND NOP ALL THE TIME. HOST LOST
;                   SOME HANDSHAKE SIGNAL.
;    01-22-1992     REV D, FIX PRINTER ON LINE PROB, WHEN
;                   OFFLINE OCCURRED.
;    01-22-1992     REV D, FIX HOST READ ERROR
;    12-30-1991     rev d, 84 kb f7 and sysreq need to double
;                   map.
;    02-07-1991     rev c, increase input buffer to 1k
;                   for tsl emulink/send/fetch.
;    01-16-1991     rev b, add fw rev #, on-line timeout,
;                   fix break off cmd.
;    06-12-1990     REV A
;    06-17-1990     IX only used in interrupt routine
;                   IY only used in non-interrupt code.
;                   WHEN COMMUNICATION WITH HOST ADAPTER
;                   ALL TERMINOLOGY ARE FOLLOWED THE HOST SIDE
;                   FOR EXAMPLE: SERIAL DATA OUTPUT BUFFER
;                        MEANS: SERIAL DATA WILL SEND FROM SV-4
;                               TO THE RS232 LINE, AND HWS WILL
;                               RECEIVE THE SERIAL OUTPUT DATA
;                               AND HWS WILL RESEND THEM TO RS232
;
;                   SO BUF ---> SV-4 ---> HWS ---> RS232
;
;    ON LINE SETUP
;    <<HWSONL,HWSTOEN,HWSONCNT,BREAKCNT>>
;    HWSONL: >0 -- HWS IS ON LINE. =0 HWS IS OFFLINE.
;    HWSTOEN :  -- HWS TIME OUT COUNT FOR ON LINE.
;    HWSONCNT:  -- NUMBER OF DT_ONL RCV'D FROM SH.
;    BREAKCNT:  -- BREAK T.O. COUNT.
;
;    AFTER HWS IS RESET, IT WILL ENTER OFFLINE STATE. THEN IT WILL TRY
;    TO CONNECT TO SH AND GO TO ON LINE STATE.
;           1. SET UP HWSTOEN COUNT,
;           2. START SEND BREAK TO SH WITH 255 TX CHAR TIME.
;           3. STOP BREAK AFTER 255 TX CHAR HAS SENT, START SEND DT_ONL
;              TO SH.
;           4. COUNT THE RECEIVED DT_ONL CHAR IF COUNT = 4 THEN ENTER
;              ON LINE STATE.
;    IF DURING THE ON LINE PROCESS THE HWSTOEN OR CBLTOEN IS EXPIRED,
;    HWS WILL RESTART ITSELF AGAIN.
;
;
;    CABLE DISCONNECT OR NO CARRIER DETECTION.
;    <<ACT20CNT, CBLTOEN>>
;    ACT20CNT: ACTIVITY TIME OUT.   IT CAN BE DISABLED. IT IS DESIGNED
;           TO TIME OUT THE ACTIVITY BETWEEN SH AND HWS WITHIN ACTTO CNT
;           IF ANY ACTIVITY IS OCCURRED THEN ACT20CNT WILL BE
;           RE-INITIALIZED TO ITS FULL COUNT.
;    CBLTOEN: CABLE TIME OUT COUNT. IT CAN BE DISABLED. IT IS DESIGNED
;           TO TIME OUT THE SEND TIME FOR ANY DATA WHICH TAKE PLACE.
;           IF A TIME OUT OCCURRED THE CABLE IS DISCONNECTED.
;    WHEN HWS IS UP AND IS ONLINE THE ACT20CNT IS STARTED TO MONITOR
;    THE ACTIVITY BETWEEN SH AND HWS. WHEN ACT20CNT IS EXPIRED HWS WILL
;    TRY TO SEND A DT_NOP CHAR TO SH. IF CBLTOEN IS EXPIRED THEN A LOSS
;    CARRIER'S CONDITION IS OCCURRED, HWS WILL RESET ITSELF AND BACK TO
;    OFFLINE STATE.
;
;
;----------------------------------------------------------
;       NOLST
;       NCLUD   WORK.CON        ;CONSTANT & LABEL DEFINITION
;       LIST

REV_NO: EQU     4                       ;REV 'E' = A + #

STATUS_SET:     MACRO
                LD      L,(IY-ECHA+STHA)
                LD      H,HIST          ;HL STATUS HEAD (SOURCE)
                LD      (HL),A
                INC     HL
                LD      (IY-ECHA+STHA),L        ;STATUS TAIL
                MACND

ORG     0
BEGIN:
        DI
        JP      RSTZ80
        ORG     10H
CHRMSKTB:                               ;BIT MASK
        DB      1FH,7FH,3FH,0FFH        ;5,7,6,8
```

```
                DB      'HWS REV '
                DB      41H + REV_NO, ' Copyright 1990 MAXPEED CORP'

RXJMPTB:
                DW      RXCASE00,RXCASE01,RXCASE02,RXCASE03
                DW      RXCASE04,RXCASE05,RXCASE06,RXCASE07
                DW      RXCASE08,RXCASE09,RXCASE0A,RXCASE0B
                DW      RXCASE0C,RXCASE0D,RXCASE0E,RXCASE0F

ORG     66H
;------------------------------------------------------
;       KEYBOARD INTERRUPT SERVICE ROUTINE (NMI ROUTINE)
;------------------------------------------------------
NMIINTR:
                PUSH    AF              ;11
                PUSH    HL              ;11
                xor     a
                out     (o_nmien),a
                LD      HL,(KBACTION)   ;16
                JP      (HL)            ;4 TOTAL = 42 CK = 8.4 US
;------------------------------------------------------
;   KEYBOARD INPUT ISR 0 FOR RECEIVE START BIT
;------------------------------------------------------
KBIR0:
                IN      A,(KBDIPRT)     ; TEST START BIT
                AND     1               ; NEED TO BE 0
                JR      NZ,KBIR0_5      ; IF IT IS NOT A START BIT -> JUMP
                LD      HL,KBIR1
                LD      (KBACTION),HL
                LD      A,1
                LD      (KBTMFLAG),A    ;ENABLE 10 MS TIME OUT
                LD      HL,TO10MS
                LD      (KBTMCNT),HL    ;
KBIR0_5:                                ;NOP
                call    wfckhi
                POP     HL
                POP     AF
                RETN
;------------------------------------------------------
;   KEYBOARD INPUT ISR 1 FOR RECEIVE DATA BIT 0 - 7
;------------------------------------------------------
KBIR1:
                IN      A,(KBDIPRT)     ;READ KEYBOARD INPUT PORT
                SRL     A               ;LSB -> C
                LD      HL,KBINDAT      ;DATA STORAGE
                RR      (HL)            ;C -> MSB ----> LSB -> C
                INC     L               ;POINT TO KBINCNT
                DEC     (HL)            ;COUNT - 1
                JR      Z,KBIR1_1
                call    wfckhi
                POP     HL
                POP     AF
                RETN
KBIR1_1:
                LD      HL,KBIR2
                LD      (KBACTION),HL
                call    wfckhi
                POP     HL
                POP     AF
                RETN
;------------------------------------------------------
;   KEYBOARD INPUT ISR 2 FOR RECEIVE PARITY BIT
;------------------------------------------------------
KBIR2:
                LD      A,(KBINDAT)
                OR      A
                JP      PO,KBIR2_1      ;IF KBINDAT HAS ODD 1 -> JUMP
                IN      A,(KBDIPRT)     ; KBINDAT HAS EVEN 1 -> PAR BIT
                AND     1               ; NEED TO BE 1
                JR      Z,KBIR2_5       ; IF PARITY ERROR -> JUMP
                LD      HL,KBIR3
                LD      (KBACTION),HL
                call    wfckhi
                POP     HL
                POP     AF
                RETN
KBIR2_1:
                IN      A,(KBDIPRT)     ; KBINDAT HAS ODD 1 -> PAR BIT
                AND     1               ; NEED TO BE 0
                JR      NZ,KBIR2_5      ; IF PARITY ERROR -> JUMP
                LD      HL,KBIR3
                LD      (KBACTION),HL
                call    wfckhi
                POP     HL
                POP     AF
                RETN
KBIR2_5:                                ;PARITY ERROR
                LD      HL,KBINSTA      ;SET ERROR FLAG
                SET     KBPE,(HL)
                                        ;WE MAY NEED TO JUMP TO ERROR ROUTINE NOW
```

```
        call    wfckhi
        POP     HL
        POP     AF
        RETN
;----------------------------------------------------
;   KEYBOARD INPUT ISR 3 FOR RECEIVE STOP BIT
;----------------------------------------------------
KBIR3:
        IN      A,(KBDIPRT)     ; TEST STOP BIT
        AND     1               ; NEED TO BE 1
        JR      NZ,KBIR3_5      ; IF STOP BIT OK -> JUMP
        LD      HL,KBINSTA      ;SET ERROR FLAG
        SET     KBFE,(HL)
KBIR3_5:                        ;STOP BIT OK
        XOR     A
        LD      (KBTMFLAG),A    ; DISABLE TIME OUT COUNT
        OUT     (O_KCLK),A      ; STOP KEYBOARD DATA
        OUT     (O_NMIEN),A     ; DISABLE NMI CONDITION
        DEC     A
        LD      (KBINFUL),A     ; KEYBOARD DATA FULL = FF
        POP     HL
        POP     AF
        RETN
;----------------------------------------------------
;   KEYBOARD OUTPUT ISR 1 FOR SEND DATA BIT
;----------------------------------------------------
KBOR1:
        LD      HL,KBOUDAT
        RR      (HL)            ; C -> MSB ---> LSB -> C
        RLA     A               ; C -> LSB ---> MSB -> C
        OUT     (O_KDAT),A      ; SEND DATA OUT
        INC     L
        DEC     (HL)            ;COUNT - 1
        JR      Z,KBOR1_1
        call    wfckhi
        POP     HL
        POP     AF
        RETN
KBOR1_1:
        LD      HL,KBOR2
        LD      (KBACTION),HL
        call    wfckhi
        POP     HL
        POP     AF
        RETN
;----------------------------------------------------
;   KEYBOARD OUTPUT ISR 2 FOR SEND PARITY BIT
;----------------------------------------------------
KBOR2:
        LD      A,(KBOUPAR)     ;LOAD PARITY BIT
        OUT     (O_KDAT),A      ; SEND PARITY
        LD      HL,KBOR3
        LD      (KBACTION),HL
        call    wfckhi
        POP     HL
        POP     AF
        RETN
;----------------------------------------------------
;   KEYBOARD OUTPUT ISR 3 FOR SEND STOP BIT
;----------------------------------------------------
KBOR3:
        LD      A,1
        OUT     (O_KDAT),A      ; SEND STOP BIT
        LD      HL,KBOR4
        LD      (KBACTION),HL
        call    wfckhi
        POP     HL
        POP     AF
        RETN
;----------------------------------------------------
;   KEYBOARD OUTPUT ISR 4 FOR TEST DATA LINE CONTROL PROTOCOL
;----------------------------------------------------
KBOR4:
        IN      A,(KBDIPRT)     ; TEST DATA BIT
        AND     1               ; NEED TO BE 0
        JR      Z,KBOR4_5       ; IF = 1 I.E. KEYBOARD MAY NOT
        LD      HL,KBOUSTA      ; RECEIVE THESE DATA BIT
        SET     KBLE,(HL)       ; SET LINE CONTROL BIT ERROR
KBOR4_5:                        ;
        XOR     A
        LD      (KBOUFUL),A     ; KEYBOARD OUTPUT DATA NOT FULL
        OUT     (O_NMIEN),A     ; DISABLE NMI CONDITION LD      L,60            ;60 CYCLE
KBOR4_6:
        DEC     L
        JR      Z,KBOR4_7       ;T.O. -> JMP
        IN      A,(KBDIPRT)     ;CHECK DATA LINE
        AND     1
        JR      Z,KBOR4_6
```

```
            XOR     A
            LD      (KBTMFLAG),A    ; DISABLE TIME OUT COUNT
KBOR4_7:
            XOR     A
            OUT     (O_KCLK),A      ; STOP KEYBOARD CLOCK
            POP     HL
            POP     AF
            RETN
;--------------------------------------------------
; Z80 RESET ENTRY
;       INIT Z80 RAM AND EPRON CHECK.
;--------------------------------------------------
RSTZ80:
            DI                      ;DISABLE INTERRUPT
            LD      SP,STACKTOP     ;INIT STACK PT
            IM      2
            LD      A,0FFH          ;INIT INTERRUPT TABLE
            LD      I,A

XOR     A
            OUT     (O_NMIEN),A     ;DISABLE NMI INTERRUPT
            OUT     (O_KCLK),A      ;TURN OFF CLOCK
            ld      a,1
            OUT     (O_KDAT),A      ;NO DATA TO SEND

; INIT RAMDAC DEFAULT VALUE

LD      A,0FFH
            OUT     (DAC_MSK),A

LD      B,40H           ;TOTAL 64 ENTRY
            LD      C,0             ;START ADDRESS
            LD      HL,RM_TABLE
RM_INIT:
            LD      A,C             ;
            OUT     (DAC_WAR),A     ;LOAD ADDRESS
            LD      A,(HL)          ;LOAD RED
            OUT     (DAC_VAL),A
            INC     HL
            LD      A,(HL)          ;LOAD GREEN
            OUT     (DAC_VAL),A
            INC     HL
            LD      A,(HL)          ;LOAD BLUE
            OUT     (DAC_VAL),A
            INC     HL
            INC     C               ;INCREASE ADDRESS
            DEC     B
            JR      NZ,RM_INIT xor     a
            OUT     (O_NMIEN),A     ;DISABLE NMI INTERRUPT
            OUT     (O_LED0),A      ;TURN ON LED
            OUT     (O_LED1),A      ;TURN ON LED
            OUT     (O_PINIT),A     ;INIT THE PRINTER
            OUT     (O_KCLK),A      ;TURN OFF CLOCK
            INC     A
            OUT     (O_KDAT),A      ;NO DATA TO SEND
            OUT     (O_BUZ),A       ;TURN OFF BUZZER
            OUT     (O_PSTB),A      ;TURN OFF STROBE LD      HL,RAMADDR      ;RAMADDR
RST01:
            LD      (HL),00H        ;ZERO OUT RAM
            INC     HL
            LD      A,H
            LD      A,H
            OR      L
            JR      NZ,RST01        ;finish zero out the ram
            ld      hl,hwsid        ;init hws id
            ld      a,0
            ld      c,10
rst02:      ld      (hl),a
            inc     hl
            inc     a
            dec     c
            jr      nz,rst02:

;
; DO A 1.5 SEC DELAY, HELD KEYBOARD CLOCK LOW
;
            LD      A,6
KBDLY2:
            LD      C,0
KBDLY:
            LD      B,0
KBDLY1:
            DEC     B
            JR      NZ,KBDLY1
            DEC     C
```

```
        JR      NZ,KBDLY
        DEC     A
        JR      NZ,KBDLY2

CALL    DFTBINIT        ;do init table to default
        CALL    VECINIT         ;INIT DART INTR VEC TABLE
;       CALL    RESETST         ;do eprom,ram test
        CALL    HSTINIT         ;HOST CHANNEL INIT
        CALL    SIOINIT         ;SIO CHANNEL INIT
        CALL    OFFLINE         ;SEND BREAK AND INIT TMO CNT

; INIT KEYBOARD CODE CONVERTION TO XT CODE

LD      A,0FFH
        LD      (KBCODE),A      ;SET SCAN CODE 1

; INIT PRINTER PORT STATUS

IN      A,(PRNIPRT)     ;READ PRINTER STATUS PORT
        AND     0EH
        LD      (PRNNEW),A

;---------------------------------------
;   IDLE LOOP BEGIN
;---------------------------------------
IDLE:
        EI
        LD      IY,ECHA         ;TEST TX Q EMPTY OR NOT
        LD      A,(CMHA)
        LD      HL,CMTL
        SUB     (HL)            ;IS ANY CMD IN Q
        CP      2               ;MINIMUM COMMAND SIZE
        JP      C,IDTX          ;IF NO CMD -> JUMP
;---------------------------------------
;
;   COMMAND QUEUE PROCESS ROUTINE
;
;---------------------------------------
        LD      L,(HL)          ;L = CM TAIL LSB
        LD      H,HICM
        LD      C,(HL)          ; LOAD COMMAND TYPE
        INC     L
        LD      B,(HL)          ; B = VALUE
        INC     L
        LD      A,L
        LD      (CMDTAIL),A     ;TEMP STORAGE
        LD      A,C
        LD      HL,WORK_CMD
        LD      (HL),B
        SUB     20H             ; GET COMMAND INDEX
        CP      MAX_CMD
        JR      C,_IDLE10
        LD      A,(CMDTAIL)
        DEC     A
        LD      (CMDTAIL),A     ; SKIP THIS BAD CMD
        JP      _CMD99

_IDLE10:
        SLA     A
        LD      HL,CMDJPTAB     ;COMMAND TABLE
        LD      E,A
        LD      D,0
        ADD     HL,DE
        LD      E,(HL)
        INC     HL
        LD      D,(HL)
        EX      DE,HL
        JP      (HL)

CMDJPTAB:   DW      _CMD0       ;RESET CHANNEL CMD
            DW      _CMD1       ;SET BAUD RATE CMD
            DW      _CMD2       ;SET CHANNEL CONFIG
            DW      _CMD3       ;SET CHANNEL HANDSHAKE
            DW      _CMD4       ;BREAK CMD
            DW      _CMD5       ;XENIX CMD
            DW      _CMD6       ;DTR
            DW      _CMD7       ;SET HANDSHAKE START CHAR
            DW      _CMD8       ;SET HANDSHAKE STOP CHAR
            DW      _CMD9       ;LED 0 (POWER LED/GREEN)
            DW      _CMDA       ;LED 1 (ACTIVITY LED/YELLOW)
            DW      _CMDB       ;BEEPER CMD
            DW      _CMDC       ;KEYBOARD CMD 8BIT WAIT FOR ACK
            DW      _CMDD       ;KEYBOARD CMD 7BIT WAIT FOR ACK
            DW      _CMDE       ;KEYBOARD CMD 8BIT NOT WAIT FOR ACK
            DW      _CMDF       ;STATUS REQUEST
            DW      _CMD10      ;SET SCAN CODE TABLE
            DW      _CMD11      ;RTS CMD
            DW      _CMD12      ;RESERVED
```

```
MAX_CMD:        EQU     ($-CMDJPTAB) / 2

;----------------------------------------
; 0 = RESET CHANNEL COMMAND FROM PC
;----------------------------------------
_CMD0:
        CALL    CHDISABL
        LD      A,(WORK_CMD)
        BIT     0,A              ;BIT 0 = RESET OR NOT
        JR      Z,_CMD0_1
        CALL    DFQTINIT         ;RESET CH
        CALL    DFCHINIT
        CALL    SIOCFG
        CALL    STCFGDCD
        JR      _CMD0_3
_CMD0_1:
        LD      A,(TCHHSK)       ;LOAD HANDSHAKE BYTE
        AND     1BH              ;RE-START TX & RX
        LD      (TCHHSK),A
        CALL    SIOCFG
        CALL    STCFGDCD
_CMD0_3:
        LD      A,(WORK_CMD)
        BIT     1,A              ;BIT 1 = ENABLE /DISABLE
        JR      Z,_CMD0_2
        CALL    CHENABLE
        JP      _CMD99

_CMD0_2:
        CALL    CHDISABL
        JP      _CMD99

;----------------------------------------
; 1 = SET CHANNEL BAUD RATE
;----------------------------------------
_CMD1:
        LD      HL,TCHBUD
        LD      A,B
        AND     7
        LD      (HL),A           ;STORE BAUD RATE
        dec     a
        dec     a                ;start with 1200 = 2
        LD      HL,SIO_BTAB      ;BAUD RATE TABLE
        SLA     A
        LD      E,A
        LD      D,0
        ADD     HL,DE
        LD      A,5
        OUT     (HST_CMD),A      ;SELECT REG 5
        LD      A,(HL)           ;1ST BYTE IS SELECT BYTE
        OUT     (HST_CMD),A      ;WRITE TX8, TXENB, BKS0,BKS1
        INC     HL
        LD      A,(HL)           ;E=2ND BYTE
        LD      (SIO_DIV),A      ;NEW DIVISIOR
        LD      E,A
        LD      A,(TCHCFG)
        AND     0FH
        OR      E
        LD      E,A              ; NEW REG 4 CONTAIN
        LD      A,4
        OUT     (SIO_CMD),A
        LD      A,E
        OUT     (SIO_CMD),A
        JP      _CMD99
;
; 1ST BYTE = MUX SEL(HOST SIDE), 2ND BYTE = CLOCK DIV (SIO SIDE)
; HST_DTR= BKS0, HST_RTS= BKS1. dtr & rts are low true signal
; 68=(BKS1=0,BKS0=0), E8=(BSK1=0,BKS0=1),6A=(BKS1=1,BSK0=0)
;
SIO_BTAB:   DB  0EAH,0C0H,0EAH,080H,0EAH,040H    ;300,600,1200
            DB  06AH,0C0H,06AH,080H,06AH,040H    ;2400 4800 9600
            DB  0E8H,0C0H,0E8H,080H              ;19200 38400

;----------------------------------------
; 2 = SET CHANNEL CONFIG BYTE
;----------------------------------------
_CMD2:
        LD      A,(SIO_EN)
        PUSH    AF               ;SAVE OLD SIO_EN
        CALL    CHDISABL
        LD      HL,TCHCFG
        LD      A,B
        AND     0EFH
        LD      B,A
        LD      A,(HL)
        AND     10H
        OR      B
        LD      (HL),A           ;NEW CONFIG BYTE
```

```
        AND     OFH             ;
        LD      HL,SIO_DIV
        OR      (HL)
        LD      D,A             ;REG D = WR4
        LD      A,B
        AND     0C0H
        OR      1
        LD      E,A             ;REG E = WR3
        LD      C,SIO_CMD
        LD      A,3
        OUT     (C),A
        OUT     (C),E
        LD      A,4
        OUT     (C),A
        OUT     (C),D

CALL    SIO_WR5         ;SET UP WR 5

LD      A,B
        AND     0C0H
        RLCA
        RLCA
        LD      HL,CHRMSKTB     ;LOAD BIT / CHAR MASK
        ADD     A,L
        LD      L,A
        LD      A,(HL)
        LD      (BITMSK),A
        POP     AF
        OR      A
        JP      Z,_CMD99        ;IF IS DISABLE
        CALL    CHENABLE
        JP      _CMD99

;---------------------------------------
; 3 = SET HANDSHAKE MODE FOR CHANNEL
;---------------------------------------
_CMD3:
        LD      HL,SRTANY
        LD      a,b
        BIT     6,A
        LD      (HL),0
        JR      Z,_CMD3_1
        LD      (HL),0FFH       ;SO START W ANY CHAR
_CMD3_1:
        AND     18H
        LD      (TCHHSK),A
        JP      _CMD99

;---------------------------------------
; 4 = SEND BREAK 0=END, 1=START
;---------------------------------------
_CMD4:
        LD      A,B
        LD      (FGBRK),A       ;b0=0 break off, b0=1 break on
        CALL    SIO_WR5         ;INIT WR 5
        JP      _CMD99

;---------------------------------------
; 5 = xenix CMD  IGNBRK,IGNPAR,PARMRK,ISTRIP,NPRERR,TCXONC
;---------------------------------------
_CMD5:
        LD      A,B             ;GET CMD TYPE
        AND     07EH            ;MASK OFF MSB FOR EXTEND CMD
        SRL     A
        OR      A
        LD      HL,IGNBRK       ; 0
        JR      Z,_CMD599       ;IGNBRK
        DEC     A
        LD      HL,IGNPAR       ; 1
        JR      Z,_CMD599       ;IGNPAR
        DEC     A
        LD      HL,PARMRK       ; 2
        JR      Z,_CMD599       ;PARMRK
        DEC     A
        JR      Z,_CMD53        ; 3, ISTRIP
        DEC     A
        LD      HL,NPRERR       ; 4
        JR      Z,_CMD599       ;NPRERR
        DEC     A
        JR      Z,_CMD55        ;5, TCXONC
        JP      _CMD99          ;NOT A CMD
_CMD599:
        LD      A,B             ;GET CMD BYTE
        AND     1
        LD      (HL),A          ;SET CMD
        JP      _CMD99          ;END _CMD5 CMD
;       ISTRIP SETUP NEW BIT MASK FOR CH

_CMD53:
```

```
        LD      HL,TCHCFG       ;READ CONFIG BYTE
        LD      A,(HL)          ;A = CONFIG BYTE
        AND     0C0H
        RLCA
        RLCA
        LD      HL,CHRMSKTB
        ADD     A,L
        LD      L,A
        LD      D,(HL)
        BIT     0,B             ;READ CMD BYTE
        JR      Z,_CMD531
        LD      A,07FH          ;ISTRIP ON -> 7F
        JR      _CMD532
_CMD531:
        LD      A,0FFH          ;ISTRIP OFF -> FF
_CMD532:
        AND     D
        LD      D,A
        LD      HL,BITMSK
        LD      (HL),D
        LD      HL,ISTRIP
        JR      _CMD599
;
;       TCXONC COMAND
;
_CMD55:
        LD      A,B             ;GET STOP CMD
        AND     1
        JR      Z,_CMD599       ;WANT TO START IT
        LD      A,(FGSOACT)     ;else stop tx
        BIT     0,A
        JR      Z,_CMD599       ;STOPPED -> JUMP
        LD      HL,SIO_LTX      ;PUT LAST TX CMD IN
        DI
        LD      (SIO_TXVT),HL
        EI
        LD      HL,TCXONC
        JR      _CMD599

;----------------------------------------
; 6 = DTR CMD  0 -> DTR = 0, <>0 -> DTR = 1
;----------------------------------------
_CMD6:
        LD      HL,TCHCFG       ;ch config byte
        BIT     0,B             ;TEST DTR STATE
        RES     5,(HL)
        JR      Z,_CMD6_1
        SET     5,(HL)          ;SET DTR ON AT TCHCFG
_CMD6_1:
        CALL    SIO_WR5         ;SET UP WR5
        JP      _CMD99

;----------------------------------------
; 7 = SET START CHAR
;----------------------------------------
_CMD7:
        LD      HL,TCHSRT
        LD      A,07FH
        AND     B
        LD      (HL),A
        JP      _CMD99
;----------------------------------------
; 8 = SET STOP CHAR
;----------------------------------------
_CMD8:
        LD      HL,TCHSTP
        LD      A,07FH
        AND     B
        LD      (HL),A
        JP      _CMD99
;----------------------------------------
; 9 = LED 0 OFF/PULSE/ON COMMAND
;     00 = off, 01 = pulse, 10 = on.
;----------------------------------------
_CMD9:
        LD      A,B             ;LOAD COMMAND
        AND     3
        LD      (LED0ST),A
        OR      A
        JR      NZ,_CMD9_1
        LD      A,1             ;LED 0 OFF CMD
        OUT     (O_LED0),A
        JP      _CMD99
_CMD9_1:
        DEC     A
        JR      NZ,_CMD9_2
        LD      HL,LED0TIME
        LD      (LED0TIME),HL   ;INIT COUNT
        JP      _CMD99
```

```
_CMD9_2:
        DEC     A
        JR      NZ,_CMD9_3
        LD      (LEDOST),A              ;no toggle
        OUT     (O_LED0),A              ;turn it on
        JP      _CMD99
_CMD9_3:
        XOR     A
        LD      (LEDOST),A
        LD      A,1                     ;LED 0 OFF CMD
        OUT     (O_LED0),A
        JP      _CMD99

;-----------------------------------
; A = LED 1 OFF/PULSE/ON COMMAND
;     00 = off, 01 = pulse, 10 = on.
;-----------------------------------
_CMDA:
        LD      A,B                     ;LOAD COMMAND
        AND     3
        LD      (LED1ST),A
        OR      A
        JR      NZ,_CMDA_1
        LD      A,1                     ;LED 0 OFF CMD
        OUT     (O_LED1),A
        JP      _CMD99
_CMDA_1:
        DEC     A
        JR      NZ,_CMDA_2
        LD      HL,LEDTIME
        LD      (LED1TIME),HL           ;INIT COUNT
        JP      _CMD99
_CMDA_2:
        DEC     A
        JR      NZ,_CMDA_3
        OUT     (O_LED1),A
        JP      _CMD99
_CMDA_3:
        XOR     A
        LD      (LED1ST),A
        LD      A,1                     ;LED 0 OFF CMD
        OUT     (O_LED1),A
        JP      _CMD99

;-----------------------------------
; B = BEEPER COMMAND   B6-4=LONG CNT,B3-0 SHORT CNT.
;-----------------------------------
_CMDB:
        LD      A,B
        AND     0FH
        LD      (BEEPSHRT),A            ;LOAD SHORT CNT
        LD      A,B
        SRL     A
        SRL     A
        SRL     A
        SRL     A
        AND     7
        LD      (BEEPLONG),A
        LD      HL,BEEPOTIM
        LD      (BEEPTIME),HL           ;INIT BEEP TIME
        LD      A,5                     ;4=ACTIVE,2=ON/OFF,1=STATE
        LD      (BEEPST),A              ;INIT STATE
        OUT     (O_BUZ),A               ;TURN IT OFF ANYWAY
        JP      _CMD99

;-----------------------------------
; C = SEND DATA TO KEYBOARD                WAIT FOR ACK
; D = SEND DATA TO KEYBOARD. DATA * 7FH    WAIT FOR ACK
; E = SEND DATA TO KEYBOARD                NOT WAIT FOR ACK
;
;       support command 1. reset       ff
;                       2. resend      fe      key
;                       3. status ind  ed xx   ack ack
;                       4. scan code   f0 01   ack ack
;                       5. enable      f4      ack
;-----------------------------------
_CMDE:
        LD      C,0H                    ;NOT WAIT FOR ACK
        JR      _CMDC_1
_CMDD:
        LD      A,B
        AND     7FH
        LD      B,A
_CMDC:
        LD      C,0FFH                  ;SET UP WAIT FOR ACK FLAG
_CMDC_1:
        LD      A,(KBOUWFA)
        OR      A
        JP      NZ,_CMD100              ;IF NEED ACK -> JUMP
        LD      A,(KBINFUL)             ;KBD INPUT DATA
```

```
                OR      A
                JP      NZ,_CMD100      ;NEED TO PROCESS INPUT DATA 1ST
                LD      A,(KBTMFLAG)    ;CHECK KEYBOARD TIME OUT FLAG
                OR      A               ;IF KEYBOARD IS BUSY THEN
                JP      NZ,_CMD100      ;WAIT FOR NEXT LOOP
                LD      A,B
                LD      (KBOLAST),A     ;STORE INTO LAST SEND DATA
                LD      A,C
                LD      (KBOUWFA),A     ;DISABLE FURTHER OUTPUT
                CALL    SENDKEY

JP      _CMD99

;----------------------------------------
; F = STATUS REQUEST
;----------------------------------------
_CMDF:
                IN      A,(PRNIPRT)     ;READ PRINTER STATUS PORT
                XOR     0FFH            ;INVERT ALL BITS
                LD      (PRNNEW),A      ;FORCE IT TO REPORT ALL STATUS
                LD      A,0FFH
                LD      (ERRDCD),A      ;FORCE DCD HOST UPDATE
                LD      (ERRCTS),A      ;FORCE CTS HOST UPDATE
                ld      (sta_rx),a      ;set flag for status cmd has been rcvd
                LD      A,10H + REV_NO
                STATUS_SET
                JP      _CMD99

;----------------------------------------
; 10 = SET SCAN CODE SET
;       80H = AT SET (IBM SCAN CODE SET 2)
;       FFH = XT SET (IBM SCAN CODE SET 1)
;----------------------------------------
_CMD10:
                LD      A,B
                AND     7FH
                LD      (KBCODE),A
                JP      _CMD99
;----------------------------------------
; 11 = rts cmd  0 -> rts = 0, <>0 -> rts = 1
;----------------------------------------
_CMD11:
                ld      a,b             ;get value
                ld      (sio_rts),a
                call    sio_wr5         ;set up rts
                JP      _CMD99

;----------------------------------------
; 12 =
;----------------------------------------
_CMD12:

_CMD99:
                LD      A,(CMDTAIL)
                LD      (CMTL),A
_CMD100:

;----------------------------------------
; TX QUEUE ACTIVATE ROUTINE
;----------------------------------------
IDTX:
                LD      A,(HWSONL)
                OR      A
                JP      Z,IDCM
                LD      HL,FGTXACT
                BIT     0,(HL)
                JR      NZ,IDKB                 ;IF TX IS ON -> SKIP
                LD      A,(IY-ECHA+TXTL)
                CP      (IY-ECHA+TXHA)          ;COMP TX QUEUE HEAD AND TAIL
                JR      NZ,IDTX01

RES     B_ST_FUL,(IY-ECHA+FGOUT)        ;CLEAR FULL FLAG
                RES     B_SI_FUL,(IY-ECHA+FGOUT)
                RES     B_KB_FUL,(IY-ECHA+FGOUT)        ;CLEAR HANDSHAKE FG
                JR      IDKB
IDTX01:
                LD      E,A                     ;MOV TAIL TO L
                LD      D,HITX                  ;LOAD HIGH BYTE ADDRESS FOR TX CH
                LD      A,(DE)                  ;LOAD DATA TO BE SENT
                INC     E
                LD      (IY-ECHA+TXTL),E        ;SAVE NEW TAIL PTR
                DI
                SET     0,(HL)
                LD      HL,CBLTOEN
                LD      (HL),CBLTO
                EI
                OUT     (HST_DAT),A
                CP      KB_TYP+1                ;CHECK FOR TYPE CMD
                JR      NC,IDTX1
                LD      HL,FGOUT
```

```
            DEC     A
            JR      NZ,IDTX2
            RES     B_ST_FUL,(HL)       ;CLEAR FULL FLAG
            JR      IDTX1
IDTX2:      DEC     A
            JR      NZ,IDTX3
            RES     B_SI_FUL,(HL)
            JR      IDTX1
IDTX3:      DEC     A
            JR      NZ,IDTX1
            RES     B_KB_FUL,(HL)       ;CLEAR HANDSHAKE FG

;------ JUST SEND A CHAR TO SH4 SET TIME OUT

IDTX1:

;----------------------------------------
;  KYBOARD IDLE LOOP TEST
;----------------------------------------
;------ TEST ANY DATA IN KBD INPUT BUFFER
IDKB:
            LD      A,(KBSTATE)         ;TEST KBD STATE
            CP      KB_IDLE
            JR      Z,IDKB0             ;IF IDLE -> JUMP
            CP      KB_REC
            JR      NZ,IDKB01

;------ keyboard is in input mode

LD      A,(KBINFUL)         ;IF REC MODE
            OR      A
            JP      Z,IDKB4             ;STILL IN REC MODE
            LD      A,(KBINSTA)         ;TEST ERROR OR NOT
            OR      A                   ;
            JR      Z,IDKB02            ;IF NO ERROR ENTER IDLE ST

;------ keyboard error send resend key to keyboard

XOR     A
            LD      (KBINSTA),A         ;ELSE KBSTATE = 0
            LD      (KBINFUL),A         ;CLEAR INPUT BUF FULL
            LD      (KBOUWFA),A         ;CLEAR ACK IS RECEIVED
            jr      idkb02

;------ no retry if error just skip the key  10-18-90 for tsl problem

;           LD      A, KB_RSND          ;RESEND KEY CODE
;           LD      B,A
;           CALL    SENDKEY
;           JP      IDKB4

;------ keyboard is in output mode

IDKB01:
            CP      KB_SEND
            JP      NZ,IDKB4            ;IF NOT IN SEND MODE
            LD      A,(KBOUFUL)         ;IF SEND MODE
            OR      A
            JP      NZ,IDKB4            ;STILL IN SEND MODE
            LD      (KBSNDRTY),A        ;RESET SEND RETRY COUNT

;------ enter keyboard idle mode

IDKB02:
            XOR     A
            LD      (KBSTATE),A         ;CLEAR KB STATE
IDKB0:
            LD      A,(KBINFUL)         ;TEST INPUT BUFFER FULL
            OR      A                   ;IF KBD BUF FULL ->
            JP      Z,IDKB2             ;TEST FGOUT KB FULL OR NOT
            LD      A,(KBINDAT)         ;CHECK DATA 1ST
            OR      A
            JR      Z,IDKB06            ;IF 0  = OVF -> SKIP IT
            CP      0FFH                ;IF FF = OVF -> SKIP IT
            JR      Z,IDKB06
            CP      KB_ACK              ;IF ACK  -> SKIP IT
            JR      Z,IDKB06

;------ test resend key

CP      KB_RSND
            JR      NZ,IDKB04

;------ resend key received
;------ here we send the last key back to keyboard
;
;           LD      A,(KBOLAST)         ;RESEND LAST KEY
;           LD      B,A
;           CALL    SENDKEY
IDKB06:
```

```
            XOR     A
            LD      (KBOUWFA),A         ;CLEAR ACK IS RECEIVED
            LD      (KBINFUL),A         ;CLEAR FULL FLAG
            JP      IDKB4

;------ normal key rec check keyboard data upload channel,

IDKB04:                                 ;SEND KEY TO UPSTAIR
            BIT     B_KB_FUL,(IY-ECHA+FGOUT)
            JP      NZ,IDKB4            ;IF BUSY -> SKIP
            XOR     A                   ;PROCESS THIS CODE
            LD      (KBOUWFA),A         ;CLEAR WFA FLAG
            LD      (KBINFUL),A
            LD      A,(KBCODE)          ;IS SET 1 OR SET 2
            OR      A
            JR      Z,IDKB07            ;IF SET 2 -> JUMP
            LD      A,(KBINDAT)
            CP      0E0H
            JR      Z,IDKB07            ;NOT CHANGE E0
            CP      0E1H
            JR      Z,IDKB07            ;NOT CHANGE E1
            CP      0F0H
            JR      NZ,IDKB08
            LD      A,80H               ;SET BREAK CODE
            LD      (KBMB),A            ;SET MAKE OR BREAK
            JP      IDKB2
IDKB08:                                 ;NEED TO CONVERT THE TABLE
            LD      HL,SCAN
            LD      E,A
            LD      D,0
            ADD     HL,DE               ;HL = TABLE
            LD      A,(KBMB)            ;GET MAKE/BREAK CODE
            OR      (HL)                ;OR TOGETHER
            LD      (KBINDAT),A         ;SAVE TO TEMP RERG
            XOR     A
            LD      (KBMB),A            ;RESET IT
IDKB07:
            SET     B_KB_FUL,(IY-ECHA+FGOUT)
            LD      L,(IY-ECHA+TXHA)
            LD      H,HITX              ;DE TX HEAD (DEST)
            LD      A,KB_TYP            ;LOAD TYPE INTO CMQ
            LD      (HL),A              ;STORE COMMAND TYPE INTO TX Q
            INC     L
IDKB1:
            LD      A,(KBINDAT)
            CP      10H                 ;TEST DATA < 10H
            JR      NC,IDKB11
            LD      (HL),DT_MARK
            INC     L
            OR      80H
IDKB11:
            LD      (HL),A              ;STORE KB DATA
            INC     L
            LD      (IY-ECHA+TXHA),L

;------ CHECK KBD STATE NEED TO START REC OR NOT

IDKB2:
            LD      A,(KBSTATE)
            CP      KB_IDLE
            JR      NZ,IDKB4            ;IF NOT IDLE -> JUMP

;------ KBD IDLE STATE:  O_KCLK=0, KBSTATE=0, O_NMIEN=0.

LD      A,8                 ;INIT DATA BIT COUNT
            LD      (KBINCNT),A
            LD      A,KB_REC
            LD      (KBSTATE),A
            LD      HL,KBIR0
            LD      (KBACTION),HL       ;INIT JUMP ADDR
            LD      A,1                 ;RELEASE KBD CLOCK
            OUT     (O_KCLK),A
            NOP                         ;WAIT FOR IT SETTLE
            OUT     (O_NMIEN),A
IDKB4:

;----------------------------------------------------------
; STATUS QUEUE PROCESS
;----------------------------------------------------------
IDST:
            LD      A,(IY-ECHA+STHA)
            SUB     (IY-ECHA+STTL)
            JR      Z,IDST3             ;IF STATUS QUEUE IS EMPTY
            BIT     B_ST_FUL,(IY-ECHA+FGOUT)
            JR      NZ,IDST3            ;IF FULL
            BIT     B_ST_STP,(IY-ECHA+FGOUT)
            JR      NZ,IDST3            ;IF STOP -> jump

;------ START COPY DATA FROM STATUS QUEUE TO TX QUEUE
```

```
                CP      CNT_STA
                JR      C,IDST1
                LD      A,CNT_STA
IDST1:
                LD      B,A
                LD      L,(IY-ECHA+STTL)
                LD      H,HIST          ;HL STATUS TAIL (SOURCE)
                LD      E,(IY-ECHA+TXHA)
                LD      D,HITX          ;DE  TX HEAD (DEST)
                LD      A,ST_TYP        ;LOAD TYPE INTO CMQ
                LD      (DE),A          ;STORE COMMAND TYPE INTO TX Q
                INC     E
IDST2:
                LD      A,(HL)          ;{[DE]} <- {[HL]}
                LD      (DE),A
                INC     L
                INC     E
                DJNZ    IDST2

;------ SET STATUS FULL FLAG

SET     B_ST_FUL,(IY-ECHA+FGOUT)
                LD      (IY-ECHA+TXHA),E        ;TX HEAD
                LD      (IY-ECHA+STTL),L        ;CMD TAIL
IDST3:

;----------------------------------------------------------
;  toggle beep cmd
;----------------------------------------------------------
;idbp:
;
;               LD      HL,BEEPST       ;CHECK BEEPER OPERATION
;               BIT     2,(HL)          ;IS BEEPER ACTIVE OR NOT
;               JR      Z,IDbp2         ;IF NOT ACTIVE -> END
;               BIT     1,(HL)          ;BEEPER IS ACTIVE, IS BEEPER
;               LD      A,1             ;ON OR OFF
;               JR      Z,IDbp1         ;IF ON THEN TOGGLE IT ELSE OFF
;               XOR     (HL)
;idbp1:
;               OR      4               ;KEEP ACTIVE
;               OUT     (O_BUZ),A
;               LD      (HL),A
;idbp2:

;----------------------------------------------------------
;  ECHO/LOOP BACK QUEUE HANDLE
;----------------------------------------------------------
IDEC:
                LD      A,(IY-ECHA+ECHA)
                SUB     (IY-ECHA+ECTL)
                JR      Z,IDEC3         ;IF EC Q QUEUE IS EMPTY
                CP      CNT_EC
                JR      C,IDEC1
                LD      A,CNT_EC
IDEC1:
                LD      B,A
                LD      L,(IY-ECHA+ECTL)
                LD      H,HIEC          ;HL EC Q TAIL (SOURCE)
                LD      E,(IY-ECHA+TXHA)
                LD      D,HITX          ;DE  TX HEAD (DEST)
                LD      A,EC_TYP        ;LOAD TYPE INTO
                LD      (DE),A          ;STORE COMMAND TYPE INTO TX Q
                INC     E
IDEC2:
                LD      A,(HL)          ;{[DE]} <- {[HL]}
                CP      10H
                JR      NC,IDEC21
                OR      80H
                PUSH    AF
                LD      A,DT_MARK
                LD      (DE),A
                INC     E
                POP     AF
IDEC21:
                LD      (DE),A
                INC     L
                INC     E
                DJNZ    IDEC2
                LD      (IY-ECHA+TXHA),E        ;TX HEAD
                LD      (IY-ECHA+ECTL),L        ;CMD TAIL
IDEC3:

;----------------------------------------
;  SERIAL INPUT ROUTINE
;  1. CHECK SIO SIDE HANDSHAKE, 2, CHECK HOST SIDE HANDSHAKE
;----------------------------------------
IDSI:
                LD      A,(SIO_EN)
                OR      A
                JP      Z,IDSIND        ;IF DISABLE -> JMP
```

```
            LD      HL,(TBEASI)     ;HL  HEAD PT
            LD      DE,(TBBASI)
            SBC     HL,DE           ;A= HEAD-TAIL
            PUSH    HL
            LD      HL,(TBHASI)
            LD      DE,(TBTLSI)
            SBC     HL,DE
            POP     DE              ;DE=SIZE
            JR      NC,IDSI02
            ADD     HL,DE
IDSI02:
            EX      DE,HL           ;DE TOTAL DATA
            LD      HL,30H
            SBC     HL,DE
            JP      NC,IDSI01       ;IF < 30H BELOW LOW WATER MARK
            LD      HL,3C0H
            SBC     HL,DE
            JP      C,IDSI08        ;IF > C0H ABOVE HIGH WATER MARK
            JP      IDSI12

;------ HEAD-TAIL IS LOWER THAN LOW WATER MARK CHECK HANDSHAKE CONDITION
;------ CHECK SI START/STOP DTR/DCD HANDSHAKE

IDSI01:
            LD      HL,TCHHSK       ;GET HANDSHAKE BYTE
            BIT     4,(HL)          ;TEST SI SRT/STP ENABLE
            JR      Z,IDSI07        ;IF DISABLE -> JUMP
            BIT     5,(HL)          ;TEST SI STOP OR NOT
            JR      Z,IDSI07        ;IF NOT STOP -> JUMP ELSE RESTART
            RES     5,(HL)          ;CHANGE TO START COND
            LD      HL,FGSOACT
            BIT     0,(HL)          ;TEST SO ACTIVE ?
            JR      NZ,IDSI05       ;IF ACTIVE -> JUMP
            LD      A,(TCHSRT)
            LD      B,A             ;???
            LD      A,(BITMSK)
            AND     B
            DI
            OUT     (SIO_DAT),A     ;SEND START CMD
            SET     0,(HL)          ;SET SO ACTIVE FLAG
            EI
            LD      HL,SIO_LTX
            JR      IDSI06
IDSI05:
            LD      HL,SIO_XON
IDSI06:
            DI
            LD      (SIO_TXVT),HL   ;CHANGE SO INT PRGM
            EI
IDSI07:
            LD      HL,TCHHSK
            BIT     3,(HL)          ;TEST DTR/DCD ENABLE
            JP      Z,IDSI12        ;IF DISABLE -> JUMP
            LD      A,(TCHCFG)
            BIT     5,A             ;TEST DTR STATE
            JP      NZ,IDSI12       ;IF DTR1 OK -> JUMP
            SET     5,A             ;ELSE SET DTR TO 1
            LD      (TCHCFG),A      ; DATA.

CALL    SIO_WR5         ;SET DTR

JP      IDSI12          ;END OF HEAD-TAIL<100

;------ HEAD-TAIL IS HIGHER THAN HIGH WATER MARK CHECK HANDSHAKE

IDSI08:
            LD      HL,TCHHSK
            BIT     4,(HL)
            JR      Z,IDSI11
            BIT     5,(HL)
            JR      NZ,IDSI11
            SET     5,(HL)          ;SI Q CLOSED TO FULL
            LD      HL,FGSOACT
            BIT     0,(HL)
            JR      NZ,IDSI09
            LD      A,(TCHSTP)
            LD      B,A
            LD      A,(BITMSK)
            AND     B
            DI
            OUT     (SIO_DAT),A
            SET     0,(HL)          ;SET SO ACTIVE FLAG
            EI
            LD      HL,SIO_LTX
            JR      IDSI10
IDSI09:
            LD      HL,SIO_XON
IDSI10:
            DI
```

```
                LD      (SIO_TXVT),HL
                EI
IDSI11:
                LD      HL,TCHHSK
                BIT     3,(HL)          ;TEST SI HW HANDSHAKE
                JR      Z,IDSI12        ;IF DISABLE -> JUMP
                LD      A,(TCHCFG)      ;CHECK DTR STATE
                BIT     5,A
                JR      Z,IDSI12        ;IF ALREADY 0 -> JUMP
                RES     5,A             ;ELSE RESET DTR TO 0
                LD      (TCHCFG),A

CALL    SIO_WR5

;------ HOST SIDE HANDSHAKE CHECK

IDSI12:
;               LD      A,(HWSONL)
;               OR      A
;               JR      Z,IDCM

BIT     B_SI_FUL,(IY-ECHA+FGOUT)
                JR      NZ,IDSIND                       ;IF FULL
                BIT     B_SI_STP,(IY-ECHA+FGOUT)
                JR      NZ,IDSIND                       ;IF STOP -> JMP
                LD      HL,(TBHASI)                     ;A  HEAD PT
                LD      DE,(TBTLSI)
                OR      A
                SBC     HL,DE
                JP      Z,IDSIND        ;
                push    de
                JR      NC,IDSI13
                LD      DE,400H
                ADD     HL,DE
IDSI13:
                LD      A,L
                LD      DE,CNT_SI
                SBC     HL,DE
                pop     de
                LD      b,CNT_SI
                JR      NC,IDSI2
                LD      B,A
IDSI2:                                                  ;B = XFER CNT
                LD      L,(IY-ECHA+TXHA)                ;TX HEAD
                LD      H,HITX                          ;HL  TX HEAD
                LD      A,SI_TYP
                LD      (HL),A
                INC     L
IDSI3:
                LD      A,(DE)
                CP      10H
                JR      NC,IDSI4
                LD      (HL),DT_MARK
                INC     L
                OR      80H             ;SET 80H FOR SPECIAL DATA BYTE
IDSI4:
                LD      (HL),A
                INC     L
                INC     DE
                LD      A,E
                OR      A
                JR      NZ,IDSI5
                LD      A,(TBEASI+1)    ;TEST END ADDR
                INC     A
                CP      D
                JR      NZ,IDSI5
                LD      A,(TBBASI+1)
                LD      D,A
IDSI5:
                DJNZ    IDSI3
                SET     B_SI_FUL,(IY-ECHA+ FGOUT)
                LD      (IY-ECHA+TXHA),L        ;TX HEAD
                LD      (TBTLSI),DE             ;SI TAIL
IDSIND:

;------------------------------------
; COMMAND QUEUE HANDSHAKE
;------------------------------------
IDCM:
                LD      A,(IY-ECHA+CMHA)        ;HEAD POINTER
                SUB     (IY-ECHA+CMTL)          ;HEAD-TAIL
IDCM1:
                BIT     B_CM_STP,(IY-ECHA+FGINP)  ;TEST ST CHANNEL START/STOP
                JR      NZ,IDCM3                ;  IF STOPPED -> JUMP
                CP      CMHWMK                  ;ST IS ON CHECK HIGH WATER MARK
                JR      C,IDCMND                ;LOWER THEN HWMK -> LEAVE IT ALONE

;------ SEND COMMAND STOP CMD
```

```
              SET      B_CM_STP,(IY-ECHA+FGINP)    ;SET STOP FLAG IN FGINP
              LD       L,(IY-ECHA+HSHA)            ;LOAD LSB OF HANDSHAKE QUE
              LD       H,HIHS
              LD       (HL),CM_STP
              INC      L
              LD       (IY-ECHA+HSHA),L            ;LOAD LSB OF HANDSHAKE QUE
              JR       IDCM4
      IDCM3:
              CP       CMLWMK                      ;ST IS OFF CHECK LOW WATER MARK
              JR       NC,IDCMND                   ;HIGHER THEN LWMK -> LEAVE IT ALONE

;------ SEND COMMAND START CMD

RES      B_CM_STP,(IY-ECHA+FGINP)    ;RESET STOP FLAG IN FGINP
              LD       L,(IY-ECHA+HSHA)            ;LOAD LSB OF HANDSHAKE QUE
              LD       H,HIHS
              LD       (HL),CM_STR
              INC      L
              LD       (IY-ECHA+HSHA),L            ;LOAD LSB OF HANDSHAKE QUE
      IDCM4:
              SET      B_PEND,(IY-ECHA+FGINP)      ;SET COMMAND PENDING FLAG
      IDCMND:
      ;--------------------------------------------------
      ; PRINTER OUTPUT 1.SEND DATA TO PRINTER. 2.HOST HANDSHAKE
      ;--------------------------------------------------
      ;------ SEND DATA TO PRINTER
      IDPO:
              LD       DE,(TBTLPO)      ;LOAD TAIL POINTER
      IDPO0:
              LD       HL,(TBHAPO)      ;HEAD
              OR       A
              SBC      HL,DE            ;HL = HEAD-TAIL
              JR       Z,IDPO2          ;IF EMPTY -> JUMP
              IN       A,(PRNIPRT)
              AND      0FH
              CP       0AH              ;IF PRINTER IS ONLINE
              JR       NZ,IDPO2         ;IF PRINTER IS BUSY -> JUMP
              LD       A,(DE)           ;DE=TAIL
              OUT      (PRNOPRT),A
              XOR      A
              OUT      (O_PSTB),A
              LD       A,0FFH
              OUT      (O_PSTB),A
              INC      DE
              LD       HL,(TBEAPO)
              OR       A
              SBC      HL,DE
              JR       NC,IDPO1
              LD       DE,(TBBAPO)
      IDPO1:
              LD       (TBTLPO),DE
              JR       IDPO0

;------ TEST HOST SIDE HANDSHAKE

IDPO2:
              PUSH     HL               ;HL = TOTAL CHAR COUNT IN PO
              LD       BC,POLWMK
              OR       A
              SBC      HL,BC
              POP      HL
              JR       C,IDPO3          ;IF LOWER THAN LWMK -> JUMP
              LD       BC,POHWMK
              OR       A
              SBC      HL,BC
              JR       C,IDPO9
                                                   ;HIGHER THAN POHWMK
              BIT      B_PO_STP,(IY-ECHA+FGINP)    ;TEST PO CHANNEL START/STOP
              JR       NZ,IDPO9                    ;IF STOPPED -> JUMP
              SET      B_PO_STP,(IY-ECHA+FGINP)    ;SET PO CHANNEL STOP FLAG
              LD       L,(IY-ECHA+HSHA)            ;LOAD LSB OF HANDSHAKE QUE
              LD       H,HIHS
              LD       (HL),PO_STP
              INC      L
              LD       (IY-ECHA+HSHA),L            ;LOAD LSB OF HANDSHAKE QUE
              JR       IDPO8
      IDPO3:                                       ;LOWER THAN POLWMK
              BIT      B_PO_STP,(IY-ECHA+FGINP)    ;TEST PO CHANNEL START/STOP
              JR       Z,IDPO9                     ;IF STARTED -> JUMP
              RES      B_PO_STP,(IY-ECHA+FGINP)    ;RESET PO CHANNEL STOP FLAG
              LD       L,(IY-ECHA+HSHA)            ;LOAD LSB OF HANDSHAKE QUE
              LD       H,HIHS
              LD       (HL),PO_STR
              INC      L
              LD       (IY-ECHA+HSHA),L            ;LOAD LSB OF HANDSHAKE QUE
      IDPO8:
              SET      B_PEND,(IY-ECHA+FGINP)      ;SET COMMAND PENDING FLAG
      IDPO9:
      ;--------------------------------------------------
      ; SERIAL OUTPUT 1. ACTIVATE OUTPUT PORT. 2. HANDSHAKE WITH HOST
```

```
;----------------------------------------
IDSO:
        LD      A,(SIO_EN)
        OR      A
        JP      Z,IDHS          ;IF DISABLE -> JMP
        LD      A,(TBHASO)      ;LOAD HEAD POINTER
        LD      DE,(TBTLSO)
        SUB     E
        JR      Z,IDSO1         ;IF EMPTY -> JUMP
        LD      A,(FGSOACT)     ;TEST SO IS ACTIVE OR NOT
        BIT     0,A
        JR      NZ,IDSO1        ;IF SO IS ACTIVE -> JUMP
        LD      A,(TCHHSK)
        BIT     1,A             ;TEST SO SRT/STP ENABLE
        JR      Z,IDSO02        ;IF DISABLE -> JUMP
        BIT     2,A             ;TEST SO STOP OR NOT
        JR      NZ,IDSO1        ;IF STOPPED THEN JUMP
IDSO02:
        BIT     0,A             ;TEST SO HW HANDSHAKE
        JR      Z,IDSO03        ;IF DISABLE THEN JUMP
        LD      A,(TCHCFG)      ;IF HW HSK IS ON THEN
        BIT     4,A             ;TEST SO DCD STATE
        JR      Z,IDSO1         ;IF DCD = 0 THEN JUMP
IDSO03:
        LD      A,(TCXONC)      ;TEST TCXONC ON/OFF
        OR      A
        JR      NZ,IDSO1        ;IF STOP -> JUMP

;------ THIS IS THE ONLY PLACE CH SO GET TO BE ACTIVED.

LD      A,(DE)          ;GET DATA TO SO
        LD      L,A
        INC     DE
        LD      A,(TBEASO+1)
        CP      D
        JR      NC,IDSO04
        LD      DE,(TBBASO)
IDSO04:
        LD      IX,FGSOACT
        LD      A,(BITMSK)
        AND     L
        DI
        LD      (TBTLSO),DE     ;UPDATE TAIL POINTER
        LD      (IX+00H),0FFH   ;SET TX ACTIVE FLAG
        EI
        OUT     (SIO_DAT),A

;------ TEST HOST SIDE HANDSHAKE

IDSO1:
        LD      A,(TBHASO)      ;LOAD HEAD POINTER
        LD      DE,(TBTLSO)
        SUB     E
        BIT     B_SO_STP,(IY-ECHA+FGINP)  ;TEST SO CHANNEL START/STOP
        JR      NZ,IDSO2                  ;IF STOPPED -> JUMP
        CP      SOHWMK          ;SO IS ON CHECK HIGH WATER MARK
        JR      C,IDSO4

;------ SEND STOP CMD

SET     B_SO_STP,(IY-ECHA+FGINP)  ;SET STOP FLAG IN FGINP
        LD      L,(IY-ECHA+HSHA)          ;LOAD LSB OF HANDSHAKE QUE
        LD      H,HIHS
        LD      (HL),SO_STP
        INC     L
        LD      (IY-ECHA+HSHA),L          ;LOAD LSB OF HANDSHAKE QUE
        JR      IDSO3
IDSO2:
        CP      SOLWMK          ;SO IS OFF CHECK LOW WATER MARK
        JR      NC,IDSO4        ;HIGHER THEN LWMK -> LEAVE IT ALONE

;------ SEND START CMD

RES     B_SO_STP,(IY-ECHA+FGINP)  ;RESET STOP FLAG IN FGINP
        LD      L,(IY-ECHA+HSHA)          ;LOAD LSB OF HANDSHAKE QUE
        LD      H,HIHS
        LD      (HL),SO_STR
        INC     L
        LD      (IY-ECHA+HSHA),L          ;LOAD LSB OF HANDSHAKE QUE
IDSO3:
        SET     B_PEND,(IY-ECHA+FGINP)    ;SET COMMAND PENDING FLAG
IDSO4:
;----------------------------------------
; CHECK COMMAND PEND OR NOT IF YES THEN DO IT NOW
;----------------------------------------
IDHS:
        BIT     B_PEND,(IY-ECHA+FGINP)    ;TEST COMMAND PENDING FLAG
        JR      Z,IDHS2
        RES     B_PEND,(IY-ECHA+FGINP)    ;RESET COMMAND PENDING FLAG
        LD      HL,FGTXACT
```

```
            BIT     0,(HL)              ;TEST TX ACTIVE ?
            JR      NZ,IDHS1            ;IF ACTIVE -> JUMP
            LD      A,(HSTL)            ;TAIL PTR
            LD      E,A
            LD      D,HIHS
            LD      A,(DE)
            DI
            OUT     (HST_DAT),A         ;SEND START CMD
            SET     0,(HL)              ;SET TX ACTIVE FLAG
            INC     E
            LD      A,E
            LD      (HSTL),A            ;NEW TAIL PTR
IDHS1:
            LD      HL,HST_HS           ;LOAD HANDSHAKE VECTOR
            DI
            LD      (HST_TXVT),HL
            EI
IDHS2:

;----------------------------------------
; LED AND BEEPER HOUSE KEEPING ROUTINE
;----------------------------------------
IDTM:
;------ CHECK LED 0 PULSE OR NOT
            LD      A,(LED0ST)          ;CHECK LED 0 OPERATION
            BIT     0,A                 ;TEST FOR PULSE
            JR      Z,IDTM2
            LD      B,A
            LD      HL,(LED0TIME)
            DEC     HL
            LD      A,L
            OR      H
            JR      NZ,IDTM1
            LD      A,B
            XOR     80H                 ;B7 IS THE LED STATE BIT
            LD      (LED0ST),A          ;SAVE NEW STATE
            RLCA                        ;B7 -> B0
            OUT     (O_LED0),A
            LD      HL,LEDTIME
IDTM1:
            LD      (LED0TIME),HL

;------ CHECK LED 1 PULSE OR NOT

IDTM2:
            LD      A,(LED1ST)          ;CHECK LED 1 OPERATION
            BIT     0,A                 ;TEST FOR PULSE
            JR      Z,IDTM4
            LD      B,A
            LD      HL,(LED1TIME)
            DEC     HL
            LD      A,L
            OR      H
            JR      NZ,IDTM3
            LD      A,B
            XOR     80H                 ;B7 IS THE LED STATE BIT
            LD      (LED1ST),A          ;SAVE NEWE STATE
            RLCA                        ;B7 -> B0
            OUT     (O_LED1),A
            LD      HL,LEDTIME
IDTM3:
            LD      (LED1TIME),HL
IDTM4:

;------ CHECK BEEPER
            LD      HL,BEEPST           ;CHECK BEEPER OPERATION
            BIT     2,(HL)              ;IS BEEPER ACTIVE OR NOT
            JR      Z,IDTM9             ;IF NOT ACTIVE -> END
            BIT     1,(HL)              ;BEEPER IS ACTIVE, IS BEEPER
            LD      A,1                 ;ON OR OFF
            JR      Z,IDTM5             ;IF ON THEN TOGGLE IT ELSE OFF
            XOR     (HL)
IDTM5:
            OR      4                   ;KEEP ACTIVE
            OUT     (O_BUZ),A
            LD      (HL),A
            LD      HL,(BEEPTIME)       ;CHECK COUNTER
            DEC     HL
            LD      (BEEPTIME),HL       ;DEC COUNT BY 1
            LD      A,L
            OR      H
            JR      NZ,IDTM9            ;IF COUNT IS NOT 0 -> JUMP
            LD      A,(BEEPST)
            XOR     2                   ;TOGGLE ON/OFF STATE
            LD      (BEEPST),A
            BIT     1,A
            JR      NZ,IDTM6            ;IF GOES TO ON -> JUMP
            LD      HL,BEEPOTIM         ;LOAD OFF TIME
            LD      (BEEPTIME),HL
```

```
        JR      IDTM9
IDTM6:
        LD      A,(BEEPLONG)    ;CHECK LONG SOUND COUNT
        OR      A
        JR      Z,IDTM7
        DEC     A
        LD      (BEEPLONG),A
        LD      HL,BEEPLTIM
        LD      (BEEPTIME),HL
        JR      IDTM9
IDTM7:
        LD      A,(BEEPSHRT)    ;CHECK SHORT SOUND COUNT
        OR      A
        JR      Z,IDTM8
        DEC     A
        LD      (BEEPSHRT),A
        LD      HL,BEEPSTIM
        LD      (BEEPTIME),HL
        JR      IDTM9
IDTM8:
        XOR     A
        LD      (BEEPST),A      ;STOP BEEPER HERE
        INC     A
        OUT     (O_BUZ),A
IDTM9:

;------ CHECK KEYBOARD TIME OUT COND

LD      A,(KBTMFLAG)    ;TEST KBD TIME OUT ENABLE FLAG
        OR      A
        JP      Z,IDTM19
        LD      HL,(KBTMCNT)    ;CHECK TIME OUT COUNT
        DEC     HL
        LD      (KBTMCNT),HL    ;STORE IT BACK
        LD      A,L
        OR      H               ;IF CNT = 0
        JP      NZ,IDTM19

;------ KEYBOARD TIME OUT OCCURRED

LD      A,(KBSTATE)
        CP      KB_REC          ;IS RECEIVE TO
        JR      NZ,IDTM10
;
;------ KBD RECEIVE TIME OUT JUST RESET KBSTATE AND GO ON
;
        XOR     A
        LD      (KBSTATE),A     ;IDLE, STATE
        LD      (KBINFUL),A     ;RESET INPUT BUFFER FULL
        JP      IDTM19
IDTM10:
        CP      KB_SEND
        JR      Z,IDTM11

;------ RETRY RECOVER TIME OUT

LD      A,(KBOLAST)
        LD      B,A
        CALL    SENDKEY
        JR      IDTM19
IDTM11:
        LD      A,(KBSEND0)
        OR      A
        JR      Z,IDTM12

;------ KBD SEND TIME OUT ERROR, START RETRY RECOVER TIME OUT LOOP

LD      A,(KBSNDRTY)    ;GET RETRY COUNT
        CP      10              ;MAXIMUM RETRY CNT
        JR      NZ,IDTM13
        LD      A,(KBINIT)
        OR      A
        JR      Z,IDTM14        ;IF NOT INIT -> JUMP

;------ STOP RETRY

XOR     A
        LD      (KBINIT),A
        LD      L,(IY-ECHA+STHA) ;STORE KB INIT ERROR
        LD      H,HIHS
        LD      (HL),ST_KBERR    ;SEND KBD NOT CONNECT ERROR
        INC     L
        LD      (IY-ECHA+STHA),L ;STORE KB INIT ERROR
IDTM14:
        XOR     A
        LD      (KBSTATE),A     ;SET TO IDLE STATE
        LD      (KBTMFLAG),A    ;RESET TO ENABLE
        LD      (KBOUFUL),A
        JR      IDTM15
```

```
;------ KEEP RETRY IT

IDTM13:
        INC     A
        LD      (KBSNDRTY),A        ;STORE IT BACK
        LD      HL,TO10MS
        LD      (KBTMCNT),HL
        LD      A,KB_RTY
        LD      (KBSTATE),A         ;RETRY STATE
IDTM15:
        XOR     A
        OUT     (O_NMIEN),A         ;DISABLE NMI
        OUT     (O_KCLK),A          ;CLK = 0
        LD      A,1
        OUT     (O_KDAT),A          ;DAT = 1
        JR      IDTM19
IDTM12:
        LD      HL,TO10MS
        LD      (KBTMCNT),HL        ;INIT NEW 10 MS CNT
        LD      HL,KBOR1
        LD      (KBACTION),HL       ;INIT VECTOR
        LD      A,1
        LD      (KBSEND0),A
        DI
        OUT     (O_KCLK),A
        EI
        OUT     (O_NMIEN),A         ;START CNT

;------ CHECK CABLE UNPLUGED OR HOST IS NOT INIT
;       FOR EVERY TX THE CBLTOEN NEED TO BE SET AGAIN.
;       FOR ANY HOST SIDE ACTIVITY, HST_TX, HST_RX, HST_EX, HST_ER
;       THE ACT20CNT NEED TO BE SET AGAIN

IDTM19:
        DI
        NOP
        LD      A,(CBLTOEN)         ;CHECK ENABLE OR NOT
        BIT     7,A
        JR      Z,IDTM22
        LD      A,(CBLTOE1)         ;LOAD SUB CNT
        DEC     A
        AND     CBLTO1              ;MASK FOR CBLTOE1
        LD      (CBLTOE1),A
        JR      NZ,IDTM22
        LD      A,(CBLTOEN)         ;CHECK ENABLE OR NOT
        AND     7FH                 ;MASK EN BIT OFF
        DEC     A
        JP      Z,BEGIN             ;TIME OUT OCCURRED HERE
        SET     7,A
        LD      (CBLTOEN),A
IDTM22:
        EI
        LD      A,(ACT20CNT)        ;TEST 20 MS ACTIVITY TO
        DEC     A
        LD      (ACT20CNT),A
        JR      NZ,IDTM24
        ld      a,(hwsonl)
        or      a
        jr      z,idtm24
        LD      A,(TXHA)            ;HEAD LSB
        LD      L,A
        LD      H,HITX
;REV D
;       LD      (HL),DT_NOP         ;TRY TO SEND A NOP
;
        LD      L,(IY-ECHA+HSHA)    ;LOAD LSB OF HANDSHAKE QUE
        LD      H,HIHS
        BIT     B_SO_STP,(IY-ECHA+FGINP)    ;TEST STOP FLAG IN FGINP
        LD      (HL),SO_STR
        JR      Z,IDTM23
        LD      (HL),SO_STP
IDTM23:
        INC     L
        BIT     B_PO_STP,(IY-ECHA+FGINP)    ;TEST STOP FLAG IN FGINP
        LD      (HL),PO_STR
        JR      Z,IDTM26
        LD      (HL),PO_STP
IDTM26:
        INC     L
        BIT     B_CM_STP,(IY-ECHA+FGINP)    ;TEST STOP FLAG IN FGINP
        LD      (HL),CM_STR
        JR      Z,IDTM27
        LD      (HL),CM_STP
IDTM27:
        INC     L
        LD      (IY-ECHA+HSHA),L    ;LOAD LSB OF HANDSHAKE QUE
        SET     B_PEND,(IY-ECHA+FGINP)      ;SET COMMAND PENDING FLAG ;------ CHECK HWS ON LINE FLAG TIME OUT ENABLE FLAG
;       IF HWSONL =0 AND HWSTOEN IS > 80H I.E. HWS HAS SENSED CARRIER FROM
```

```
;       HOST BUT NOT RECEIVED DT_ONL YET, AFTER T.O. HWS WILL RESET AGAIN
;       TRY TO SEND ANOTHER BREAK TO HOST, HOPEFULLY WILL CONNECTTED PROPERLY
;

IDTM24:
        LD      A,(HWSONL)
        OR      A
        JR      NZ,IDTM25
        ld      hl,(hwstoen)
        dec     hl
        ld      a,h
        and     1fh
        ld      h,a
        ld      (hwstoen),hl
        JP      Z,BEGIN                 ;TIME OUT OCCURRED HERE
IDTM25:

;------ do safety check for hws id inited or not if not go back to 0 ld      hl,hwsid
        ld      a,0
        ld      c,10
idtm30:
        cp      (hl)
        jp      nz,begin
        inc     hl
        inc     a
        dec     c
        jr      nz,idtm30

;----------------------------------------
; CHECK STATUS CMD RECEIVE TIME OUT OR NOT, TRY TO RECOVER HOST NOT SEND
; STATUS REQUEST CMD TO US.
;

LD      A,(sta_rx)
        OR      A
        JR      NZ,IDTM31       ; if received -> its ok
        LD      A,(HWSONL)
        OR      A
        JR      Z,IDTM31        ;if not on line -> not check
        LD      HL,(sta_to)     ;CHECK TIME OUT COUNT
        DEC     HL
        LD      (sta_to),HL     ;STORE IT BACK
        LD      A,L
        OR      H               ;IF CNT = 0
        JP      Z,begin         ;if status cmd does not receive
idtm31:

;----------------------------------------
; STATUS REPORT DCD/BRK/PE/SLCT/
;----------------------------------------

;------ REPORT ERROR STATUS
;
;       1. sio dcd line
;       2. sio break line
;       3. ptr select
;       4. ptr paper out
;       5. ptr error
;       6. sio cts line
;       7. kbd error ?????
;       7.
;

;----------------------------------------------------------------
; STATUS 20 - 21  ROM OK/FAIL, 0=OK, 1=FAIL (stata b7)
;----------------------------------------------------------------
; STATUS 22 - 23  RAM OK/FAIL, 0=OK, 1=FAIL
;----------------------------------------------------------------
; STATUS 24 - 25  PRINTER PAPER OUT
;----------------------------------------------------------------
; STATUS 26 - 27  PRINTER SELECT
;----------------------------------------------------------------
; STATUS 28 - 29  PRINTER ERROR
;----------------------------------------------------------------
; STATUS 2A - 2B  DCD LINE STATUS CHANGED
;----------------------------------------------------------------
; STATUS 2C - 2D  BREAK DETECT
;----------------------------------------------------------------
; STATUS 2E - 2F  HWS ONLINE 1=ON,0=OFF
;----------------------------------------------------------------
; STATUS 30 - 31  CTS LINE STATUS CHANGED
;----------------------------------------------------------------

LD      a,(ERRBRK)      ;test break
        or      a
        jr      z,ider1
        ld      a,2dh
```

```
                xor     a
                ld      (errbrk),a
                status_set
ider1:
                LD      a,(ERRDCD)      ;test dcd
                or      a
                jr      z,ider2
                xor     a
                ld      (errdcd),a
                ld      a,(tchcfg)
                bit     4,a
                ld      a,2ah
                jr      z,ider11
                ld      a,2bh
ider11:
                status_set
ider2:                                  ;test printer
                IN      A,(PRNIPRT)     ;READ PRINTER STATUS PORT
                AND     0EH
                LD      B,A             ;SAVE CONTENT
                LD      HL,PRNNEW
                XOR     (HL)
                JR      Z,IDER3
                LD      (HL),B          ;SAVE NEW STATE
                LD      C,A             ;ERROR LIST
ider21:         bit     1,c             ;=1 selected, =0 offline.
                jr      z,ider22
                bit     1,b             ;test new value
                ld      a,26h
                jr      z,ider211
                ld      a,27h
ider211:
                status_set
ider22:         bit     2,c             ;=1 paper end
                jr      z,ider23
                bit     2,b
                ld      a,24h
                jr      z,ider221
                ld      a,25h
ider221:
                status_set
ider23:         bit     3,c             ;=0 printer error
                jr      z,ider3
                bit     3,b
                ld      a,29h
                jr      z,ider231
                ld      a,28h
ider231:
                status_set
ider3:
                LD      a,(ERRCTS)      ;test cts
                or      a
                jr      z,ider4
                xor     a
                ld      (errcts),a
                ld      a,(sio_cts)
                or      a
                ld      a,30h
                jr      z,ider41
                ld      a,31h
ider41:
                status_set
ider4:
                JP      IDLE
;----------------------------------------------------------
;       IDLE LOOP END
;----------------------------------------------------------

;----------------------------------------------------------
;       DART INTERRUPT VECTOR DEFAULT INITIALIZATION
;----------------------------------------------------------
VECINIT:
                LD      HL,HST_TX       ;HOST TX ROUTINE
                LD      (HST_TXVT),HL
                LD      HL,HST_RX       ;HOST RX VECTOR
                LD      (HST_RXVT),HL
                LD      HL,HST_EX       ;HOST EX VECTOR
                LD      (HST_EXVT),HL
                LD      HL,HST_ER       ;HOST ER VECTOR
                LD      (HST_ERVT),HL
                LD      HL,SIO_SO       ;SIO TX VECTOR
                LD      (SIO_TXVT),HL
                LD      HL,SIO_SI       ;SIO RX VECTOR
                LD      (SIO_RXVT),HL
                LD      HL,SIO_EX       ;SIO EX VECTOR
                LD      (SIO_EXVT),HL
                LD      HL,SIO_ER       ;SIO ER VECTOR
                LD      (SIO_ERVT),HL
                LD      HL,NMIRET       ;default nmi routine
                LD      (KBACTION),HL
```

```
                RET
;----------------------------------------------------
; DEFAULT nmi RETURN ROUTINE
;----------------------------------------------------
NMIRET:
        POP     HL
        POP     AF
        RETN
;----------------------------------------------------
; DEFAULT TABLE INIT
;----------------------------------------------------
DFTBINIT:
        LD      DE,TBBASO
        LD      HL,DFQUEDAT
        LD      BC,30H
        LDIR
        ret ;----------------------------------------------------
; HOST DEFAULT INITIALIZATION CLKX1,8,1,N,DTR
;----------------------------------------------------
HSTINIT:
        LD      HL,HSTDATA
        LD      B,0BH
        LD      C,HST_CMD
        OTIR
        RET
;----------------------------------------------------
; INITIALIZE QUEUE BEG, END, HEAD & TAIL VALUE TO DEFAULT
;----------------------------------------------------
DFQTINIT:
        LD      DE,TBBASO
        LD      HL,DFQUEDAT
        LD      BC,18H
        LDIR
        RET
;----------------------------------------------------
; SIO DEFAULT INITIALIZATION 9600,8,1,N,DTR,RTS,XON/XOFF
;----------------------------------------------------
SIOINIT:
        LD      HL,SIODATA
        LD      B,0BH
        LD      C,SIO_CMD
        OTIR
        LD      A,5
        LD      (SIO_RTS),A     ;SET RTS FLAG
        OUT     (HST_CMD),A     ;SET MUX
        LD      A,06AH          ;SET 9600 BAUD
        OUT     (HST_CMD),A
        LD      HL,TCHCFG
        IN      A,(SIO_CMD)     ;CHECK DCD LINE STATE
        BIT     3,A
        RES     4,(HL)
        JR      Z,SIOINIT1
        SET     4,(HL)
SIOINIT1:
        AND     20H             ;SET UP CTS
        LD      (SIO_CTS),A     ;CTS STATE
        RET
;----------------------------------------------------
; SIO CONFIG ROUTINE
;----------------------------------------------------
SIOCFG:
        CALL    CHDISABL
        LD      A,(TCHBUD)
        dec     a
        dec     a               ;start with 1200 = 2
        LD      HL,SIO_BTAB     ;BAUD RATE TABLE
        SLA     A
        LD      E,A
        LD      D,0
        ADD     HL,DE
        LD      A,5H
        OUT     (HST_CMD),A     ;SELECT REG 5
        LD      A,(HL)          ;1ST BYTE IS SELECT BYTE
        OUT     (HST_CMD),A     ;WRITE TX8, TXENB, BKS0,BKS1
        INC     HL
        LD      A,(HL)          ;E=2ND BYTE
        LD      (SIO_DIV),A     ;NEW DIVISIOR
        LD      E,A
        LD      A,(TCHCFG)
        AND     0FH
        OR      E
        LD      E,A             ; NEW REG 4 CONTAIN
        LD      A,14H
        OUT     (SIO_CMD),A
        LD      A,E
        OUT     (SIO_CMD),A
        LD      A,(TCHCFG)
```

```
        AND     0C0H
        OR      1
        LD      E,A             ;REG E = WR3
        LD      C,SIO_CMD
        LD      A,13H
        OUT     (C),A
        OUT     (C),E

CALL    SIO_WR5

LD      A,(TCHCFG)
        AND     0C0H
        RLCA
        RLCA
        LD      HL,CHRMSKTB     ;LOAD BIT / CHAR MASK
        ADD     A,L
        LD      L,A
        LD      A,(HL)
        LD      (BITMSK),A
        RET
```

;------------------------------------------------------------
;
; SET UP DEFAULT CHANNEL DATA INTO CHANNEL STATUS AREA
;
;------------------------------------------------------------

```
DFCHINIT:
        LD      HL,BITMSK       ;BIT MASK
        LD      (HL),0FFH       ;DEFAULT TO 8 BIT PER WORD
        LD      DE,TCHBUD
        LD      HL,DFCHNDAT
        LD      BC,05
        LDIR
        RET
```

;------------------------------------------------------------
;
; ENABLE CHANNEL AND ENABLE INTERRUPT
;
;------------------------------------------------------------

```
CHENABLE:
        PUSH    BC
        LD      C,SIO_CMD
        LD      A,01H
        LD      (SIO_EN),A      ;ENABLE SIO
        LD      B,17H
        DI
        OUT     (C),A
        EI
        OUT     (C),B
        POP     BC
        RET
```

;------------------------------------------------------------
;
; DISABLE CHANNEL AND DISABLE INTERRUPT
;
;------------------------------------------------------------

```
CHDISABL:
        PUSH    BC
        LD      C,SIO_CMD
        XOR     A
        LD      (SIO_EN),A      ;DISABLE SIO
        LD      A,01H
        LD      B,04H
        DI
        OUT     (C),A
        EI
        OUT     (C),B
        POP     BC
        RET
```

;------------------------------------------------------------
;
; TEST DART DCD AND SET DCD STATUS INTO CH CONFIG BYTE
;
;------------------------------------------------------------

```
STCFGDCD:
        LD      C,SIO_CMD
        LD      HL,TCHCFG
        LD      A,10H           ;RESET EXT/STA INT
        OUT     (C),A
        IN      A,(C)           ;READ RR0
        LD      C,A
        BIT     3,C             ;TEST DCD
        JR      NZ,STCFGDC0
        RES     4,(HL)
        RET
```

```
STCFGDC0:
        SET     4,(HL)
        RET

;----------------------------------------
;  SELF TEST ONLY CALLED BY RESET
;----------------------------------------
RESETST:
        XOR     A
        LD      (ERRROM),A      ;INIT VAL
        LD      (ERRRAM),A
        LD      HL,00
ROMTST:
        ADD     A,(HL)          ;DO ROM CHECK SUM
        INC     HL
        LD      B,A
        LD      A,H
        CP      ROMSIZE
        LD      A,B
        JR      NZ,ROMTST
        OR      A
        JR      Z,RAMTST
        LD      HL,ERRROM
        LD      (HL),0FFH       ;ROM CHECK SUM ERROR
RAMTST:
        LD      HL,RAMADDR      ;RAM TEST START
RAMTST0:
        LD      B,(HL)
        LD      (HL),55H        ;TEST 55H
        LD      A,(HL)
        CP      55H
        JR      NZ,RAMTST2
        LD      (HL),0AAH       ;TEST AAH
        LD      A,(HL)
        CP      0AAH
        JR      NZ,RAMTST2
        LD      (HL),B
        INC     HL
        LD      A,H
        OR      L
        JR      NZ,RAMTST0
        LD      A,C
        OR      A
        RET     Z
RAMTST2:
        LD      HL,ERRRAM
        LD      (HL),0FFH
        RET

;----------------------------------------------------
;       KEY BOARD SEND START ROUTINE
; UPON ENTRY:  REG B = DATA NEED TO BE SENT TO KEYBOARD
;----------------------------------------------------
SENDKEY:
        LD      A,1
        DI
        LD      (KBTMFLAG),A    ;INIT TIMEOUT FLAG
        XOR     A               ;INHIBIT KBD CLK NOW
        OUT     (O_NMIEN),A     ;DISABLE NMI
        OUT     (O_KCLK),A      ;LOWER KCLK LINE FOR 60 MS
        EI
        LD      A,B             ;GET KEYBOARD DATA
        LD      (KBOUDAT),A
        OR      A
        LD      A,0
        JP      PO,SKEY_1       ;IF A HAS ODD 1 -> JUMP
        LD      A,1
SKEY_1:
        LD      (KBOUPAR),A     ;STORE PARITY BIT
        LD      A,8
        LD      (KBOUCNT),A     ;INIT OUTPUT COUNT
        LD      A,2             ;SEND STATE
        LD      (KBSTATE),A
        LD      A,0FFH          ;SET KBOUFUL
        LD      (KBOUFUL),A
        LD      HL,TO10MS * 1   ;SET UP 100 MS T.O. CNT
        LD      (KBTMCNT),HL    ;SAVE INT KBD TIMER COUNT
        LD      A,0
        OUT     (O_KDAT),A      ;SEND START BIT
        LD      (KBSEND0),A     ;SET 60MS TIME OUT
        RET

;----------------------------------------------------
; wfckhi will wait for kbd clk go hi then ret
;----------------------------------------------------
wfckhi:
        ld      hl,10h          ;time out count
wfckh0:
        in      a,(kbdiprt)
```

```
                and     k_clki
                jr      z,wfckh1
                ld      a,1
                out     (o_nmien),a     ;re-enable nmi
                ret
wfckh1:
                dec     hl
                ld      a,h
                or      l
                jr      nz,wfckh0
                POP     HL              ;let it t o later by not
                POP     AF              ;releasing nmi
                RETN ;------------------------------------------------------
; sio_wr5 set up sio wr 5 base on tchcfg,sio_rts,fgbrk
;       DESTORY REG A
;------------------------------------------------------
sio_wr5:
                push    hl
                ld      a,(tchcfg)      ;ch  config byte
                scf
                bit     5,a             ;check dtr setting
                jr      nz,swr51
                ccf
swr51:                                  ;setup data for wr5 for dart
                rra
                and     0e0h            ;set dtr and bit / char
                or      08h             ;always set tx enable
                ld      hl,fgbrk        ;test break
                bit     0,(hl)          ;break on or off
                jr      z,swr52
                or      10h             ;break on
swr52:
                ld      hl,sio_rts      ;rts on/off
                bit     0,(hl)
                jr      z,swr53
                or      2h              ;set rts
swr53:
                ld      c,sio_cmd       ;ch cmd port
                ld      h,05h
                di
                out     (c),h           ;point to wr5
                ei
                out     (c),a           ;output to wr5
                pop     hl
                ret ;------------------------------------------------------
;       OFFLINE INITIALIZATION
;       1. blink led
;       2. setup
;       3. RESET HWSONL FLAG TO 0
;       4.
;
;------------------------------------------------------
OFFLINE:
                ld      h,hicm
                ld      l,0
                ld      (hl),29h        ;BLINK LED
                inc     l
                ld      (hl),1
                inc     l
                ld      (hl),2ah        ;BLINK LED
                inc     l
                ld      (hl),1
                inc     l
;               ld      (hl),2eh        ;
;               inc     l
;               ld      (hl),0ffh       ;reset kbd
;               inc     l
;               ld      (hl),2ch
;               inc     l
;               ld      (hl),0f0h       ;set scan code
;               inc     l
;               ld      (hl),2ch
;               inc     l
;               ld      (hl),1          ; scan code set 1
;               inc     l
                ld      a,l
                ld      (cmha),a        ;new cmd byte
                LD      A,0FFH
                LD      (BREAKCNT),A
                xor     a
                ld      (hwsonl),a      ;online flag = 0
                LD      HL,HST_ONT      ;HOST TX ONLINE ROUTINE
                LD      (HST_TXVT),HL
                ld      c,hst_cmd       ;set cmd address
                ld      a,07ah          ;send break cmd
                ld      b,5             ;cmd sub address
```

```
                di
                out     (c),b
                out     (c),A
                xor     a
                out     (hst_dat),a     ;start interrupt
                ld      a,20h
offl1:          dec     a
                jr      nz,offl1
                out     (hst_dat),a     ;fill dart's tx buffer, so no interrupt
                ei                      ;can occur without send a char out.

RET

;--------------------------------------------------
;
;   HOST TX PORT INTERRUPT SERVICE ROUTINE (NORMAL)
;
;--------------------------------------------------

HST_TX:
                EX      AF,AF
                EXX
                LD      A,ACTTO
                LD      (ACT2OCNT),A    ;RESET IT TO FULL COUNT
                LD      HL,TXTL         ;HL  TAIL ADDRESS
                LD      A,(HL)          ;A=TAIL
                DEC     HL
                CP      (HL)            ;COMP TAIL AND HEAD
                JR      NZ,HSTX1
                LD      A,28H           ; AT HERE TX Q IS EMPTY
                OUT     (HST_CMD),A     ;RESET PENDING TX INT
                LD      HL,FGTXACT
                RES     0,(HL)          ;RESET TX ACTIVE FLAG
                XOR     A
                LD      (CBLTOEN),A     ;CLEAR CABLE TIME OUT FLAG
                EXX
                EX      AF,AF
                EI
                RETI
HSTX1:
                INC     HL              ; HL -> TX TAIL
                LD      D,HITX
                LD      E,A
                LD      A,(DE)
                INC     DE
                LD      (HL),E
                OUT     (HST_DAT),A     ;SEND DATA OUT
                CP      KB_TYP+1
                LD      A,CBLTO                         ;SET TIME OUT CNT
                LD      (CBLTOEN),A
                JR      C,HSTX3
HSTX2:
                EXX
                EX      AF,AF
                EI
                RETI
HSTX3:          LD      HL,FGOUT
                DEC     A
                JR      NZ,HSTX4
                RES     B_ST_FUL,(HL)   ;CLEAR FULL FLAG
                JR      HSTX2
HSTX4:          DEC     A
                JR      NZ,HSTX5
                RES     B_SI_FUL,(HL)
                JR      HSTX2
HSTX5:          DEC     A
                JR      NZ,HSTX2
                RES     B_KB_FUL,(HL)   ;CLEAR HANDSHAKE FG
                JR      HSTX2

;--------------------------------------------------
;
;   HOST TX PORT INTERRUPT SERVICE ROUTINE (HANDSHAKE)
;
;--------------------------------------------------

HST_HS:
                EX      AF,AF
                EXX
                LD      HL,HSTL         ;HS TAIL ADDRESS
                LD      A,(HSHA)        ;HEAD
                CP      (HL)            ;COMP TAIL AND HEAD
                JR      NZ,HSHS1
                LD      A,28H           ;AT HERE HS Q IS EMPTY
                OUT     (HST_CMD),A     ;RESET PENDING TX INT
                LD      HL,FGTXACT
                RES     0,(HL)          ;RESET HS ACTIVE FLAG
                XOR     A
                LD      (CBLTOEN),A     ;CLEAR CABLE TIME OUT FLAG
                LD      HL,HST_TX
```

```
            LD      (HST_TXVT),HL   ;RESTORE TX'S NORMAL VECTOR
            JR      HSHS2
HSHS1:
            LD      D,HIHS
            LD      E,(HL)          ;DE=TAIL
            LD      A,(DE)
            INC     E
            LD      (HL),E
            OUT     (HST_DAT),A     ;SEND DATA OUT
            LD      A,CBLTO                 ;SET TIME OUT CNT
            LD      (CBLTOEN),A
HSHS2:      EXX
            EX      AF,AF
            EI
            RETI

;----------------------------------------------------
;
; HOST RX PORT INTERRUPT SERVICE ROUTINE
; HOST SEND DATA TO HWS INTERRUPT ROUTINE (RX)
; 1. SINGLE BYTE COMMAND (00-0F)
; 2. COMMAND PACKAGE
; 3. SERIAL DATA
; 4. PRINTER OUTPUT DATA.
; 5. ECHO DATA.
;
;----------------------------------------------------

HST_RX:
            EX      AF,AF
            EXX
            LD      A,ACTTO
            LD      (ACT20CNT),A    ;RESET IT TO FULL COUNT
            LD      A,(HWSONL)      ;CHECK ON LINE FLAG
            OR      A
            JR      NZ,HSRX0
            IN      A,(HST_DAT)     ;IF NOT ON LINE YET
            CP      DT_ONL          ;TEST ON LINE OR NOT
            JR      NZ,HSRX01
            LD      A,(HWSONCNT)
            INC     A
            LD      (HWSONCNT),A
            CP      4
            JR      NZ,HSRX01
            LD      A,0FFH          ;SH AND HWS HAS CONNECTED
            LD      (HWSONL),A      ;CHANGE ON LINE FLAG
            OUT     (O_PINIT),A     ;INIT THE PRINTER
            LD      A,(TXHA)
            LD      (TXTL),A        ;INIT THE TX QUEUE
            LD      HL,HST_TX       ;HOST TX VECTOR
            LD      (HST_TXVT),HL
            LD      HL,4000H        ;SET STA_TO CNT
            LD      (STA_TO),HL
            JP      RXCASEOF
HSRX01:     EXX
            EX      AF,AF
            EI
            RETI
HSRX0:
            IN      A,(HST_DAT)
            CP      10H
            JR      C,HSRX1         ;SPECIAL CMD
            LD      HL,RDMASK
            AND     (HL)
            LD      (HL),0FFH       ;CLEAR IT FOR NEXT TIME
            LD      B,A             ;SAVE DATA
            LD      A,(RXDSW)       ;CHECK SW
            CP      CM_TYP          ;TEST SW
            JR      NZ,HSRX2
                                    ;COMMAND PACKET RECVD
            LD      A,(CMHA)
            LD      L,A
            LD      A,(CMTL)        ;CHECK TAIL PTR
            DEC     A
            CP      L               ;COMP HEAD & TAIL
            JR      Z,HSRX22        ;IF OVERFLOW THEN JUNK IT
            LD      H,HICM
            LD      (HL),B
            INC     L
            LD      A,L
            LD      (CMHA),A
            EXX
            EX      AF,AF
            EI
            RETI
;
;----- TAKE CARE INSTANT CMD
;
HSRX1:
            LD      B,A
```

```
            SLA     A
            LD      HL,RXJMPTB      ;COMMAND TABLE
            ADD     A,L
            LD      L,A
            LD      E,(HL)
            INC     HL
            LD      D,(HL)
            EX      DE,HL
            LD      A,B
            JP      (HL)

HSRX2:      CP      SO_TYP
            JR      NZ,HSRX3
            LD      HL,(TBHASO)     ;SERIAL OUTPUT DATA REC
            LD      (HL),B
            INC     HL
            LD      A,(TBTLSO)      ;TEST HEAD AND TAIL
            CP      L
            JR      NZ,HSRX21
            LD      A,(TBTLSO+1)
            CP      H
            JR      Z,HSRX22        ;IF OVERFLOW -> JUMP
HSRX21:                             ;STILL HAS ROOM TO STORE
            EX      DE,HL           ;DE -> HEAD
            LD      HL,(TBEASO)
            OR      A               ;CLEAR CARRY
            SBC     HL,DE
            JR      NC,HSRX23
            LD      DE,(TBBASO)
HSRX23:
            LD      (TBHASO),DE
HSRX22:
            EXX
            EX      AF,AF
            EI
            RETI

HSRX3:
            CP      PO_TYP
            JR      NZ,HSRX4        ;IF NOT PRINTER -> NEXT
            LD      HL,(TBHAPO)     ;PRINTER OUTPUT DATA REC
            LD      (HL),B
            INC     HL
            LD      A,(TBTLPO)      ;TEST HEAD AND TAIL
            CP      L
            JR      NZ,HSRX31
            LD      A,(TBTLPO+1)
            CP      H
            JR      Z,HSRX32        ;IF OVERFLOW -> JUMP

HSRX31:                             ;STILL HAS ROOM TO STORE
            EX      DE,HL           ;DE -> HEAD
            LD      HL,(TBEAPO)
            OR      A               ;CLEAR CARRY
            SBC     HL,DE
            JR      NC,HSRX33
            LD      DE,(TBBAPO)
HSRX33:
            LD      (TBHAPO),DE
HSRX32:
            EXX
            EX      AF,AF
            EI
            RETI
HSRX4:
            CP      EC_TYP
            JR      NZ,HSRX5        ;IF NOT ECHO DATA -> JMP
            LD      A,(ECHA)
            LD      L,A
            LD      A,(ECTL)        ;CHECK TAIL PTR
            CP      L               ;COMP HEAD & TAIL
            JR      Z,HSRX42        ;IF OVERFLOW THEN JUNK IT
            LD      H,HIEC
            LD      (HL),B
            INC     L
            LD      (ECHA),A
HSRX42:     EXX
            EX      AF,AF
            EI
            RETI

HSRX5:      CP      RM_TYP
            JR      NZ,HSRX42       ;IF NOT RAMDAC DATA -> END
            LD      HL,DAC_BUF
            LD      A,(DAC_CNT)
            LD      C,A             ;SAVE CNT IN REG C
            ADD     A,L
            LD      L,A
            JR      NC,HSRX51
            INC     H
```

```
HSRX51:  LD    A,B              ;load value in a
         AND   3FH
         LD    (HL),A
         LD    A,C
         INC   A
         LD    (DAC_CNT),A
         CP    4
         JR    C,HSRX42         ;IF NOT FULL -> JUMP
         XOR   A
         LD    B,A
         LD    (DAC_CNT),A      ;RESET CNT
         LD    HL,DAC_BUF
         LD    A,(HL)
         OUT   (DAC_WAR),A      ;OUTPUT WRITE ADDRESS
         INC   HL
         LD    A,(HL)
         OUT   (DAC_VAL),A      ;OUTPUT RED VALUE
         INC   HL
         LD    A,(HL)
         OUT   (DAC_VAL),A      ;OUTPUT GREEN VALUE
         INC   HL
         LD    A,(HL)
         OUT   (DAC_VAL),A      ;OUTPUT BLUE VALUE
         EXX
         EX    AF,AF
         EI
         RETI ;----------------------------------------------
;
;   HOST RX PORT INTERRUPT ROUTINE
;        COMMAND ROUTINE
;
;----------------------------------------------
RXCASE00:                        ;NOP
RXCASE0C:                        ;NOP
RXCASE0D:                        ;NOP
         EXX
         EX    AF,AF
         EI
         RETI
RXCASE01:                        ;COMMAND DATA TYPE CMD
         LD    (RXDSW),A
         EXX
         EX    AF,AF
         EI
         RETI
RXCASE02:                        ;SERIAL DATA TYPE CMD
         LD    (RXDSW),A
         EXX
         EX    AF,AF
         EI
         RETI
RXCASE03:                        ;PRINTER DATA TYPE CMD
         LD    (RXDSW),A
         EXX
         EX    AF,AF
         EI
         RETI
RXCASE04:                        ;ECHO DATA TYPE CMD
         EXX
         EX    AF,AF
         EI
         RETI
RXCASE05:                        ;STOP CMD FOR STATUS CH
         LD    HL,FGOUT
         SET   B_ST_STP,(HL)
         EXX
         EX    AF,AF
         EI
         RETI
RXCASE06:                        ;STOP CMD FOR SERIAL INPUT
         LD    HL,FGOUT
         SET   B_SI_STP,(HL)
         EXX
         EX    AF,AF
         EI
         RETI
RXCASE07:                        ;STOP CMD FOR KEYBOARD INPUT
         LD    HL,FGOUT
         SET   B_KB_STP,(HL)
         EXX
         EX    AF,AF
         EI
         RETI
```

```
RXCASE08:                                       ;RAM DAC DATA
                LD      (RXDSW),A
                XOR     A
                LD      (DAC_CNT),A     ;RESET CNT
                EXX
                EX      AF,AF
                EI
                RETI
RXCASE09:                                       ;START CMD FOR STATUS
                LD      HL,FGOUT
                RES     B_ST_STP,(HL)
                EXX
                EX      AF,AF
                EI
                RETI
RXCASE0A:                                       ;START CMD FOR SERIAL INPUT
                LD      HL,FGOUT
                RES     B_SI_STP,(HL)
                EXX
                EX      AF,AF
                EI
                RETI
RXCASE0B:                                       ;START CMD FOR KEYBOARD INPUT
                LD      HL,FGOUT
                RES     B_KB_STP,(HL)
                EXX
                EX      AF,AF
                EI
                RETI
RXCASE0E:                                       ;DATA BYTE MARKER
                LD      A,7FH
                LD      (RDMASK),A      ;NEXT DATA RECEIVED
                EXX                     ;ONLY 7 BITS
                EX      AF,AF
                EI
                RETI
RXCASE0F:                                       ;HOST ONLINE CMD
                LD      A,(TXHA)        ;HEAD LSB
                LD      L,A
                LD      H,HITX
                LD      (HL),DT_ONL
                INC     L
                LD      A,L
                LD      (TXHA),A        ;NEW HEAD
                EXX
                EX      AF,AF
                EI
                RETI

;----------------------------------------
; HST EXTERNAL/STATUS CHANGE INTERRUPT ROUTINE
;----------------------------------------
HST_EX:
                EX      AF,AF
                EXX
                LD      A,10H
                OUT     (HST_CMD),A
;               ld      a,16h           ;rx int, tx int, status affect
;               OUT     (HST_CMD),A IN      A,(HST_CMD)     ;TEST BREAK
                AND     80H             ;IF IS BREAK -> RESTART IT
                JP      NZ,BEGIN        ;RESET IT

EXX
                EX      AF,AF
                EI
                RETI

;----------------------------------------
; HST RECEIVE ERROR INTERRUPT ROUTINE
;----------------------------------------
HST_ER:
                EX      AF,AF
                EXX
                IN      A,(HST_CMD)     ;RESET ERROR HERE
                LD      A,30H           ;SET ERROR RESET CMD
                OUT     (HST_CMD),A
                LD      HL,(HST_RXVT)
                INC     HL
                INC     HL
                JP      (HL)

;----------------------------------------------------
;
;   WAIT FOR HOST TO ON LINE, 1ST SEND BREAK THEN SEND DT_ONL
;
;----------------------------------------------------

HST_ONT:
```

```
        EX      AF,AF
        EXX
        LD      A,ACTTO
        LD      (ACT20CNT),A    ;RESET IT TO FULL COUNT

LD      A,(BREAKCNT)    ;COUNT FOR BREAK AND COUNT FOR DT_ONL
        DEC     A
        LD      (BREAKCNT),A
        JR      Z,HSONT1

LD      A,CBLTO
        LD      (CBLTOEN),A     ;ENABLE TO
        LD      A,DT_ONL        ;START THE ON LINE REQUEST
        OUT     (HST_DAT),A
        EXX
        EX      AF,AF
        EI
        RETI
HSONT1:
        LD      A,5
        OUT     (HST_CMD),A
        LD      A,6AH           ;RECOVER WR5
        OUT     (HST_CMD),A
        LD      A,DT_ONL        ;START THE ON LINE REQUEST
        OUT     (HST_DAT),A
        LD      A,CBLTO                 ;SET TIME OUT CNT
        LD      (CBLTOEN),A     ;ENABLE TO
        EXX
        EX      AF,AF
        EI
        RETI

;------------------------------------------------
;
;   SO INTERRUPT SERVICE ROUTINE
;
;------------------------------------------------
SIO_SO:
        EX      AF,AF
        EXX
        LD      A,(FGBRK)
        bit     0,a
        JR      NZ,SO05         ;IF BREAK ACTIVE -> JUMP
        LD      HL,(TBTLSO)
        LD      A,(TBHASO)
        CP      L
        JR      Z,SO01
        LD      A,(BITMSK)      ;NOT EMPTY
        AND     (HL)
        OUT     (SIO_DAT),A
        INC     L
        LD      A,L
        LD      (TBTLSO),A      ; LOWER ADDR
SO03:   EXX
        EX      AF,AF
        EI
        RETI
SO01:
        LD      A,28H           ;SO Q IS EMPTY
        OUT     (SIO_CMD),A     ;RESET PENDING SO INT
        LD      HL,FGSOACT
        RES     0,(HL)          ;RESET SO ACTIVE FLAG
        JR      SO03
SO05:
        XOR     A               ;BREAK IS ACTIVE
        OUT     (SIO_DAT),A
        JR      SO03
;------------------------------------------------
;  SI INTERRUPT SERVICE ROUTINE
;------------------------------------------------
SIO_SI:
        EX      AF,AF
        EXX
SI01:
        IN      A,(SIO_DAT)
        LD      HL,BITMSK
        AND     (HL)
        LD      HL,TCHHSK
        BIT     1,(HL)          ;SO SRT/STP ENABLE ?
        JR      Z,SI02          ;DISABLE -> JUMP
        DEC     HL
        CP      (HL)            ;IS STOP CHAR ?
        JR      Z,SI10
        DEC     HL
        CP      (HL)            ;IS START CHAR ?
        JR      Z,SI09
SI02:
        LD      DE,(TBHASI)
        LD      (DE),A          ;STORE INTO SI Q
        INC     A
```

```
            JP       Z,SI20
SI021:
            INC      DE
            LD       A,(TBEASI+1)
            CP       D
            JR       NC,SI04      ;HEAD =< END -> JUMP
            LD       DE,(TBBASI)  ;HEAD  BEGIN ADDR
SI04:
            LD       HL,(TBTLSI)
            SBC      HL,DE
            JR       Z,SI05       ;IF OVERFLOW -> JUMP
            LD       (TBHASI),DE
SI05:
            EXX
            EX       AF,AF
            EI
            RETI

SI09:
            LD       HL,TCHHSK    ;RECEIVE SO START CMD
            RES      2,(HL)       ;RESET SO STOP FLAG
SI08:
            EXX
            EX       AF,AF
            EI
            RETI
SI10:                             ;STOP SO CH.
            INC      HL           ;RECEIVE SO STOP CMD
            BIT      2,(HL)
            JR       NZ,SI08
            SET      2,(HL)       ;SET SO STOP FLAG
            LD       A,(SRTANY)
            OR       A
            JR       Z,SI12
            LD       HL,SIO_ANY
            LD       (SIO_RXVT),HL  ;ANY CHAR START SO
            LD       HL,SIO_ERANY
            LD       (SIO_ERVT),HL  ;
SI12:
            LD       A,(FGSOACT)
            BIT      0,A
            JR       Z,SI08       ;SO INACTIVE -> JMP
            LD       HL,SIO_LTX   ;ELSE STOP SO
            LD       (SIO_TXVT),HL
            JR       SI08

;------ TEST XENIX PARMRK COMMAND

SI20:
            LD       A,(PARMRK)
            OR       A
            JP       Z,SI021

;------ HERE WE NEED ADD AN FF FOR PARMRK COMMAND

INC      DE
            LD       A,(TBEASI+1)
            CP       D
            JR       NC,SI24      ;HEAD =< END -> JUMP
            LD       DE,(TBBASI)  ;HEAD  BEGIN ADDR
SI24:
            LD       HL,(TBTLSI)
            SBC      HL,DE
            JR       Z,SI26       ;IF OVERFLOW -> JUMP
            LD       A,0FFH       ;2ND FF
            LD       (DE),A
            INC      DE
            LD       A,(TBEASI+1)
            CP       D
            JR       NC,SI25      ;HEAD =< END -> JUMP
            LD       DE,(TBBASI)  ;HEAD  BEGIN ADDR
SI25:
            LD       HL,(TBTLSI)
            SBC      HL,DE        ;TAIL-HEAD
            JR       Z,SI26
            LD       (TBHASI),DE
SI26:
            EXX
            EX       AF,AF
            EI
            RETI

;----------------------------------------
; EXTERNAL STATUS INTERRUPT SERVICE ROUTINE
;----------------------------------------
SIO_EX:
            EX       AF,AF
            EXX
            LD       A,10H
            OUT      (SIO_CMD),A  ;RESET EXT INTR
```

```
          IN      A,(SIO_CMD)      ;READ RR0
          LD      B,A              ; SAVE RR0 IN REG B = DCD BIT3 and     20h              ;mask off cts bit
          ld      hl,sio_cts
          xor     (hl)
          jr      z,ex10           ;nothing change
          ld      a,b
          and     20h
          ld      (errcts),a       ;set flag
          ld      (hl),a
ex10:     ld      a,b              ;recover rr0

SLA     A                ;SHIFT LEFT DCD BIT4
          LD      HL,TCHCFG        ;TEST OLD DCD VALUE AT BIT4
          XOR     (HL)             ;
          BIT     4,A              ;IF BIT41 NEW DCD <> OLD DCD
          JR      Z,EX06           ;ELSE MAY BE A BREAK IS DETECTED
          BIT     3,B              ;HERE DCD HAS CHANGED
          SET     4,(HL)           ;UPDATE NEW DCD  1
          JR      NZ,EX01          ;
          RES     4,(HL)           ;UPDATE NEW DCD  0
EX01:
          LD      A,(TCHHSK)       ;NOW LETS TEST SO HW HSK PROTOCOL
          BIT     0,A              ;HW HANDSHAKE ENABLED OR NOT ?
          JR      NZ,EX05          ;IF YES THEN JUMP
          LD      A,(ERRDCD)       ;IF NOT ENABLED THEN REPORT
          INC     A                ;A CHANGE IN DCD
          AND     03H
          JR      NZ,EX03
          LD      A,03H            ;3 is maxe
EX03:
          BIT     4,(HL)           ;LETS FIND OUT NEW DCD VALUE
          JR      Z,EX04           ;IF 0 DO NOTHING
          OR      80H              ;IF 1 SET BIT7 IN ERRDCD FLAG
EX04:
          LD      (ERRDCD),A       ;SAVE ERROR FLAG
          JR      EX06
EX05:                              ;HW HANDSHAKE IS ENABLED
          BIT     4,(HL)
          JR      NZ,EX06          ;IF NEW DCD  1 DO NOTHING HERE
                                   ;TILL IDLE LOOP TO START SO AGAIN
          LD      A,(FGSOACT)      ;ELSE STOP SO
          BIT     0,A
          JR      Z,EX06
          LD      HL,SIO_LTX
          LD      (SIO_TXVT),HL EX06:                              ;HERE CHECK BREAK OR NOT
          LD      A,(ERRBKS)
          BIT     7,B              ;TEST FOR BREAK
          JR      Z,EX07           ;IF NOT BREAK -> JMP
          OR      A                ;BREAK IS DETECTE !!
          JR      NZ,EX08          ;IF NOT FIRST TIME -> NOT REPORT
          LD      A,(IGNBRK)       ;TEST XENIX IGNBRK
          OR      A
          LD      A,01H
          LD      (ERRBKS),A
          JR      NZ,EX08          ;IF IGNBRK <>0 -> JUMP
          LD      (ERRBRK),A
          JR      EX08
EX07:                              ;NO BREAK IS FOUND
          OR      A
          JR      Z,EX08           ;IF NOT 0 THEN CLEAR IT
          IN      A,(SIO_DAT)      ;IF THIS IS BREAK0 INTR THEN
          XOR     A                ;DO A DUMMY READ TO TAKE OFF
          LD      (ERRBKS),A       ;THE 0 BUT DART HAS SI INT
                                   ;FIRST THEN EX INT SO DATA
EX08:                              ;MAY ALREADY IN THE SI Q
          EXX
          EX      AF,AF
          EI
          RETI ;----------------------------------------------------------------
;  UART SI ERROR INTERRUPT SERVICE ROUTINE
;----------------------------------------------------------------
SIO_ER:
          EX      AF,AF
          EXX
          LD      A,01H            ;SET READ REG 1
          OUT     (SIO_CMD),A
          IN      A,(SIO_CMD)      ;READ REG 1
          AND     70H              ;  B6=FE, B5=OE, B4=PE
          LD      B,A              ;SAVE THEM IN REG B
          AND     50H              ;TEST PE,FE OR OE
          LD      A,30H            ;SET ERROR RESET CMD
          OUT     (SIO_CMD),A
          JR      NZ,ER01
ER02:
```

```
            IN      A,(SIO_DAT)
ER021:
            LD      HL, SIO_SI+4
            JP      (HL)                ;JMP TO SI INT ROUTINE
ER01:
            LD      A,(IGNPAR)          ;TEST IGNPAR
            OR      A
            JR      Z,ER010             ;IGNPAR0 -> JUMP
            IN      A,(SIO_DAT)         ;IGNPAR1 THEN SKIP
ER99:                                   ;THE DATA & GO ON
            EXX
            EX      AF,AF
            EI
            RETI
ER010:
            LD      A,(NPRERR)          ;PC MOS MODE
            OR      A
            JR      NZ,ER02             ;NPRERR1 -> JUMP
            IN      A,(SIO_DAT)
            LD      A,(PARMRK)          ;TEST PARMRK
            OR      A                   ;PUT A NULL FOR NEW CHAR
            JR      Z,ER021             ;PARMRK0 -> JUMP

;------ HERE COMES TROUBLE TO PUT MARK CHAR

IN      A,(SIO_DAT)
            LD      HL,BITMSK
            AND     (HL)
            LD      HL,TCHSTP
            CP      (HL)                ;IS STOP CHAR ?
            JR      Z,ER99
            DEC     HL
            CP      (HL)                ;IS START CHAR ?
            JR      Z,ER99
            LD      HL,(TBHASI)         ;LOAD HEAD ADDRESS
ER31:
            LD      DE,(TBTLSI)
            LD      (HL),0FFH           ;1ST CHAR 0XFF
            INC     HL
            LD      A,(TBEASI+1)        ;UPPER BYTE
            CP      H
            JR      NC,ER32
            LD      HL,(TBBASI)         ;NEXT HEAD ADDRESS
ER32:       PUSH    HL                  ;SAVE NEW HEAD
            OR      A                   ;CLEAR CARRY
            SBC     HL,DE               ;HEAD-TAIL
            POP     HL
            JR      Z,ER021             ;OVERFLOW
            LD      (TBHASI),HL         ;NEW HEAD PTR
            LD      (HL),0              ;2ND CHAR 0
            INC     HL
            LD      A,(TBEASI+1)        ;UPPER BYTE
            CP      H
            JR      NC,ER33
            LD      HL,(TBBASI)         ;NEXT HEAD ADDRESS
ER33:       PUSH    HL                  ;SAVE NEW HEAD
            OR      A                   ;CLEAR CARRY
            SBC     HL,DE               ;HEAD-TAIL
            POP     HL
            JR      Z,ER021             ;OVERFLOW
            LD      (TBHASI),HL         ;NEW HEAD PTR
            JR      ER02                ;END OF PARMRK

;----------------------------------------
; SI START/STOP SENDING ROUTINE
;----------------------------------------
SIO_XON:
            EX      AF,AF
            EXX
            LD      A,(TCHHSK)
            BIT     5,A                 ;SI WANT TO SRT OR STP
            JR      Z,XON0
            LD      A,(TCHSTP)          ;= 1 = STOP
            JR      XON1
XON0:
            LD      A,(TCHSRT)          ;= 0 = START
XON1:
            LD      HL,BITMSK
            AND     (HL)
            OUT     (SIO_DAT),A
            LD      HL,SIO_SO           ;NORMAL SO INT PRGM
            LD      (SIO_TXVT),HL
            EXX
            EX      AF,AF
            EI
            RETI

;----------------------------------------
; SIO_LTX WILL DEACTIVE TX CH DUE TO STOP CMD FROM HOST
;----------------------------------------
```

```
SIO_LTX:
        EX      AF,AF
        EXX
        LD      A,28H
        OUT     (SIO_CMD),A     ;RESET PENDING SO INT
        LD      HL,FGSOACT
        RES     0,(HL)          ;RESET SO ACTIVE FLAG
        LD      HL,SIO_SO       ;NORMAL SO INT PRGM
        LD      (SIO_TXVT),HL
        EXX
        EX      AF,AF
        EI
        RETI

;--------------------------------------------------
; SO ANY CHAR START ON
;--------------------------------------------------
SIO_ANY:
        EX      AF,AF
        EXX
        LD      HL,SIO_SI
        LD      (SIO_RXVT),HL
        LD      HL,SIO_ER
        LD      (SIO_ERVT),HL
        LD      HL,TCHHSK       ;RECEIVE SO START CMD
        RES     2,(HL)          ;RESET SO STOP FLAG
        IN      A,(SIO_DAT)
        LD      HL,BITMSK
        AND     (HL)
        LD      HL,TCHSTP
        CP      (HL)            ;IS STOP CHAR ?
        JR      Z,AC10
        DEC     HL
        CP      (HL)            ;IS START CHAR ?
        JR      NZ,AC09
AC10:   EXX
        EX      AF,AF
        EI
        RETI
AC09:   LD      HL,SIO_SI+4     ;LOAD SI INT VECTOR INTO HL
        JP      (HL)

;--------------------------------------------------
; SO ANY CHAR START ON WITH UART ERROR
;--------------------------------------------------
SIO_ERANY:
        EX      AF,AF
        EXX
        LD      HL,SIO_SI
        LD      (SIO_RXVT),HL
        LD      HL,SIO_ER
        LD      (SIO_ERVT),HL
        LD      HL,TCHHSK       ;RECEIVE SO START CMD
        RES     2,(HL)          ;RESET SO STOP FLAG
        IN      A,(SIO_DAT)
        LD      HL,BITMSK
        AND     (HL)
        LD      HL,TCHSTP
        CP      (HL)            ;IS STOP CHAR ?
        JR      Z,AR10
        DEC     HL
        CP      (HL)            ;IS START CHAR ?
        JR      NZ,AR09
AR10:
        LD      A,30H           ;SET ERROR RESET CMD
        OUT     (SIO_CMD),A
        EXX
        EX      AF,AF
        EI
        RETI
AR09:   LD      HL,SIO_ER+2
        JP      (HL)

;--------------------------------------------------
; SUBROUTINE END
;--------------------------------------------------

DFQUEDAT:
        DW      0F800H,0F8FFH,0F800H,0F800H, 0F000H,0F3FFH,0F000H,0F000H
        DW      0E000H,0EFFFH,0E000H,0E000H

DFCHNDAT:
        DB      05H,0E4H,11H,13H,12H,0,0,0
        DB      0,0,0,0,0,0,0,0
        DB      0,0,0,0,0,0,0FFH,0

HSTDATA:        ;DART INIT DATA, 0 NEED TO BE FILLED IN.
```

```
            DB      18H,14H,04H,13H,0C1H,15H,0EAH,12H,0,11H,17H
SIODATA:            ;DART INIT DATA, 0 NEED TO BE FILLED IN.
            DB      18H,14H,44H,13H,0C1H,15H,0EAH,12H,0,11H,17H
                    9600,8BIT,1STOP,NOPAR
;           0       18h = reset dart
;           1       14h = reset ext/status int, select reg 4
;           2       0   --> wr4 data.
;           3       13h = reset ext/status int, select reg 3
;           4       0   --> wr3 data.
;           5       15h = reset ext/status int, select reg 5
;           6       0   --> wr5 data.
;           7       12h = reset ext/status int, select reg 2
;           8       0   --> wr2 data.
;           9       11h = reset ext/status int, select reg 1
;           a       17h =  wr1 data : en tx_int, ext/st_int, rx_int
;                           rx_err_int ;----------------------------------------------------------------;
;                                                                ;
;------ TABLE FOR SCAN CODE CONVERSION                           ;
;------ FROM SET 2 TO SET 1                                      ;
;------ BBB = BAD CODE (00H OR FFH)                              ;
;                                                                ;

BBB:        EQU     0FFH

;                   0 , 1 , 2 , 3 , 4 , 5 , 6 , 7                ;
;                   8 , 9 , A , B , C , D , E , F                ;
SCAN:
            DB      BBB,43H,41H,3FH,3DH,3BH,3CH,58H         ;00-07
            DB      BBB,44H,42H,40H,3EH,0FH,29H,BBB         ;08-0F
            DB      BBB,38H,2AH,BBB,1DH,10H,02H,BBB         ;10-17
            DB      BBB,BBB,2CH,1FH,1EH,11H,03H,BBB         ;18-1F
            DB      BBB,2EH,2DH,20H,12H,05H,04H,BBB         ;20-27
            DB      BBB,39H,2FH,21H,14H,13H,06H,BBB         ;28-2F
            DB      BBB,31H,30H,23H,22H,15H,07H,BBB         ;30-37
            DB      BBB,BBB,32H,24H,16H,08H,09H,BBB         ;38-3F
            DB      BBB,33H,25H,17H,18H,0BH,0AH,BBB         ;40-47
            DB      BBB,34H,35H,26H,27H,19H,0CH,BBB         ;48-4F
            DB      BBB,BBB,28H,BBB,1AH,0DH,BBB,BBB         ;50-57
            DB      3AH,36H,1CH,1BH,BBB,2BH,BBB,BBB         ;58-5F
            DB      BBB,56H,BBB,BBB,BBB,BBB,0EH,BBB         ;60-67
            DB      BBB,4FH,BBB,4BH,47H,BBB,BBB,BBB         ;68-6F
            DB      52H,53H,50H,4CH,4DH,48H,01H,45H         ;70-77
            DB      57H,4EH,51H,4AH,37H,49H,46H,54H         ;78-7F
            DB      BBB,BBB,BBB,41H,54H,BBB,BBB,BBB         ;80-87
            DB      BBB,BBB,BBB,BBB,BBB,BBB,BBB,BBB         ;88-8F
            DB      BBB,BBB,BBB,BBB,BBB,BBB,BBB,BBB         ;90-97
            DB      BBB,BBB,BBB,BBB,BBB,BBB,BBB,BBB         ;98-9F
            DB      BBB,BBB,BBB,BBB,BBB,BBB,BBB,BBB         ;A0-A7
            DB      BBB,BBB,BBB,BBB,BBB,BBB,BBB,BBB         ;A8-AF
            DB      BBB,BBB,BBB,BBB,BBB,BBB,BBB,BBB         ;B0-B7
            DB      BBB,BBB,BBB,BBB,BBB,BBB,BBB,BBB         ;B8-BF
            DB      BBB,BBB,BBB,BBB,BBB,BBB,BBB,BBB         ;C0-C7
            DB      BBB,BBB,BBB,BBB,BBB,BBB,BBB,BBB         ;C8-CF
            DB      BBB,BBB,BBB,BBB,BBB,BBB,BBB,BBB         ;D0-D7
            DB      BBB,BBB,BBB,BBB,BBB,BBB,BBB,BBB         ;D8-DF
            DB      BBB,BBB,BBB,BBB,BBB,BBB,BBB,BBB         ;E0-E7
            DB      BBB,BBB,BBB,BBB,BBB,BBB,BBB,BBB         ;E8-EF
            DB      BBB,BBB,BBB,BBB,BBB,BBB,BBB,BBB         ;F0-F7
            DB      BBB,BBB,BBB,BBB,BBB,BBB,BBB,BBB         ;F8-FF

;------ END OF CONVERSION TABLE ------------------------------;

;----------------------------------------------------------------;
;                                                                ;
;------ DEFAULT RAMDAC COLOR VALUE TABLE                         ;
;                                                                ;
;                   R       G       B       address
RM_TABLE:
            DB      00H,    00H,    00H     ; 00
            DB      00H,    00H,    2AH     ; 01
            DB      00H,    2AH,    00H     ; 02
            DB      00H,    2AH,    2AH     ; 03
            DB      2AH,    00H,    00H     ; 04
            DB      2AH,    00H,    2AH     ; 05
            DB      2AH,    2AH,    00H     ; 06
            DB      2AH,    2AH,    2AH     ; 07
            DB      00H,    00H,    15H     ; 08
            DB      00H,    00H,    3FH     ; 09
            DB      00H,    2AH,    15H     ; 0A
            DB      00H,    2AH,    3FH     ; 0B
            DB      2AH,    00H,    15H     ; 0C
            DB      2AH,    00H,    3FH     ; 0D
            DB      2AH,    2AH,    15H     ; 0E
            DB      2AH,    2AH,    3FH     ; 0F
```

```
DB      00H,    15H,    00H     ; 10
DB      00H,    15H,    2AH     ; 11
DB      00H,    3FH,    00H     ; 12
DB      00H,    3FH,    2AH     ; 13
DB      2AH,    15H,    00H     ; 14
DB      2AH,    15H,    2AH     ; 15
DB      2AH,    3FH,    00H     ; 16
DB      2AH,    3FH,    2AH     ; 17
DB      00H,    15H,    15H     ; 18
DB      00H,    15H,    3FH     ; 19
DB      00H,    3FH,    15H     ; 1A
DB      00H,    3FH,    3FH     ; 1B
DB      2AH,    15H,    15H     ; 1C
DB      2AH,    15H,    3FH     ; 1D
DB      2AH,    3FH,    15H     ; 1E
DB      2AH,    3FH,    3FH     ; 1F
DB      15H,    00H,    00H     ; 20
DB      15H,    00H,    2AH     ; 21
DB      15H,    2AH,    00H     ; 22
DB      15H,    2AH,    2AH     ; 23
DB      3FH,    00H,    00H     ; 24
DB      3FH,    00H,    2AH     ; 25
DB      3FH,    2AH,    00H     ; 26
DB      3FH,    2AH,    2AH     ; 27
DB      15H,    00H,    15H     ; 28
DB      15H,    00H,    3FH     ; 29
DB      15H,    2AH,    15H     ; 2A
DB      15H,    2AH,    3FH     ; 2B
DB      3FH,    00H,    15H     ; 2C
DB      3FH,    00H,    3FH     ; 2D
DB      3FH,    2AH,    15H     ; 2E
DB      3FH,    2AH,    3FH     ; 2F
DB      15H,    15H,    00H     ; 30
DB      15H,    15H,    2AH     ; 31
DB      15H,    3FH,    00H     ; 32
DB      15H,    3FH,    2AH     ; 33
DB      3FH,    15H,    00H     ; 34
DB      3FH,    15H,    2AH     ; 35
DB      3FH,    3FH,    00H     ; 36
DB      3FH,    3FH,    2AH     ; 37
DB      15H,    15H,    15H     ; 38
DB      15H,    15H,    3FH     ; 39
DB      15H,    3FH,    15H     ; 3A
DB      15H,    3FH,    3FH     ; 3B
DB      3FH,    15H,    15H     ; 3C
DB      3FH,    15H,    3FH     ; 3D
DB      3FH,    3FH,    15H     ; 3E
DB      3FH,    3FH,    3FH     ; 3F

END
```

```
;----------------------------------------------
;       I/O ADDRESS EQUATES
;----------------------------------------------
SIO_DAT:        EQU     07CH            ;SIO_DAT DART CH A
SIO_CMD:        EQU     07DH            ;SIO_CMD
HST_DAT:        EQU     07EH            ;HST_DAT DART CH B
HST_CMD:        EQU     07FH            ;HST_CMD
PRNOPRT:        EQU     08FH            ;PRN DATA PORT -> PRN
PRNIPRT:        EQU     08FH            ;PRN STATUS PORT <- PRN
  P_BUSY:       EQU     1               ;ACTIVE HI  PRINTER BUSY
  P_SLCT:       EQU     2               ;ACTIVE HI  PRINTER SELECT
  P_PE:         EQU     4               ;ACTIVE HI  PRINTER PAPER END
  P_ERR:        EQU     8               ;ACTIVE LO  PRINTER ERROR
                                        ;ON LINE = P_SLCT * /P_PE * P_ERR
KBDIPRT:        EQU     0BEH            ;KBD STATUS PORT <- KBD
  K_DATI:       EQU     1               ;  KBD DATA
  K_CLKI:       EQU     2               ;  KBD CLOCK

;------ 1 BIT CONTROL PORT

O_BUZ:          EQU     0D8H            ;BUZZER PORT, LOW = SOUND
O_LED0:         EQU     0D9H            ;LED 0. LOW = LIGHT
LED_PWR:        EQU     O_LED0          ;POWER LED INDICATOR
O_LED1:         EQU     0DAH            ;LED 0. LOW = LIGHT
LED_ACT:        EQU     O_LED1          ;ACTIVE LED INDICATOR
O_KCLK:         EQU     0DBH            ;KBD CLK LOW = INACTIVE.
O_KDAT:         EQU     0DCH            ;KBD DAT LOW = INACTIVE.
O_PSTB:         EQU     0DDH            ;PRINTER STROBE, LOW = ASSERTED
O_PINIT:        EQU     0DEH            ;PRINTER INIT, LOW = ASSERTED
O_NMIEN:        EQU     0DFH            ;NMI ENABLE, LOW = DISABLE NMI

;------ RAMDAC IO ADDRESS
DAC_WAR:        EQU     09CH            ;PIXEL ADDRESS WRITE MODE
DAC_VAL:        EQU     09EH            ;COLOR VALUE
DAC_MSK:        EQU     09DH            ;PIXEL MASK REGISTER
DAC_RDA:        EQU     09FH            ;PIXEL ADDRESS READ MODE

;----------------------------------------------
;       STATUS EQUATES
;----------------------------------------------
ST_REV:         EQU     10H             ;REV 0
ST_ROMPS:       EQU     20H             ;ROM TEST PASS
ST_ROMFL:       EQU     21H             ;ROM TEST FAIL
ST_RAMPS:       EQU     22H             ;RAM TEST FAIL
ST_RAMFL:       EQU     23H             ;RAM TEST FAIL
ST_PPE0:        EQU     24H             ;PRINTER PAPER NOT EMPTY
ST_PPE1:        EQU     25H             ;PRINTER PAPER EMPTY
ST_PSL0:        EQU     26H             ;PRINTER NOT SELECTED
ST_PSL1:        EQU     27H             ;PRINTER SELECTED
ST_PER0:        EQU     28H             ;PRINTER NO ERROR
ST_PER1:        EQU     29H             ;PRINT ERROR
ST_DCD0:        EQU     2AH             ;SERIAL PORT DCD = 0
ST_DCD1:        EQU     2BH             ;SERIAL PORT DCD = 1
ST_BRK0:        EQU     2CH             ;SERIAL PORT NO BREAK
ST_BRK1:        EQU     2DH             ;SERIAL PORT BREAK DETECTED
ST_ONL0:        EQU     2EH             ;HWS IS OFF LINE
ST_ONL1:        EQU     2FH             ;HWS IS ON LINE
ST_KBERR:       EQU     30H
ST_KBOK:        EQU     31H

;----------------------------------------------
;       CONSTANT DEFINITION
;----------------------------------------------
ROMSIZE:        EQU     40H
CMHWMK:         EQU     0C0H            ;COMMD BUFFER HIGH WATER MARK
CMLWMK:         EQU     030H            ;COMMD BUFFER LOW WATER MARK
SOHWMK:         EQU     0C0H            ;SERIAL OUTPUT BUFFER HIGH WATER MARK
SOLWMK:         EQU     030H            ;SERIAL OUTPUT BUFFER LOW WATER MARK
POHWMK:         EQU     1300H           ;PRINTER BUFFER HIGH WATER MARK
POLWMK:         EQU     0100H           ;PRINTER BUFFER LOW WATER MARK
CNT_STA:        EQU     4
CNT_SI:         EQU     8               ;SERIAL INPUT
CNT_EC:         EQU     8               ;ECHO Q
;----------------------------------------------
;       DATA BETWEEN SV AND HWS
;       00 - 0F : SYSTEM CONTROL DATA, NO USER DATA IS ALLOWED.
;       10 - FF : USER DATA REGION.
;----------------------------------------------

;------ COMMAND SEND TO HWS

DT_NOP:         EQU     00H             ; NOP
ST_TYP:         EQU     01H             ; STATUS.
SI_TYP:         EQU     02H             ; SERIAL DATA
KB_TYP:         EQU     03H             ; KEYBOARD DATA
EC_TYP:         EQU     04H             ; ECHO COMMAND ACK FOR DIAGNOSTICS
CM_STP:         EQU     05H             ; CSR STOP
SO_STP:         EQU     06H             ; SERIAL STOP
PO_STP:         EQU     07H             ; PO STOP
RM_TYP:         EQU     08H             ; RAMDAC DATA
```

```
CM_STR:     EQU     09H     ; CSR START
SO_STR:     EQU     0AH     ; SERIAL START
PO_STR:     EQU     0BH     ; PO START
DT_RES2:    EQU     0CH     ;
DT_RES3:    EQU     0DH     ;
DT_MARK:    EQU     0EH     ; MARK CHAR
DT_ONL:     EQU     0FH     ; REQUEST ON LINE MSG

;------ COMMAND RECEIVED FROM HWS

CM_TYP:     EQU     01H     ; COMMAND
SO_TYP:     EQU     02H     ; SERIAL DATA
PO_TYP:     EQU     03H     ; PRINTER DATA
ST_STP:     EQU     05H     ; CSR STOP
SI_STP:     EQU     06H     ; SERIAL STOP
KB_STP:     EQU     07H     ; KB OVERFLOW BEEP
ST_STR:     EQU     09H     ; CSR START
SI_STR:     EQU     0AH     ; SERIAL START
KB_STR:     EQU     0BH     ; KB START FLAG
;-------------------------------------------------
;       STATE BIT DEFINITION FOR FGOUT, FGINP
;-------------------------------------------------
B_ST_FUL:   EQU     0               ;ST FULL STATE IN FGOUT
B_SI_FUL:   EQU     1               ;SI FULL STATE IN FGOUT
B_KB_FUL:   EQU     2               ;KB FULL STATE IN FGOUT
B_EC_FUL:   EQU     3               ;EC FULL STATE IN FGOUT
B_ST_STP:   EQU     4               ;ST STOP STATE IN FGOUT BY HST
B_SI_STP:   EQU     5               ;SI STOP STATE IN FGOUT
B_KB_STP:   EQU     6               ;KB STOP STATE IN FGOUT

B_CM_STP:   EQU     4               ;CM STOP STATE IN  FGINP
B_SO_STP:   EQU     5               ;SO STOP STATE IN  FGINP
B_PO_STP:   EQU     6               ;PO STOP STATE IN  FGINP
B_PEND:     EQU     7               ;COMMAND PENDING IN FGOUT
;-------------------------------------------------
;       DART INTERRUPT TABLE ADDRESS EQUATES
;       CHB=1ST, CHA=2ND, 00=TX, 02=EX, 04=RX, 06=ER
;-------------------------------------------------
HST_TXVT:   EQU     0FF00H          ;HOST VECTOR,TX,
HST_EXVT:   EQU     0FF02H          ;HOST VECTOR,EX
HST_RXVT:   EQU     0FF04H          ;HOST VECTOR,RX
HST_ERVT:   EQU     0FF06H          ;HOST VECTOR,ER
SIO_TXVT:   EQU     0FF08H          ;SIO VECTOR,TX
SIO_EXVT:   EQU     0FF0AH          ;SIO VECTOR,EX
SIO_RXVT:   EQU     0FF0CH          ;SIO VECTOR,RX
SIO_ERVT:   EQU     0FF0EH          ;SIO VECTOR,ER
;-------------------------------------------------
;
;       HWS MEMORY MAP
;
;-------------------------------------------------
;
;       FFFF
;               Z80 USE = 3/4 K
;       FD00
;               Z80 USE = 256
;       FC00
;               HOST STATUS BUFFER = 256
;       FB00
;               HOST COMMAND BUFFER = 256
;       FA00
;               SERIAL INPUT BUFFER  = 256
;       F900
;               SERIAL OUTPUT BUFFER = 256
;       F800
;               KEYBOARD BUFFER = 256
;       F700
;               HANDSHAKE BUFFER = 256
;       F600
;               ECHO BUFFER = 256
;       F500
;               TX BUFFER = 256
;       F400
;               PRINTER BUFFER = 5K
;       E000
;
;-------------------------------------------------
HITX:       EQU     0F4H            ;TX QUE MSB ADDRESS
HIEC:       EQU     0F5H            ;ECHO COMMAND
HIHS:       EQU     0F6H            ;HANDSHAKE QUEUE MSB ADDRESS
HIKB:       EQU     0F7H            ;KI QUE MSB ADDRESS
HICM:       EQU     0FAH            ;CM QUE MSB ADDRESS
HIST:       EQU     0FBH            ;ST QUE MSB ADDRESS
RAMADDR:    EQU     0E000H          ;8K BYTE ADDRESS
STACKTOP:   EQU     0FFFFH          ;TOP OF THE STACK

ORG     0FD00H

;------ SERIAL/PARALLEL PORT POINTER STORAGE AREA
```

```
TBBASO:     DS      2               ;FD00
TBEASO:     DS      2
TBHASO:     DS      2
TBTLSO:     DS      2
TBBASI:     DS      2
TBEASI:     DS      2
TBHASI:     DS      2
TBTLSI:     DS      2
TBBAPO:     DS      2               ;FD10
TBEAPO:     DS      2
TBHAPO:     DS      2
TBTLPO:     DS      2
TCHBUD:     DS      1
TCHCFG:     DS      1
TCHSRT:     DS      1
TCHSTP:     DS      1
TCHHSK:     DS      1
            DS      3
;------ 7       6       5       4       3       2       1       0
;------ NA      NA      R_STP   R_SW    R_HW    T_STP   T_SW    T_HW

ECHA:       DS      1       ;20  F500 ECHO QUEUE HEAD LSB
ECTL:       DS      1       ;                       TAIL LSB
TXHA:       DS      1       ;22  F400 TX QUEUE HEAD LSB
TXTL:       DS      1       ;                    TAIL LSB
CMHA:       DS      1       ;24  FA00 COMMAND QUEUE HEAD LSB
CMTL:       DS      1       ;                         TAIL LSB
HSHA:       DS      1       ;26  F600 HANDSHAKE QUE HEAD PTR
HSTL:       DS      1       ;                        TAIL PTR
STTL:       DS      1       ;28  FB00 STATUS QUEUE HEAD
STHA:       DS      1       ;                      TAIL
FGOUT:      DS      1       ;2a       OUTPUT QUEUE STATE
FGINP:      DS      1       ;         INPUT QUEUE STATE
TXDSW:      DS      1       ;2c       TX QUEUE INPUT SWITCH
RXDSW:      DS      1       ;         RX CH OUTPUT SWITCH
RDMASK:     DS      1       ;2e       INPUT DATA MASK BYTE
            DS      1       ;

;------ SERIAL PORT VARIABLE AND MSC VARIABLE

CMDTAIL:    DS      1       ;30
WORK_CMD:   DS      1       ;
ERRBKS:     DS      1       ;32
ERRDCD:     DS      1       ;     ;b7=dcd state, b1-0 = how many times dcd change
ERRBRK:     DS      1       ;34 ;=0 no break, <>0 break occurred
ERRROM:     DS      1       ;
ERRRAM:     DS      1       ;36
FGTXACT:    DS      1       ;
FGSOACT:    DS      1       ;38
BITMSK:     DS      1       ;
SIO_EN:     DS      1       ;3a
IGNBRK:     DS      1       ;
PARMRK:     DS      1       ;3c
NPRERR:     DS      1       ;
ISTRIP:     DS      1       ;3e
FGBRK:      DS      1       ;          ;b0=0 break off, b0=1 break on
IGNPAR:     DS      1
TCXONC:     DS      1
SIO_DIV:    DS      1               ;
SRTANY:     DS      1               ;ANY CHAR START CMD
HWSONL:     DS      1               ;HWS ONLINE FLAG
ACT20CNT:   DS      1               ;20 MS ACTIVITY TIME OUT COUNT
 ACTTO:     EQU     050H            ;INCREASE FOR SV AND VWS  -- 3/4/92
CBLTOEN:    DS      1               ;CABLE TIME OUT ENABLE FLAG 0=DIS
 CBLTO:     EQU     0FFH            ;B7 = EN, B6-0 IS CNT     --- 3/4/92
CBLTOE1:    DS      1               ;SUB CABLE T.O. CNT
 CBLTO1:    EQU     7               ;MASK FOR CBLTOE1
HWSTOEN:    DS      2               ;HWS ONLINE FLAG TIME OUT COUNT
HWSONCNT:   DS      1               ;RCV'D DT_ONL COUNT
BREAKCNT:   DS      1               ;TOTAL BREAK CNT, AND DT_ON CHAR
ERRCTS:     DS      1               ;CTS CHANGE STATUS
SIO_CTS:    DS      1               ;CURRENT CTS STATE
SIO_RTS:    DS      1               ;RTS STATE

;------ KEYBOARD VARIABLE AREA

KBINDAT:    DS      1               ;KBD INPUT DATA BYTE
KBINCNT:    DS      1               ;KBD INPUT CNT
KBINFUL:    DS      1               ;=1 DATA IS READY IN INPUT BUF
KBINSTA:    DS      1               ;KBD INPUT STATUS BYTE
 KBPE:      EQU     0               ;PARITY ERROR
 KBFE:      EQU     1               ;FRAME ERROR (STOP BIT)
 KBOE:      EQU     2               ;OVERRUN ERROR
KBOUDAT:    DS      1
KBOUCNT:    DS      1
KBOUFUL:    DS      1               ;=1 DATA IS READY TO OUTPUT
KBOUSTA:    DS      1
 KBLE:      EQU     0               ;LINE CONTROL PROTOCOL ERROR
KBOUPAR:    DS      1               ;PARITY BIT OF OUTPUT DATA
KBOLAST:    DS      1               ;LAST DATA SEND TO KBD
```

```
KBOUWFA:        DS      1               ;=1 KBD OUT WAIT FOR ACK
KBSEND0:        DS      1               ;KBD SEND STATE 0=60MS 1=10MS
KBSTATE:        DS      1               ;KEYBOARD STATE BYTE
  KB_IDLE:      EQU     0               ;IDLE STATE
  KB_REC:       EQU     1               ;RECEIVE STATE
  KB_SEND:      EQU     2               ;TRANSMIT STATE
  KB_RTY:       EQU     3               ;RETRY STATE
  TO10MS:       EQU     28H             ;10 MS KEYBOARD TIME OUT CONSTANT
KBTMCNT:        DS      2               ;KBD TIME OUT COUNT
KBTMFLAG:       DS      1               ;KBD TIME OUT FLAG =1 EN, =0 DIS
KBACTION:       DS      2               ;ADDRESS FOR NEXT NMI ROUTINE
  KB_RSND:      EQU     0FEH
  KB_ACK:       EQU     0FAH            ;KEYBOARD SEND TO HWS CODE
KBSNDRTY:       DS      1               ;KEYBOARD SEND KEY RETRY COUNT
KBINIT:         DS      1               ;KEYBOARD INIT CMD ACTIVE
KBCODE:         DS      1               ;KEYBOARD SCAN CODE FLAG =0 SET 2
                                        ; =FF (XT) SET 1
KBMB:           DS      1               ;KEYBOARD MAKE/BREAK CODE

;------ LED VARIABLE AREA

LEDTIME:        EQU     800H
LED0ST:         DS      1               ;LED 0 STATE
;------ LEDST= 7=ON/OFF  65432=NA  10=00(OFF),01(PULSE),10(ON)
LED0TIME:       DS      2               ;LED 0 TIMER
LED1ST:         DS      1
LED1TIME:       DS      2               ;LED 1 TIMER

;------ BEEPER VARIABLE AREA

BEEPLTIM:       EQU     0800H           ;BEEPER LONG SOUND CONSTANT
BEEPSTIM:       EQU     0100H           ;BEEPER SHORT SOUND CONSTANT
BEEPOTIM:       EQU     0200H           ;BEEPER OFF STATE CONSTANT
BEEPST:         DS      1               ;BEEPER STATE BYTE
;-BEEPST= B2=ACTIVE STATE, B1=ON/OFF STATE, B0=BEEPER CURRENT STATE
BEEPLONG:       DS      1
BEEPSHRT:       DS      1
BEEPTIME:       DS      2

;------ PRINTER VARIABLE AREA

PRNnew:         DS      1               ;PRINTER new STATUS
PRNPE:          EQU     24H
PRNSEL:         EQU     26H
PRNERR:         EQU     28H ;------ id area for success init hwsid:          ds      13              ;if inited data = 0,1,2,3,4,5,6,7,8,9

;----- HOST STATUS CMD T.O. AFTER ON LINE IS ESTABLISHED BUT STATUS CMD DOES
;----- NOT RECEIVE FROM HOST. TRY TO RECOVER A ERROR COND FROM HOST.

STA_RX:         DS      1               ;=1 STATUS CMD HAS RECEIVED
STA_TO:         DS      2               ;STATUS CMD T.O. COUNT

;----- RAMDAC ADDRESS AND DATA BUFFER -----

DAC_CNT:        DS      1               ;RAMDAC BUFFER COUNT
DAC_BUF:        DS      6               ;RAM DAC TEMP BUF
```

```
              SV   INTERFACE SPECIFICATION                page: 1
                 ============================
```

PROPRIETARY INFORMATION
Maxpeed Corporation                                      04-10-1992

1. FEATURE

* An intelligent 4 channel VGA color workstation adapter
  designed for PC/AT or compatible computer.

* All four channels are fully programmable, they can support
        *   VGA 640x480 16 color graphics.
        *   IBM AT keyboard or compatible keyboard.
        *   RS232C communication, (from 1200 to 38400)
        *   Parallel printer port.

* No interrupt and dma is needed.

* Use dual port ram (Share memory scheme) to exchange data.

* Dual port ram's address is software configable from 0c0000h to
  0fe000h, dual port ram takes 8k memory space of the host PC.

2. GENERAL DESCRIPTION

The internal structure of the SV includes a Z80B cpu, a 32k
   dual port ram, 4 vga-graphic controller, 4 serial port, 4
   keyboard controller, and 4 parallel port.

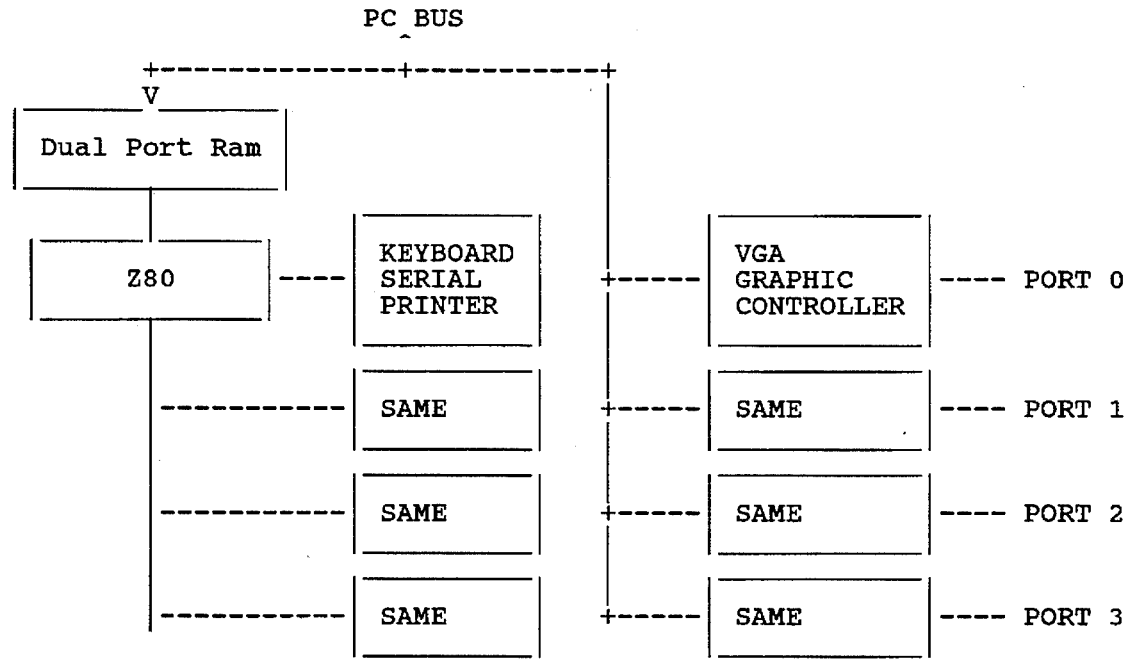

< The Maxpeed SV adapter block diagram >

```
                  SV  INTERFACE SPECIFICATION           page: 2
                  ==============================

PROPRIETORY INFORMATION
Maxpeed Corporation                                     04-10-1992

3. SPECIAL I/O PORT DESCRIPTION

On each sv board has the following register which are

03deh - sv master select register.
        03ddh - sv dual port ram address register.
        03dch - sv ramdac update register.

< MSR - MASTER SELECT REGISTER - 03DEH > bit     action
        ===     ====================
        7       bden - board enable
        6       0    - n/a must be 0
        5       0    - n/a must be 0
        4       bd1  - board select 1
        3       bd0  - board select 0
        2       0    - n/a must be 0
        1       ch1  - channel select 1
        0       ch0  - channel select 0

* The master select register act as a switch which is used to bank in
  the display memory and i/o register for the desired channel.

* The master select register is shared by all th sv board and it is
  a write only register.

* to disable all channels of all boards set msr = 10h.

* to select board 1, channel 2, set msr = 8Ah - bden = 1
                                                bd1  = 0
                                                bd0  = 1
                                                ch1  = 1
                                                ch0  = 0

* before shutdown (warn boot) set msr = 0.

* compatible vga board like: acumos avga1 board, trident 9000 tvga
  board, gtk vga1 board, tseng et4000 vga board.

* if a compatible vga board is used as console, it is necessary to
  disable them when sv port is activated. and to enable console vga
  port when console is accessed.

out     46e8h, 06h      ; disable vga
                out     03c3h, 00h      ; disable vga out     46e8h, 0eh      ; enable vga
                out     03c3h, 01h      ; enable vga
```

SV   INTERFACE SPECIFICATION                page: 3
=================================

PROPRIETORY INFORMATION
Maxpeed Corporation                                        04-10-1992

< RAR - RAM ADDRESS REGISTER - 03ddH >

The ram address register is used to set up on board dual port ram's address.

```
bit     action
===     ====================
7-6     x      - don't care
5       a17    - dual port ram address a17
4       a16    - dual port ram address a16
3       a15    - dual port ram address a15
2       a14    - dual port ram address a14
1       a13    - dual port ram address a13
0       dpmen  - dual port ram enable (0=disable, 1=enable)
```

\* dual port ram's address can only be between 00c0000h to 00ffffh

To enable and set up the dual port ram's address:
         step 1: set msr register to select and enable that sv board.
         step 2: determined the dual port ram's address and set
                 rar register.
for example: want to set sv-4 board 2's dual port ram to d400:0

```
            out     (3deh), (90h)            ;select board
            out     (3ddh), (d4h + 1)        ;set d4 and enable
```

< RMR - RAMDAC MODIFIED REGISTER - 03dCH >

This register is a read/write register. this register contains flags
that indicates which channel's ramdac has been changed by software.
The purpose of this register is to tell device driver to update
the remote VGA Maxstation's ramdac value.

```
Read    bit     description
        ===     ====================
        7-4     x       - don't care
        3       channel 3,  = 0 not change,  =1 changed
        2       channel 2
        1       channel 1
        0       channel 0
```

Write to RMR register will clear the flag whose channel is currently
      selected.

The device driver need to check RMR regularly, so a prompt ramdac
value can be updated.

A sample clock interrupt routine is list below.

SV   INTERFACE SPECIFICATION          page: 4
=============================

PROPRIETORY INFORMATION
Maxpeed Corporation                                        04-10-1992

```
;----------------------------------------------------------------;
;          clock tick interrupt trap                             ;
;----------------------------------------------------------------;

brd_sel       dw       80h,88h,90h,98h  ; sv board select value
loopcnt       db       0                ; loop count
t_count       db       0                ; tick count
orig1c        dd       0                ; original int vector 1c
shboards      db       0                ; # of sv boards
seg_brd       dw       0,0,0,0          ; dual port ram seg address
ws0ismc       db       0                ; sv port 0 is master console
shmsr         db       0                ; image of master select reg
fgdac         equ      1ch              ; dac table busy flag, 0 -> not
                                        ; busy i.e. dac table can be
                                        ; update by device driver
tbdac         equ      1ah              ; a 16 bit offset for dac table clk_trap:
        pusha                           ;save registers
        push    ds
        push    es
        mov     ax,cs
        mov     ds,ax
        inc     [t_count]               ;increase tick count
        cmp     [t_count],2             ;every sec check once
        ljnz    clk_tr99
        mov     [t_count],0             ;reset t_count
        mov     bp,0                    ; init board index
        mov     al,[shboards]           ;load # of board
        mov     [loopcnt],al            ; init loop count
        cmp     [ws0ismc],'Y'           ;if we are mc -> jump
        je      clk_tr10
        test    [shmsr],80h             ;if we are select -> jump
        jnz     clk_tr10
        dis_vga                         ;disable vga i/o and mem
clk_tr10:
        mov     ax,[bp.brd_sel]         ; select borard first
        mov     dx,sh_sel
        out     dx,al
        mov     dx,sv_dac
        in      al,dx                   ;get ramdac update flag
        and     al,0fh                  ;mask off unused bits
        jz      clk_tr70                ;if none of them changed -> jump
        mov     es,[bp.seg_brd]         ;get board's physical seg
        mov     bx,0d00h                ;init bx = channel table offset
clk_tr20:
        shr     al,1                    ;test channel ramdac change flag
        jnc     clk_tr60
        test    byte ptr es:[bx.fgdac],0ffh    ; check owner flag
        jnz     clk_tr60                ; if fw still own dac's flag
```

SV   INTERFACE SPECIFICATION          page: 5
==========================

PROPRIETORY INFORMATION
Maxpeed Corporation                                    04-10-1992

```
           push     ax                         ; save ramdac changed falg
           mov      al,bl                      ; use table offset low byte
           shr      al,5                       ; to derive channel #, then
           or       ax,[bp.brd_sel]            ; or with board # and enable bit
           mov      dx,sh_sel                  ; select the right vga channel
           out      dx,al
           mov      ax,es:[bx.tbdac]           ; get ramdac table index
           shr      ax,12                      ; make page #
           mov      es:[110],al                ; set page
           mov      ax,es:[bx.tbdac]           ; get ramdac table index
           and      ax,0fffh                   ; make data window offset
           or       ax,1000h                   ;
           mov      di,ax
           mov      dx,3c7h                    ; dac read address reg
           xor      al,al                      ; reset ramdac address to 0
           out      dx,al
           mov      dx,03c9h
           mov      cx,192                     ; read 192 byte
clk_tr50:
           in       al,dx                      ; read R G B data
           mov      es:[di],al                 ; store them into sv ramdac
           inc      di                         ; buffer
           loop     clk_tr50
           mov      byte ptr es:[bx.fgdac],0ffh    ; set owner flag to fw
           mov      dx,sv_dac                  ; clear this channel's ramdac
           out      dx,al                      ; change flag
           pop      ax
clk_tr60:
           add      bx,20h                     ; point to next port's offset
           cmp      bx,0d80h                   ; reach to port 4 or not?
           jc       clk_tr20                   ;
clk_tr70:
           inc      bp                         ; inc board pointer
           inc      bp
           dec      [loopcnt]                  ;
           ljnz     clk_tr10
           mov      al,[shmsr]                 ; recover master select reg
           mov      dx,sh_sel
           out      dx,al                      ; set back to original value
           test     al,80h
           jnz      clk_tr99                   ;if we are selected
           en_vga                              ;enable vga i/o and mem
clk_tr99:
           pop      es                         ;exit
           pop      ds
           popa
           jmp      cs:[orig1c]                ; jump to original clk service
```

```
                SV   INTERFACE SPECIFICATION            page: 6
                ============================

PROPRIETARY INFORMATION
Maxpeed Corporation                                     04-10-1992

4. Dual port ram description.

All the communcation between the host PC and SV are through
   the dual port ram. The 32k dual port ram is devided into eight
   4k pages. There are seven data pages and one csr page (command/
   status register). The host PC can access the csr page and one
   data page at one time. A page select register is designed to
   select which data page can be accessed by the host. The csr page
   includes command queue, status queue, keyboard buffer,
   queue's address registers, page select register, and several
   status registers. The data page contains 4 transmit data queues,
   4 receive data queues, and 4 printer output queues.

command queue -- a buffer thru which PC sends command to SV.
   status queue --- a buffer thru which SV sends status to PC.
   transmit queue - a buffer thru which PC  sends data to terminal.
   receive queue -- a buffer thru which SV received data from terminal.
   printer queue -- a buffer thru which PC sends data to printer.
 * keyboard buffer - a buffer thru which SV received data from keyboard.

Each queue has 4 queue address registers they are

BEGIN address register - define queue's begin address.
   END address register --- define queue's end address.
   HEAD address register -- address for next data to be put into queue.
   TAIL address register -- address for next data to be taken from queue
```

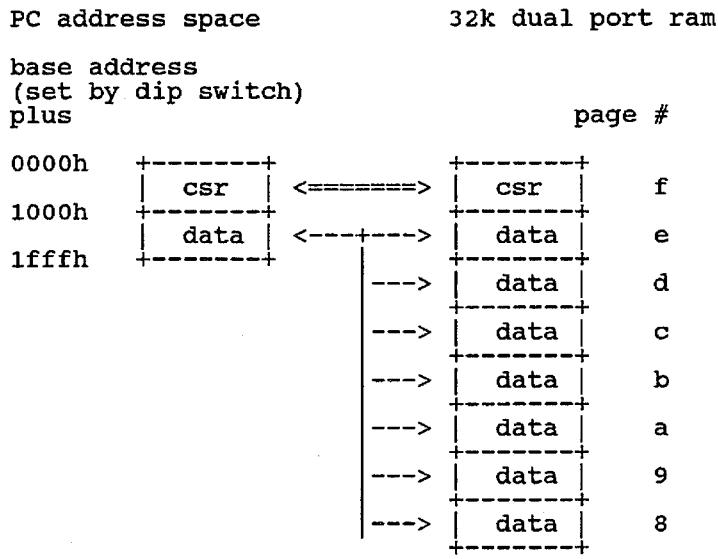

```
           < Dual Port Ram block diagram >
```

SV   INTERFACE SPECIFICATION                page: 7
               ============================

PROPRIETARY INFORMATION
Maxpeed Corporation                                        04-10-1992

4.1 Queue operation description.

All the queue are defined by the BEGIN address and END address.
   Data is added to a queue at the HEAD and removed from the TAIL.
   To remove a byte from queue, first check if HEAD = TAIL. If so
   then queue is empty. Otherwise, take the byte pointed by the
   TAIL and increment TAIL, if TAIL > END, then set TAIL = BEGIN.
   To add a byte to a queue, first check if (HEAD+1)=TAIL or if
   {(TAIL=BEGIN) and (HEAD=END)}, in which case the queue is full.
   Otherwise , write to the byte pointed by HEAD and increment
   HEAD. If HEAD > END, then set HEAD = BEGIN.

BEGIN, END, HEAD, and TAIL addresses are 16 bit addresses. Each
   address register includes 2 bytes, the low byte has low byte
   address, and high byte has high byte address. The page number of
   the dual port ram is defined by the upper nibble of the high byte
   address.

For example address  contain  description
          -------  -------  -------------
          0c00h    000h     BEGIN address low byte
          0c01h    080h     BEGIN address high byte
          0c02h    0ffh     END address low byte
          0c03h    087h     END address high byte
          0c04h    023h     HEAD address low byte
          0c05h    082h     HEAD address high byte
          0c06h    044h     TAIL address low byte
          0c07h    081h     TAIL address high byte This queue is at between 8000h to 87ffh. The queue is at page 8
   of the dual port ram. This queue is not empty (HEAD <> TAIL)
   nor full (HEAD <> TAIL+1). The following example tells how to
   put data into this queue.

assume board's dual port ram is at 0d2000h mov    es, board_base_address_seg    ;0d200h
                  mov    si, page_select_reg_address   ;0110h
                  mov    al, 08h                       ;page #
                  cli                                  ;disable interrupt
                  mov    es:[si], al                   ;set page #
                  mov    ax,es[HEAD]                   ;get HEAD
                  and    ax,0fffh              ;mask of page #
                  or     ax,1000h              ;offset to data page
                  mov    si,ax
                  mov    es:[si], bl           ;put data into queue
                  sti                                  ;enable interrupt
                  mov    ax,es:[HEAD]
                  inc    ax                    ;inc HEAD address
                  mov    es:[HEAD],ax          ;write HEAD back

```
                    SV   INTERFACE   SPECIFICATION            page: 8
                    ==================================

PROPRIETARY INFORMATION
Maxpeed Corporation                                           04-10-1992

5. Dual port ram csr page memory map.

from    to       variable    description                       comment
======  ======   ========    ==============================    ========

0110             psr         page select register address

0a00    0a1f     kbf0        32 bytes keyboard scan code buffer
0a20    0a3f     kbf1        32 bytes keyboard scan code buffer
0a40    0a5f     kbf2        32 bytes keyboard scan code buffer
0a60    0a7f     kbf3        32 bytes keyboard scan code buffer
0a80    0a9f     kbf4        32 bytes keyboard scan code buffer
0aa0    0abf     kbf5        32 bytes keyboard scan code buffer
0ac0    0adf     kbf6        32 bytes keyboard scan code buffer
0ae0    0aff     kbf7        32 bytes keyboard scan code buffer 0c00    0c01     txbeg0      begin addr reg of ch 0 tx que     set by SV
0c02    0c03     txend0      end   addr reg of ch 0 tx que     set by SV
0c04    0c05     txhead0     head  addr reg of ch 0 tx que     set by host
0c06    0c07     txtail0     tail  addr reg of ch 0 tx que     set by SV 0c08    0c09     rxbeg0      begin addr reg of ch 0 rx que     set by SV
0c0a    0c0b     rxend0      end   addr reg of ch 0 rx que     set by SV
0c0c    0c0d     rxhead0     head  addr reg of ch 0 rx que     set by SV
0c0e    0c0c     rxtail0     tail  addr reg of ch 0 rx que     set by host 0c10    ......
                             (channel 1)    (same format as channel 0)
......  0c1f 0c20    ......
                             (channel 2)    (same format as channel 0)
......  0c2f 0c30    ......
                             (channel 3)    (same format as channel 0)
......  0c3f 0c40    ......
                             (channel 4)    (same format as channel 0)
......  0c4f 0c50    ......
                             (channel 5)    (same format as channel 0)
......  0c5f 0c60    ......
                             (channel 6)    (same format as channel 0)
......  0c6f 0c70    ......
                             (channel 7)    (same format as channel 0)
......  0c7f
```

```
            SV   INTERFACE SPECIFICATION              page: 9
            ===============================

PROPRIETARY INFORMATION
Maxpeed Corporation                                   04-10-1992

5. Dual port ram csr page memory map.
from     to       variable    description                     comment
======   ======   ========    =============================   ========
0c80     0c81     cmdbeg      begin addr reg of command que   set by SV
0c82     0c83     cmdend      end   addr reg of command que   set by SV
0c84     0c85     cmdhead     head  addr reg of command que   set by host
0c86     0c87     cmdtail     tail  addr reg of command que   set by SV 0c88     0c89     stbeg       begin addr reg of status que    set by SV
0c8a     0c8b     stend       end   addr reg of status que    set by SV
0c8c     0c8d     sthead      head  addr reg of status que    set by SV
0c8e     0c8f     sttail      tail  addr reg of status que    set by host 0c90     0cbf     (internal use)

0ce0              txlnst      transmitter line status reg     lsb = ch 0

0 : transmitter is stopped due to
                                  1. transmitter queue is empty.
                                  2. flow control.
                                  3. transmitter disable command.
                              1 : transmitter is transmitting data.

0ce2              dtrlnst     dtr line state reg              lsb = ch 0

0 : dtr = 0.
                              1 : dtr = 1.

0ce3              dcdlnst     dcd line state reg              lsb = ch 0

0 : dcd = 0.
                              1 : dcd = 1.

Note: dcd state will be updated only when async ch is enabled.

0ce4              rtslnst     rts line state reg              lsb = ch 0

0 : rts = 0.
                              1 : rts = 1.

0ce5              ctslnst     cts line state reg              lsb = ch 0

0 : cts = 0.
                              1 : cts = 1.

Note: cts state will be updated only when async ch is enabled.

0ce6              brklnst     line break state reg            lsb = ch 0

0 : brk = 0.
                              1 : brk = 1.
```

SV  INTERFACE SPECIFICATION                page: 10

PROPRIETARY INFORMATION
Maxpeed Corporation                        04-10-1992

5. Dual port ram csr page memory map.

| from | to   | variable | description                    | comment    |
|------|------|----------|--------------------------------|------------|
| 0ce7 | 0cf9 |          | (internal use)                 |            |
| 0cfa |      | rxqnem   | rx queue not empty status reg  | lsb = ch 0 |

0 = rx queue is empty.
                                1 = rx queue is not empty.

| 0cfc |      | txqnfl   | tx queue not full status reg   | lsb = ch 0 |

0 = tx queue is full.
                                1 = tx queue is not full.

| 0cfe |      | brdsta   | sv-4 state reg                 |            |

0 = sv-4 is at init state.
                                1 = sv-4 is ready.

| 0cff |      | actled   | activity led global on/off register |       |

0  = send all 8 ch with activity led off cmd.
                                ff = send all 8 ch with activity led on cmd.

SV    INTERFACE SPECIFICATION                page: 11
=============================

PROPRIETARY INFORMATION
Maxpeed Corporation                                   04-10-1992

```
0d00                kbha0    keyboard buffer head ptr ch 0  (0-1f)
0d01                kbt10    keyboard buffer tail ptr ch 0  (0-1f)
0d02      0d0f      (internal use)
0d10      0d11      prnbeg0  begin addr reg of printer que  set by SV
0d12      0d13      prnend0  end   addr reg of printer que  set by SV
0d14      0d15      prnhead0 head  addr reg of printer que  set by host
0d16      0d17      prntail0 tail  addr reg of printer que  set by SV
0d18      0d19      (internal use)
0d1a      0d1b      tb_dac begin address for ramdac data table.
0d1c                fg_dac busy flag, =0 -> ramdac data table not busy
                                      =ff -> ramdac data table busy
0d1d                sta-a0   status byte a for ch 0
```

```
|-----------------------------------------------------------------|
| b7      b6     b5     b4           b3 ------- b0               |
| na      na     na     vws          vws firmware                |
|                       online        revision #                 |
|                       0=offline                                |
|                       1=online                                 |
|-----------------------------------------------------------------|
```

```
0d1e                sta-b0   status byte b for ch 0
```

```
|-----------------------------------------------------------------------|
| b7    b6    b5         b4          b3         b2  --  b0             |
| na    na    printer    printer     printer    na      na             |
|             p out      select      error                             |
|       0=    not end    not select  no error                          |
|       1=    end        selected    error                             |
|-----------------------------------------------------------------------|
```

```
0d1f                kbrdy0   keyboard ready flag.
                             0 = buffer empty.
                             ff = data available.

0d20      0d3f      (channel 1)    (same format as channel 0)

0d40      0d5f      (channel 2)    (same format as channel 0)

0d60      0d7f      (channel 3)    (same format as channel 0)

0d80      0d9f      (channel 4)    (same format as channel 0)

0da0      0dbf      (channel 5)    (same format as channel 0)

0dc0      0ddf      (channel 6)    (same format as channel 0)

0de0      0dff      (channel 7)    (same format as channel 0)

0e00      0e08      os id.

0e40      ....      sig      signature area
                             ID = SV-4 REV xx Copyright ... (SV-4 BOARD)
                                = SV-8 REV xx Copyright ... (SV-8 BOARD)
```

```
          SV  INTERFACE SPECIFICATION            page: 12
          ================================
PROPRIETARY INFORMATION
Maxpeed Corporation                              04-10-1992
```

6. SV command and status description

The functions list in the following table make up the SV command
   set. These commands utilize "command packets" store in the command
   queue of the CSR page to setup each channel's protocol.

| command | description |
|---|---|
| enable/ disable | enable/disable async ch to transmit/receive also can reset async ch to default setting |
| config | configurate async ch's bit per char, stop bits, parity check, baud rate |
| start/stop char setup | define software flow control character |
| flow control protocol | enable/disable software and/or hardware flow control protocol |
| break cmd | enable/disable break sending |
| msc cmd | 1. ignore break cmd. 2. ignore parity char cmd. 3. mark parity char cmd. 4. strip msb cmd. 5. not report parity cmd. 6. disable transmitter cmd. |
| dtr cmd | set/reset async cl's dtr line. |
| sv reset | reset SV board to default state. |
| p-led cmd | power (green) led on/off/pulse cmd. |
| a-led cmd | activity (yellow) led on/off/pulse cmd. |
| beeper cmd | beeper sound (long/short) cmd. |
| kbd led cmd | keyboard led cmd |
| status cmd | request status from workstation. |
| s-code sel | keyboard scan code sel. |
| rts cmd | set reset channel's rts line. |

< command set table >

```
           SV  INTERFACE SPECIFICATION              page: 13
           ===============================

PROPRIETARY INFORMATION
Maxpeed Corporation                                 04-10-1992
```

6. SV command and status description (continued)

| | |
|---|---|
| reset vws | reset vws maxstation. |
| preset ch | set asyn ch to 2400,8n1,dtr=0,rts=0,no handshake |
| baud rate | set async ch baud rate. |
| line cntl | set async line control parameter. |
| modem cntl | set async modem control line dtr and rts. |

< command set table >

The following table makes the status set for the SV.

| | |
|---|---|
| ch status | 1. break detected<br>2. dcd line state changed |

< status table >

Each command and status packet consists of 4 bytes.

| byte | |
|---|---|
| 1 | command/status byte |
| 2 | channel # |
| 3 | value 0 |
| 4 | value 1 |

```
                SV  INTERFACE SPECIFICATION              page: 14
                ================================
PROPRIETARY INFORMATION
Maxpeed Corporation                                     04-10-1992

7. SV channel command summary command              byte 1   byte 2   byte 3   byte 4
    ==================      ======   ======   ======   ======
    disable                   00      ch #      00       00
    disable & reset           00      ch #      00       01
    enable                    00      ch #      01       00
    enable & reset            00      ch #      01       01 note: After reset the channel is set to
          1. 9600 baud, 8 bit/char, 1 stop bit, no parity.
          2. start char = xon (11h), stop char = xoff (13h)
          3. software flow control enabled
          4. dtr = 1.
          5. tx and rx buffer is flushed.

command              byte 1   byte 2   byte 3   byte 4
    ==================      ======   ======   ======   ======
    configuration
       set 1200  baud         01      ch #      02     (see below)
       set 2400  baud         01      ch #      03
       set 4800  baud         01      ch #      04
       set 9600  baud         01      ch #      05
       set 19200 baud         01      ch #      06
       set 38400 baud         01      ch #      07 byte 4:
       bit 7,6             bit 5   bit 4   bit 3,2           bit 1,0
       ---------------     -----   -----   -------------     -----------
       5bits/char=00         1       1     1 stop bit=01     no parity=00
       6bits/char=10                       1.5 stop bit=10   odd parity=01
       7bits/char=01                       2 stop bit=11     even parity=11
       8bits/char=11 note: this command will set dtr=1.

command              byte 1   byte 2   byte 3   byte 4
    ==================      ======   ======   ======   ======
    set start/stop char       02      ch #     start    stop command              byte 1  byte 2  byte 3          byte 4
    ==================      ======  ======  =========       =========
    set flow control          03     ch #   transmit        receive
                                            00=none         00=none
                                            01=hardware     01=hardware
                                            02=software     02=software
                                            03=both         03=both
                                            06=software with any char start
                                            07=both with any char start
```

SV INTERFACE SPECIFICATION                          page: 15

PROPRIETARY INFORMATION
Maxpeed Corporation                                 04-10-1992

| command | byte 1 | byte 2 | byte 3 | byte 4 | |
|---|---|---|---|---|---|
| start break | 04 | ch # | 01 | | |
| stop break | 04 | ch # | 00 | | |

| command | byte 1 | byte 2 | byte 3 | byte 4 | |
|---|---|---|---|---|---|
| not ignore break | 05 | ch # | 0 | 0 | (default) |
| ignore break | 05 | ch # | 0 | 1 | |
| not ignore parity char | 05 | ch # | 1 | 0 | (default) |
| ignore parity char | 05 | ch # | 1 | 1 | |
| not strip msb | 05 | ch # | 3 | 0 | (default) |
| strip msb | 05 | ch # | 3 | 1 | |
| enable transmitter | 05 | ch # | 5 | 0 | (default) |
| disable transmitter | 05 | ch # | 5 | 1 | |

| command | byte 1 | byte 2 | byte 3 | byte 4 |
|---|---|---|---|---|
| set dtr = 0 | 06 | ch # | 0 | n/a |
| set dtr = 1 | 06 | ch # | 1 | n/a |

| command | byte 1 | byte 2 | byte 3 | byte 4 |
|---|---|---|---|---|
| board reset | 07 | | | |

| command | byte 1 | byte 2 | byte 3 | byte 4 |
|---|---|---|---|---|
| reserved | 08 | | | |

| command | byte 1 | byte 2 | byte 3 | byte 4 |
|---|---|---|---|---|
| power led off | 09 | ch # | 00 | n/a |
| power led pulse | 09 | ch # | 01 | n/a |
| power led on | 09 | ch # | 02 | n/a |

| command | byte 1 | byte 2 | byte 3 | byte 4 |
|---|---|---|---|---|
| activity led off | 0a | ch # | 00 | n/a |
| activity led pulse | 0a | ch # | 01 | n/a |
| activity led on | 0a | ch # | 02 | n/a |

| command | byte 1 | byte 2 | byte 3 | byte 4 |
|---|---|---|---|---|
| beeper command | 0b | ch # | bit 7 = 0 | n/a |
| | | | bit 6..4 = long sound count | |
| | | | bit 3..0 = short sound count | | note: long beep sound is generated first, then short beep sound.

```
                SV   INTERFACE SPECIFICATION               page: 16
                ================================

PROPRIETARY INFORMATION
Maxpeed Corporation                                        04-10-1992 command                byte 1  byte 2  byte 3  byte 4
=========================      ======  ======  ======  ==========
kbd led cmd                      0c     ch #    ed     bit 7..3 = 0
                                                       bit 2 = cap lock led
                                                       bit 1 = num lock led
                                                       bit 0 = scroll lock led
note: byte 3 = ed, "ed" is a hex value.
note: a "1" in byte 4 will turn the led on, a "0" turn the led off.

command                byte 1  byte 2  byte 3  byte 4
=========================      ======  ======  ======  ==========
reserved                         0d command                byte 1  byte 2  byte 3  byte 4
=========================      ======  ======  ======  ==========
reserved                         0e command                byte 1  byte 2  byte 3  byte 4
=========================      ======  ======  ======  ==========
ws status update                 0f     ch #
request the workstation to updates the printer status,
dcd state, cts state, VWS workstation's firmware revision.

command                byte 1  byte 2  byte 3  byte 4
=========================      ======  ======  ======  ==========
IBM AT scan code cmd             10     ch #     0
IBM XT scan code cmd             10     ch #     1      (default case)

note: IBM AT scan code = set 2 scan code.
      IBM XT scan code = set 1 scan code. most application use this set.

command                byte 1  byte 2  byte 3  byte 4
=========================      ======  ======  ======  ==========
set rts = 0                      11     ch #     0      n/a
set rts = 1                      11     ch #     1      n/a       (default)

command                byte 1  byte 2  byte 3  byte 4
=========================      ======  ======  ======  ======
reset vws maxstation             12     ch #    n/a     n/a This command will reset remote maxstation, it will
1. flush tx, rx, kb, lp buffers.
2. setup baud rate and line control parameter as before
   (before "reset vws maxstation" command)
3. dtr and rts will stay the same state as before.
4. dcd and cts state will be updated.
5. printer status will be updated.
```

```
               SV   INTERFACE SPECIFICATION                  page: 17
               ================================

PROPRIETARY INFORMATION
Maxpeed Corporation                                          04-10-1992 command              byte 1    byte 2    byte 3    byte 4
   ====================       ======    ======    ======    ======
   preset async channel         13       ch #        0         0
   This command will set async channel to the following state
   1. 2400 baud, 8 data bits, 1 stop bit, no parity.
   2. DTR=0, RTS=0,
   3. No flow-control protocol for rx, tx.
   4. Flush tx and rx buffer.
   5. Dcd and cts state updated.

command              byte 1    byte 2    byte 3    byte 4
   ====================       ======    ======    ======    ======
   set channel baud rate        14       ch #    see below byte 3 --- 02 = 1200 baud.         05 = 9600 baud.
              03 = 2400 baud.         06 = 19200 baud.
              04 = 4800 baud.         07 = 38400 baud.

command              byte 1    byte 2    byte 3    byte 4
   ====================       ======    ======    ======    ======
   set line control             15       ch #    see below byte 3 = 8250 line control bits.
            bit 1-0 number of data bits
                    00 = 5 data bits
                    01 = 6 data bits
                    10 = 7 data bits
                    11 = 8 data bits
            bit 2   number of stop bits
                    0 = 1 stop bit
                    1 = 2 stop bits (word length = 6,7,8)
                    1 = 1.5 stop bits (word length = 5)
            bit 3   parity enable
                    0 = no parity
                    1 = parity enable
            bit 4   parity type
                    0 = odd parity
                    1 = even parity
            bit 7-5 always 0.

command              byte 1    byte 2    byte 3    byte 4
   ====================       ======    ======    ======    ======
   set modem control            16       ch #    see below byte 3 = 8250 modem control bits
            bit 0 = dtr state
            bit 1 = rts state 7. SV channel status summary status               byte 1    byte 2    byte 3    byte 4
   ====================       ======    ======    ======    ======
   break detected               05       ch #       00        n/a
   dcd state change             05       ch #       03     (00=dcd low)
```

```
              SV  INTERFACE SPECIFICATION              page: 18
              ============================

PROPRIETARY INFORMATION
Maxpeed Corporation                                    04-10-1992
```

8. System initialization

* Determine the dual port ram's address.

* Configure sv board's dual port ram address.
        1. Program msr reg (03deh) to enable sv board.
        2. Program rar reg (03ddh) to setup dual port ram address.

* Test the sv borad's id (SV-x REV x), if id is there board is ok,
     else may be address is confilct with other device or shadow memory.

* Do vga video i/o and memory initialization for every channel.
        1. Program msr (03deh) to enable a sv port.
        2. Init i/o register and video memory.
        3. VGA_INIT.INC and F8X16.INC is a sample routine to init
           the vga chip and video memory.

9. DIP switch setting

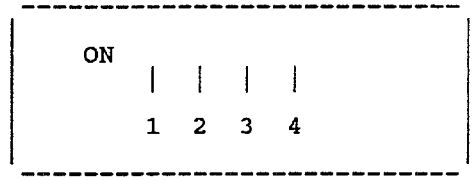

```
Switch   setting  function 1      down       not master console         (defalut)    note 1
         up         port 0 is master console 2      down       16 bit video memory access (default)    note 2
         up         8 bit video memory access 3,4    down down     board 0                 (default)
         up   down     board 1
         down up       board 2
         up   up       board 3
```

Note 1. Only board 0 port 0 can be a master console.

Note 2. This option does not implement in the prototype sv board.

```
              SV   INTERFACE SPECIFICATION                page: 19
                 ==============================
PROPRIETARY INFORMATION
Maxpeed Corporation                                       04-10-1992

QUESTION AND ANSWER ?
======================
```

Q. How does the queue pointer work?

A. Data is added to a queue at the HEAD and removed from the TAIL.
   To remove a byte from queue, first check if HEAD = TAIL. If so
   then queue is empty. Otherwise, take the byte pointed by the
   TAIL and increment TAIL, if TAIL > END, then set TAIL = BEGIN.
   To add a byte to a queue, first check if (HEAD+1)=TAIL or if
   (TAIL=BEGIN) and (HEAD=END), in which case the queue is full.
   Otherwise , write to the byte pointed by HEAD and increment
   HEAD. If HEAD > END, then set HEAD = BEGIN.

Q. How does the driver read and write the queue pointer?

A. The driver should write queue pointer as a 16 bit word.
   When the driver read the queue pointer, it should check the
   high byte of the queue pointer = 0 or not, if so means the
   firmware is at the middle of updating the queue pointer. So
   the driver should read the queue pointer again until the high
   byte is not zero, now a valid queue pointer has been read.

Q. Why does the interrupt of the host PC need to be disabled between
   setting a new page number into the page select register and
   accessing the queue data in the data page dual port ram?

A. If there is an interrupt occurred after the page select register
   has been changed but before the data get accessed, and the cpu
   take the interrupt. During the interrupt service routine the
   page select register could be set to a different value, then after
   return from interrupt wrong data will be accessed by the cpu.

Q. How does the keyboard buffer work?

A. Each keyboard buffer consists 32 bytes. They are all located in
   csr page, so its always accessable by the PC. The buffer is a ring
   buffer. The HEAD and TAIL pointer work the same as the other queue
   pointers, add data to the head pointer and remove data from tail
   pointer. The buffer's size is 32 bytes so the pointer should be kept
   between 0 - 1f.
   For example: for ch 1 --- 0d20 = 15
                             0d21 = 11
   for channel 1 the keyboard buffer has data available at 0a31h to
   0a34h for total 4 bytes.

Note: the data in keyboard buffer is scan code, its default to
         set 1, it can be changed to set 2 by send cmd 10h to sh4.

SV  INTERFACE SPECIFICATION           page: 20
                    ============================

PROPRIETARY INFORMATION
Maxpeed Corporation                                       04-10-1992

Q. How to detect the master console is sv port 0 or a compatible
   vga board.

A. 1. Disable all sv ports. program msr (03deh) = 10h
   2. Read data from port 3c4h and save it.
   3. Write 5 to 3c4h, wait 1 instruction.
   4. Read port 3c4h, compare with 5, write back old value to 3c4h
   5. If data match 5 then master console is a compatible vga card
      else master console is sv port 0.

Question for serial device.
===========================
Q. How does the device driver flush input and/or output queue?

A. For receive queue: write the value of the HEAD pointer to
   the TAIL pointer.
   For transmitter queue: first issue the transmitter disable command
   "05 ch# 05 01" it then polls "TXLNST" until the transmitter is
   stopped, the device driver write the value of the TAIL pointer
   to the HEAD pointer, then issues the transmitter enable command
   "05 ch# 05 00".
   The device driver also can use (enable & reset command) or
   (disable & reset command) to flush the queue. But after those
   reset commands the channel needs to be setup again.

Q. How does the FLOW CONTROL work?

A. If the flow control is enabled. the firmware will initiate
   flow control (send STOP char and/or set DTR=0) when the
   receive queue is almost full. Until the receive queue is
   almost empty it will initiate flow control again (send START
   char and/or DTR=1).  Also when a STOP char is received and/or
   DTR=0 it will stop transmitting char, until a START char is
   received and/or DTR=1, it will start to transmit char again.

Q. When is a DCD status queue event generated?

A. When HARDWARE FLOW CONTROL is not used as handshake protocol
   and the state of DCD has changed and channel is enabled.

Q. When the firmware receives a STOP or START character, does it
   place it into the queue or does it discard it?

A. When SOFTWARE FLOW CONTROL is enabled then STOP or START will
   be discarded. Otherwise it will be put into the receive queue.

Q. How does the SOFTWARE FLOW CONTROL mode 6 work?

A. It is designed to stop the transmitter when receive a STOP char
   and start transmitter again after receiving next char. Both STOP
   char and the char following STOP char will be discarded.

SV   INTERFACE SPECIFICATION                page: 21
==================================

PROPRIETARY INFORMATION
Maxpeed Corporation                         04-10-1992

Q. How does the ignore break command work?

A. If the ignore break mode is enabled, then no break status queue
   event is reported.

Q. How does the ignore parity char command work?

A. If the ignore parity char command is enabled, then any char received
   with parity error or framing error is discarded.

Q. How does the mark parity char command work?

A. If the mark parity char command is enabled, then any char received
   with parity error or framing error is put into the queue with FF 00
   xx, xx is the received char.

Q. How does strip msb command work?

A. If the strip msb command is enabled, then any char received
   its msb bit will be mask off first then put into the queue.
   for example if receive data = b4h --> data put into queue = 34h.

Q. How does the device driver determine the board has completed reset?

A. The brdsta (0cfe) register can be used to monitor the reset process.
   First write ff into brdsta register, then issue the reset command
   to SV board, and wait for brdsta register to become a 1.
   For each maxstation there is a flag "vws online" in status byte a,
   need to be monitored. If vws online = 0 -> no data can be sent to
   maxstation, and the following command will be ignored (break,
   msc, sv reset, power led, active led, beeper, kbd led, scan code).
   After maxstation is up and online all the buffers will be flushed
   that include tx, rx, prn, and kbd.

Q. Future compatiblity

A. This interface specification is designed to cover 8 channel per
   adapter. The id field is designed to be the signature for sv adapter
   and total channel for that sv adapter. In order to be able to put
   SV-4 and SV-8 adapter in one system using same device driver the
   driver should not limit to 4 channel per sv board.

What is claimed is:

1. Multi-user I/O apparatus for coupling a host personal computer to a plurality of remote workstations having VGA color monitors, said multi-user I/O apparatus comprising:

a host computer controller having, for each of said plurality of remote workstations,
   a) a VGA controller producing a first plurality of video signals and a control signal;
   b) a data transmit signal generator, comprising a microprocessor and an asynchronous serial communications circuit, receiving a second plurality of video signals and producing a data transmit signal; and
   c) an encoder, coupled to said VGA controller and to said data transmit signal generator, for receiving as input said first plurality of video signals and said data transmit signal, said encoder combining and encoding said first plurality of video signals and said data transmit signal to produce a second plurality of digital, balanced pair encoded output signals, said first plurality greater than said second plurality, said encoder alternately representing said first plurality of video signals and said data transmit signal among said balanced pair encoded output signals in response to said control signal; and a base unit for each of said remote workstations, said base unit including
   a) a decoder, coupled to said encoder, for receiving as input and decoding said digital, balanced pair encoded output signals, for reproducing said first plurality of video signals and said data transmit signal;
   b) a RAMDAC, coupled to said decoder and to said VGA monitor of said each of said plurality of remote workstations, for receiving as input said reproduced first plurality of video signals and providing analog RGB signals as input to said VGA monitor; and
   c) a data receive signal generator, coupled to said host controller;

said base unit processing said data transmit signal, wherein said second plurality of digital, balanced pair encoded output signals and said data receive signal are transmitted digitally via unshielded telephone cable.

2. Multi-user I/O apparatus for coupling a host personal computer to a plurality of remote workstations having VGA color monitors, said multi-user I/O apparatus comprising:

a host computer controller having, for each of said plurality of remote workstations,
   a) a VGA controller producing first plurality of video signals;
   b) a data transmit signal generator; and
   c) an encoder, coupled to said VGA controller and to said data transmit signal generator, for receiving as input said first plurality of video signals and said, data transmit signal, said encoder combining and encoding said first plurality of video signals and said data transmit signal to produce a second plurality of digital, balanced pair encoded output signals, said first plurality greater than said second plurality; and a base unit for each of said remote workstations, said base unit including
   a) a decoder, coupled to said encoders, for receiving as input and decoding said digital, balanced pair encoded output signals, for reproducing said first plurality of video signals and said data transmit signal;
   b) a RAMDAC, coupled to said decoder and to said VGA monitor of said each of said plurality of remote workstations, for receiving as input said reproduced first plurality of video signals and providing analog RGB signals as, input to said VGA monitor; and
   c) a data receive signal generator, coupled to said host controller;

said base unit processing said data transmit signal, wherein said second plurality of digital, balanced pair encoded output signals and said data receive signal are transmitted digitally via unshielded telephone cable;

said plurality of video signals comprises a pixel clock signal, six pixel data signals, a video blanking interval signal, a vertical sync signal, and a horizontal sync signal;

said encoder combines said plurality of video signals and said data transmit signal into four balanced pair signals;

said decoder is coupled to said VGA monitor of said each of said plurality of remote workstations, reproduces said pixel clock signal, said six pixel data signals and said video blanking interval signal as input to said RAMDAC, and reproduces said vertical sync signal and said horizontal sync signal as input to said VGA monitor; and said unshielded telephone cable is ten-line unshielded telephone cable.

3. The multi-user I/O apparatus of claim 2, wherein said base unit microprocessor is coupled to said RAMDAC for writing RGB values to RAMDAC addresses, said RGB values and RAMDAC addresses being received by said base unit microprocessor through said data transmit signal.

4. A method of controlling a workstation including a VGA monitor and a RAMDAC at a location remote from a host computer location, said method comprising the steps of:
   a) combining and encoding at said host computer location first and second pluralities of signals required by said remote workstation RAMDAC, producing a set of digital, encoded outputs which alternately represent said first and second pluralities of signals in response to a control signal;
   b) digitally transmitting said set of digital, encoded outputs from said host computer location to said remote workstation location in balanced pair, digital format via unshielded ribbon-type cable;
   c) decoding said set of digital, encoded outputs at said remote workstation location to re-create said plurality of signals; and
   d) providing at least a portion of said re-created signals to said remote workstation RAMDAC, whereby said remote workstation RAMDAC drives said VGA monitor.

5. A method of controlling a workstation including a VGA monitor and a RAMDAC at a location remote from a host computer location, said method comprising the steps of:
   a) combining and encoding at said host computer location a plurality of signals required by said remote workstation RAMDAC, producing a set of digital, encoded outputs;
   b) digitally transmitting said set of digital, encoded outputs from said host computer location to said remote workstation location in balanced pair, digital format via unshielded ribbon-type cable;
   c) decoding said set of digital, encoded outputs at said remote workstation location to re-create said plurality of signals; and d) providing at least a portion of said re-created signals to said remote workstation RAMDAC, whereby said remote workstation RAMDAC drives said VGA monitor, wherein the combining and encoding step comprises combining and encoding a pixel clock signal, six pixel data signals, a horizontal sync signal, a vertical sync signal, a video blanking interval signal, and a data transmit signal, and said set of digital, encoded output comprises four encoded outputs;

the transmitting step comprises transmitting via ten-line telephone cable; and the decoding step comprises decoding said encoded outputs at said remote workstation location to re-create said clock signal, said six decoded pixel data signals, said horizontal sync signal, said vertical sync signal, said video blanking interval signal, and said transmit data signal; and the providing step comprises providing said re-created clock signal, said re-created six pixel data signals, and said re-created video blanking interval signal to said remote workstation RAMDAC, and providing said re-created horizontal sync signal and said re-created vertical sync signal to said VGA monitor.

6. The method of claim 5 wherein before said step of combining and encoding is performed, the following step is performed:

converting RAMDAC addresses and RGB values into a bitstream signal as said data transmit signal, and said decoding step further comprises re-creating said RAMDAC addresses and said RGB values from said data transmit stream, and providing said re-created RAMDAC addresses and RGB values to said RAMDAC.

7. An I/O apparatus for coupling a host personal computer to a remote workstation having a VGA color monitor, said I/O apparatus comprising:

a host computer controller having
 a) a VGA controller producing a first plurality of video signals and a control signal;
 b) a data transmit signal generator, comprising a microprocessor and an asynchronous communications circuit, receiving a second plurality of video signals and producing a data transmit signal; and
 c) an encoder, coupled to said VGA controller and to said data transmit signal generator, for receiving as input said first plurality of video signals and said data transmit signal, said encoder combining and encoding said first plurality of video signals and said data transmit signal to produce a second plurality of digital, balanced pair encoded output signals, said first plurality greater than said second plurality, said encoder alternately representing said first plurality of video signals and said data transmit signal among said balanced pair encoded output signals in response to said control signal; and a base unit including
 a) a decoder, coupled to said encoder, for receiving as input and decoding said digital, balanced pair encoded output signals, for reproducing said first plurality of video signals and said data transmit signal;
 b) a RAMDAC, coupled to said decoder and to said VGA monitor, for receiving as input said reproduced first plurality of video signals and providing analog RGB signals as input to said VGA monitor; and
 c) a data receive signal generator, coupled to said host controller, for producing a data receive signal as input to said host controller;

said base unit processing said data transmit signal, wherein said second plurality of balanced pair encoded output signals and said data receive signal are transmitted digitally via unshielded telephone cable.

\* \* \* \* \*